United States Patent
Takahashi

(10) Patent No.: US 11,082,645 B2
(45) Date of Patent: Aug. 3, 2021

(54) IMAGING APPARATUS AND ELECTRONIC EQUIPMENT

(71) Applicant: Sony Semiconductor Solutions Corporation, Kanagawa (JP)

(72) Inventor: Keiichiro Takahashi, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/966,991

(22) PCT Filed: Jan. 25, 2019

(86) PCT No.: PCT/JP2019/002401
§ 371 (c)(1),
(2) Date: Aug. 3, 2020

(87) PCT Pub. No.: WO2019/155906
PCT Pub. Date: Aug. 15, 2019

(65) Prior Publication Data
US 2020/0396400 A1 Dec. 17, 2020

(30) Foreign Application Priority Data
Feb. 9, 2018 (JP) .............................. JP2018-022071

(51) Int. Cl.
*H04N 5/353* (2011.01)
*H04N 5/374* (2011.01)
(Continued)

(52) U.S. Cl.
CPC ......... *H04N 5/3537* (2013.01); *H04N 5/3745* (2013.01)

(58) Field of Classification Search
CPC .... H04N 5/3537; H04N 5/3745; H04N 5/374; H04N 5/3742; H04N 5/3535;
(Continued)

(56) References Cited

U.S. PATENT DOCUMENTS 10,211,245 B2* 2/2019 Kim ...................... H01L 27/146
10,608,038 B2* 3/2020 Kobayashi .............. H01L 21/00
(Continued)

FOREIGN PATENT DOCUMENTS

JP 2016-105649 A 6/2016
JP 2016-184868 A 10/2016
(Continued)

*Primary Examiner* — Marly S Camargo
(74) *Attorney, Agent, or Firm* — Michael Best & Friedrich LLP

(57) ABSTRACT

An imaging apparatus and electronic equipment configured for reduced power consumption are disclosed. In one example, an imaging apparatus includes a pixel array unit including a first pixel portion and a second pixel portion different from the first pixel portion. Each of the first pixel portion and the second pixel portion includes a first photoelectric conversion unit and a second photoelectric conversion unit adjacent to the first photoelectric conversion unit. The pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion. The t technology can, for example, be applied in a CMOS image sensor having pixels for phase difference detection.

18 Claims, 28 Drawing Sheets

(51) Int. Cl.
  *H04N 5/378*    (2011.01)
  *H04N 5/369*    (2011.01)
  *H04N 5/347*    (2011.01)
  *H04N 5/355*    (2011.01)
  *H01L 27/146*   (2006.01)
  *H04N 5/3745*   (2011.01)

(58) Field of Classification Search
  CPC .............. H04N 5/35554; H04N 5/369; H04N 5/36961; H04N 5/378; H04N 5/347; H04N 5/343; H01L 27/14609; H01L 27/14621; H01L 37/1463; H01L 27/14641; H01L 27/14652
  USPC ....... 348/297, 294, 300, 302, 308, 348, 349, 348/208.12, 222.1, 229.1; 257/291, 292, 257/443, 124, 133, 146; 250/208.1
  See application file for complete search history.

(56) References Cited

U.S. PATENT DOCUMENTS

| 10,636,831 | B2* | 4/2020  | Ebiko ............... H01L 27/146 |
| 10,748,954 | B2* | 8/2020  | Kobayashi ......... H01L 27/146 |
| 2009/0160847 | A1* | 6/2009 | Tanikame ............ G06F 5/00 345/214 |
| 2013/0229555 | A1* | 9/2013 | Hashimoto ........ H04N 5/378 348/300 |
| 2017/0192610 | A1* | 7/2017 | Park .................... G06F 3/041 |
| 2017/0338258 | A1  | 11/2017 | Kim et al. |
| 2019/0110011 | A1* | 4/2019 | Araki ................ H04N 5/378 |

FOREIGN PATENT DOCUMENTS

| JP | 2017-184185 A | 10/2017 |
| JP | 2017-220877 A | 12/2017 |
| JP | 2017-228829 A | 12/2017 |

* cited by examiner

IMAGING APPARATUS AND ELECTRONIC EQUIPMENT

TECHNICAL FIELD

The present technology relates to an imaging apparatus and electronic equipment, and particularly to an imaging apparatus and electronic equipment capable of reducing power consumption.

BACKGROUND ART

In recent years, a solid-state imaging element in which pixels for phase difference detection are arranged in a pixel array unit has been used.

For example, a configuration is known in which in the pixels arranged in the pixel array unit, by using a structure in which the photodiodes A and B are provided under one microlens and using A+B signal as a signal for image acquisition, and meanwhile each of the A signal and the B signal is used as a signal for phase difference detection (see, for example, Patent Document 1).

CITATION LIST

Patent Document

Patent Document 1: Japanese Patent Application Laid-Open No. 2016-105649

SUMMARY OF THE INVENTION

Problems to be Solved by the Invention

By the way, in a case where the structure in which the photodiodes A and B are provided under one microlens in the pixels is used, the number of photodiodes from which electric charges are read is doubled as compared with the structure in which one photodiode is provided, resulting in an increase in power consumption.

With respect to such an increase in power consumption, in the technique disclosed in Patent Document 1 described above, in some of the pixels (including the photodiodes A and B) arranged in the pixel array unit, the A signal and the B signals are read separately, and only the A+B signal is read in the remaining pixels. However, in some pixels, it is necessary to read the A signal and the B signal separately, and a reduction in power consumption is insufficient, and a reduction in power consumption has been demanded.

The present technology has been made in view of such circumstances and enables reduction in power consumption.

Solutions to Problems

An imaging apparatus according to an aspect of the present technology is an imaging apparatus including: a pixel array unit including a first pixel portion and a second pixel portion different from the first pixel portion; in which each of the first pixel portion and the second pixel portion includes a first photoelectric conversion unit and a second photoelectric conversion unit adjacent to the first photoelectric conversion unit, the pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion.

Electronic equipment according to an aspect of the present technology is electronic equipment including: an imaging unit including: a pixel array unit including a first pixel portion and a second pixel portion different from the first pixel portion; in which each of the first pixel portion and the second pixel portion includes a first photoelectric conversion unit and a second photoelectric conversion unit adjacent to the first photoelectric conversion unit, the pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion.

The imaging apparatus and the electronic equipment according to an aspect of the present technology include: a pixel array unit including a first pixel portion and a second pixel portion different from the first pixel portion; in which each of the first pixel portion and the second pixel portion includes a first photoelectric conversion unit and a second photoelectric conversion unit adjacent to the first photoelectric conversion unit, and the pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion.

Effects of the Invention

According to one aspect of the present technology, it is possible to reduce power consumption.

Note that effects described herein are not necessarily limited, but may also be any of those described in the present disclosure.

MODE FOR CARRYING OUT THE INVENTION

Figure 1:
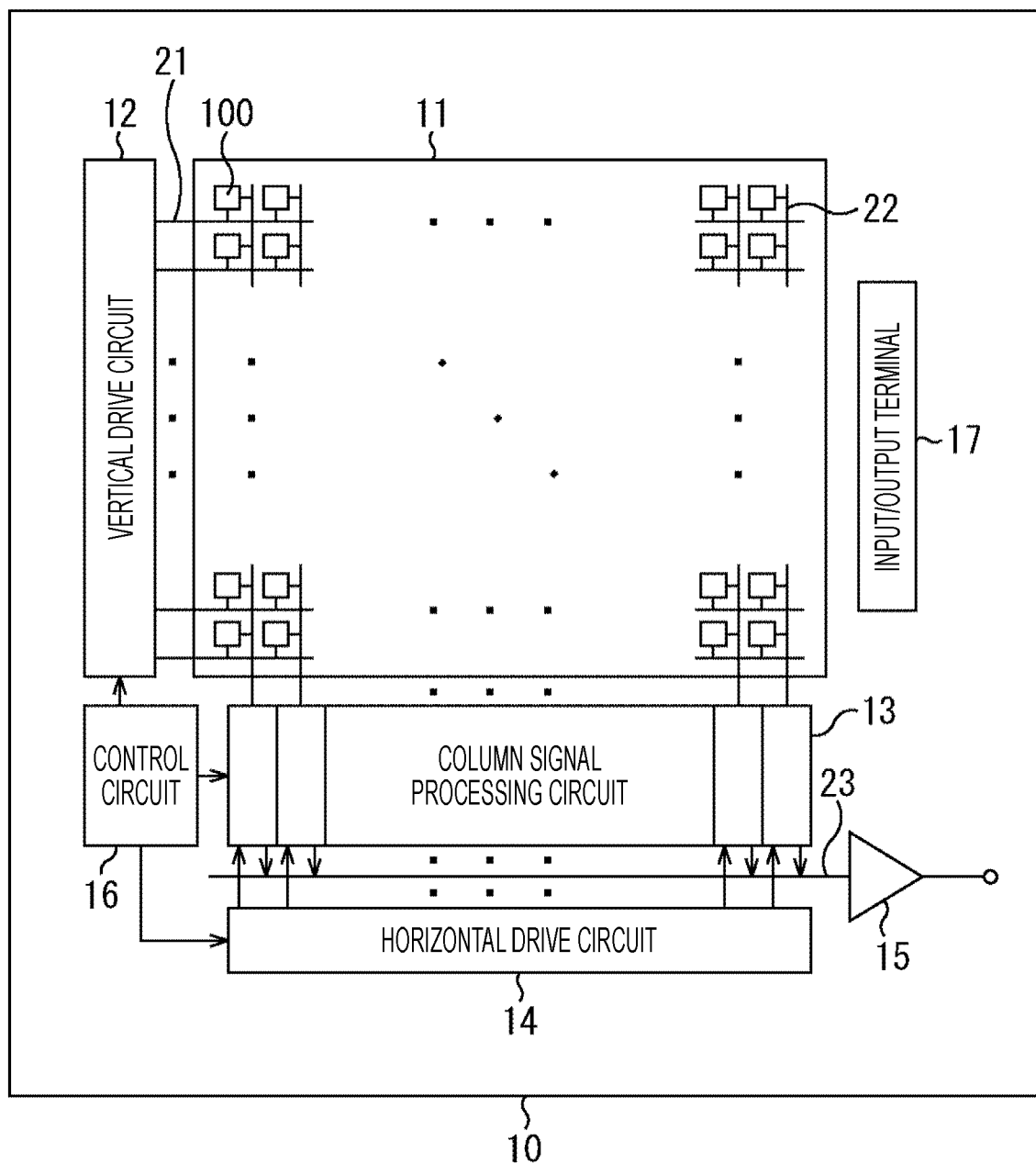
FIG. 1 is a block diagram illustrating an example of a configuration of an embodiment of a solid-state imaging element to which the present technology has been applied.

Embodiments of the present technology are described below with reference to the drawings. Note that the description is given in the order below.

1. First Embodiment: Pixel structure and drive control thereof

2. Second embodiment: Another drive control

3. Third embodiment: Another drive control

4. Fourth embodiment: Another drive control

5. Fifth embodiment: Configuration including correction processing

6. Sixth embodiment: Read function of pixel

7. Seventh embodiment: Another pixel structure and read function thereof

8. Variation

9. Configuration of electronic equipment

10. Example of use of solid-state imaging element

11. Application examples to mobile objects

12. Application example to endoscopic surgery system

1. First Embodiment (Configuration Example of Solid-State Imaging Element)

FIG. 1 is a block diagram illustrating an example of a configuration of an embodiment of a solid-state imaging element to which the present technology has been applied.

A solid-state imaging element 10 of FIG. 1 is configured as, for example, a CMOS image sensor using complementary metal oxide semiconductor (CMOS). The solid-state imaging element 10 takes in incident light (image light) from a subject through an optical lens system (not illustrated), converts the light amount of the incident light formed on an imaging surface into an electric signal on a pixel-by-pixel basis, and outputs the electric signal as a pixel signal.

In FIG. 1, the solid-state imaging element 10 includes a pixel array unit 11, a vertical drive circuit 12, a column signal processing circuit 13, a horizontal drive circuit 14, an output circuit 15, a control circuit 16, and an input/output terminal 17.

In the pixel array unit 11, a plurality of pixels 100 is arranged in a two-dimensional form (matrix form).

The vertical drive circuit 12 is configured by, for example, a shift register, selects a predetermined pixel drive line 21, supplies a drive signal (pulse) for driving the pixels 100 to the selected pixel drive line 21, and drives the pixels 100 in the unit of rows.

That is, the vertical drive circuit 12 sequentially selectively scans each pixel 100 of the pixel array unit 11 in the unit of rows in the vertical direction, and supplies a pixel signal based on electric charges (signal charges) generated corresponding to the received light amount in the photodiode (photoelectric conversion unit) of each pixel 100 to the column signal processing circuit 13 through a vertical signal line 22.

The column signal processing circuit 13 is arranged for each column of the pixels 100, and performs signal processing such as noise removal on the signals output from the pixels 100 of one row with respect to each pixel column. For example, the column signal processing circuit 13 performs signal processing such as correlated double sampling (CDS) for removing fixed pattern noise peculiar to pixels and analog digital (AD) conversion.

The horizontal drive circuit 14 includes, for example, a shift register, sequentially outputs horizontal scanning pulses to sequentially select each of the column signal processing circuits 13, and causes each of the column signal processing circuits 13 to output a pixel signal to a horizontal signal line 23.

The output circuit 15 performs signal processing on the signals sequentially supplied from each of the column signal processing circuits 13 through the horizontal signal line 23, and outputs the processed signals. Note that the output circuit 15 can be, for example, only buffered, or can be subjected to black level adjustment, column variation correction, various digital signal processing, and the like.

The control circuit 16 controls the operation of each unit of the solid-state imaging element 10.

Furthermore, the control circuit 16 generates a clock signal or a control signal that serves as a reference for operations of the vertical drive circuit 12, the column signal processing circuit 13, the horizontal drive circuit 14, and the like on the basis of a vertical synchronization signal, a horizontal synchronization signal, and a master clock signal. The control circuit 16 outputs the generated clock signal or control signal to the vertical drive circuit 12, the column signal processing circuit 13, the horizontal drive circuit 14, and the like.

The input/output terminal 17 exchanges signals with the outside.

The solid-state imaging element 10 configured as described above is a CMOS image sensor that employs a system called a column AD system in which the column signal processing circuit 13 that performs the CDS processing and the AD conversion processing is arranged for each pixel column. Furthermore, the solid-state imaging element 10 can be, for example, a backside illumination-type CMOS image sensor.

(Example of Pixel Structure)

Figure 2:
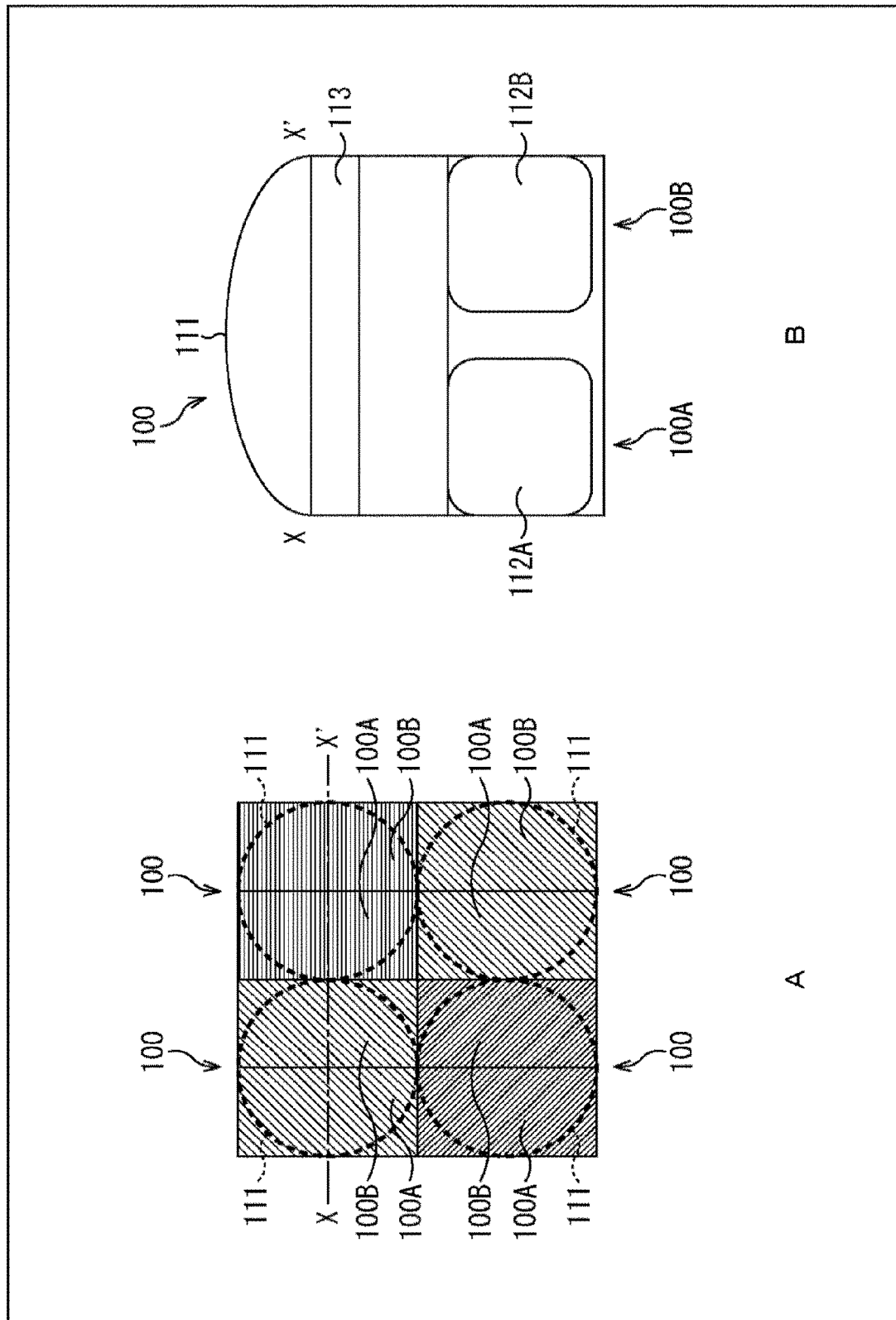
FIG. 2 is a view illustrating an example of a structure of a dual PD-type pixel.

FIG. 2 is a view illustrating an example of a structure of a dual PD-type pixel.

A of FIG. 2 illustrates a plan view of pixels 100 in two rows and two columns (2×2) arranged in a predetermined imaging region when viewed from the light incident side among the plurality of pixels 100 arranged in the pixel array unit 11. Furthermore, B of FIG. 2 illustrates a part of the X-X' cross-section of the pixel 100 illustrated in A of FIG. 2.

As illustrated in FIG. 2, the pixel 100 includes a structure in which a photodiode 112A and a photodiode 112B are provided in one on-chip lens 111 (hereinafter, also referred to as a dual PD-type structure). Note that the dual PD-type pixel 100 can be said to be a pixel portion including a left pixel 100A having a left photodiode 112A and a right pixel 100B having a right photodiode 112B (first pixel portion or second pixel portion). Furthermore, the on-chip lens is also called a microlens.

In the dual PD-type pixel 100, a pixel signal (A+B signal) generated by summing the electric charges accumulated in the photodiodes 112A and 112B is used as a signal for image acquisition and the pixel signal (A signal) obtained from the electric charges accumulated in the photodiode 112A and the pixel signal (B signal) obtained from the electric charges accumulated in the photodiode 112B can be independently read and used as a signal for phase difference detection.

As described above, the pixel 100 has a dual PD-type structure, and can be used for both purposes: a pixel for image acquisition (hereinafter referred to as an image acquisition pixel) and a pixel for phase difference detection (hereinafter referred to as a phase difference detection pixel). Note that, although details will be described later, even a pixel signal obtained from a phase difference detection pixel can be used as a signal for image acquisition by being subjected to correction processing.

Furthermore, as illustrated in the cross-sectional view of B of FIG. 2, the pixel 100 includes a color filter 113 below the on-chip lens 111, and is configured as an R pixel 100, a G pixel 100, or a B pixel 100 depending on the wavelength component transmitted by the color filter 113.

Note that the R pixel 100 is a pixel that generates an electric charge corresponding to a red (R) component light from the light that has passed through an R color filter 113 that transmits a red (R: Red) wavelength component. Furthermore, the G pixel 100 is a pixel that generates an electric charge corresponding to a green (G) component light from the light that has passed through a G color filter 113 that transmits a green (G: Green) wavelength component. Moreover, the B pixel 100 is a pixel that generates an electric charge corresponding to a blue (B) component light from the light that has passed through a B color filter 113 that transmits a blue (B: Blue) wavelength component.

In the pixel array unit 11, the R pixels 100, the G pixels 100, and the B pixels 100 can be arranged in an arrangement pattern such as a Bayer arrangement. For example, in the plan view of A of FIG. 2, among the 2×2 pixels 100, the upper left and lower right are G pixels 100, the lower left is the R pixel 100, and the upper right is the B pixel 100.

By the way, as a structure of the phase difference detection pixel, there is a shield-type structure. The shield-type pixel includes a structure in which a light-shielding portion including a metal such as tungsten (W) or aluminium (Al) is provided under the on-chip lens and this light-shielding portion shields the light for the left side region or the right side region when viewed from the light incident side. Then, in the pixel array unit, by disposing the left light-shielding pixels and the right light-shielding pixels having such a structure in a scattered manner, a left light-shielding pixel signal and a right light-shielding pixel signal are obtained as signals for phase difference detection.

Here, in the dual PD-type pixel illustrated in FIG. 2, in a case where either one of the electric charge accumulated in the photodiode 112A and the electric charge accumulated in the photodiode 112B is independently read, a pixel signal similar to the shield-type pixel can be obtained. That is, the pixel signal (A signal) corresponding to the right light-shielding pixel signal is obtained from the electric charge generated by the photodiode 112A, and the pixel signal (B signal) corresponding to the left light-shielding pixel signal is obtained from the electric charge generated by the photodiode 112B.

In the present technology, by utilizing the feature of such a dual PD-type pixel, some of the pixels 100 arranged in the pixel array unit 11 are configured to independently read at least one electric charge of the electric charge accumulated in the photodiode 112A or the electric charge accumulated in the photodiode 112B, and thus, as compared with the case where the reading configuration disclosed in Patent Document 1 described above is adopted, lower power consumption can be achieved.

Specifically, with the configuration disclosed in Patent Document 1 described above, in order to obtain a signal for phase difference detection, in part, the A signal and the B signal from the photodiodes A and B need to be separately read (reading twice). However, with the configuration of the present technology, one-time reading of the photodiodes 112A and 112B suffices, and thus it is possible to achieve lower power consumption because of the reduced number of times of reading.

However, the dual PD-type pixel has improved performance in low illuminance as compared with the shield-type pixel, but the accuracy of phase difference detection is lower than that in high illuminance. Therefore, for example, it is necessary to enable the signals for phase difference detection to be eventually obtained in all the pixels arranged in the pixel array unit 11 in association with a gain set in the solid-state imaging element 10.

Figure 3:
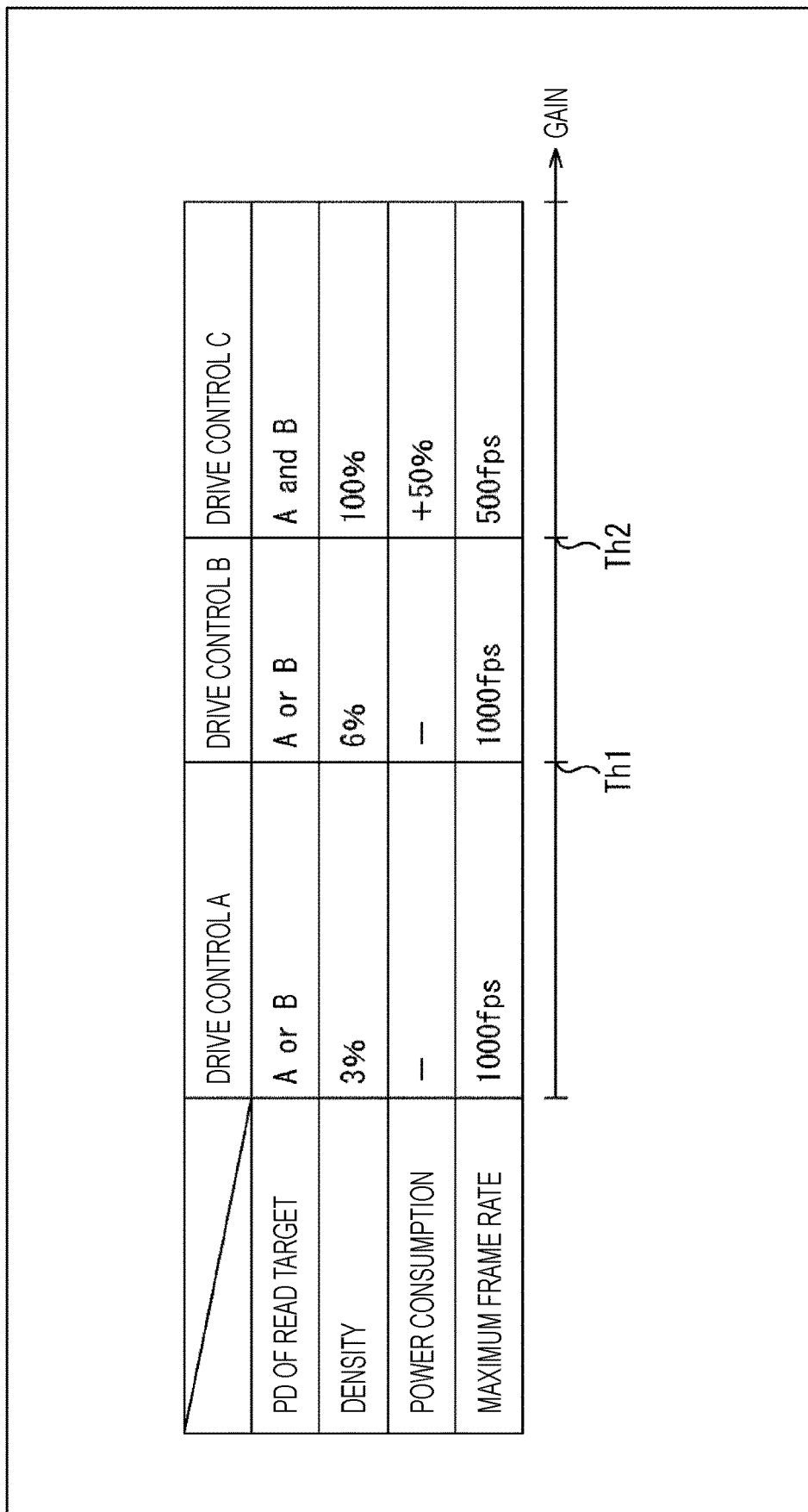
FIG. 3 is a table illustrating an example of driving pixels according to a first embodiment.

For example, as illustrated in FIG. 3, in a case where the gain set in the solid-state imaging element 10 is smaller than a first threshold value Th1, a drive control A is selected as a drive control method, and among all the pixels arranged in the pixel array unit 11, one of the photodiode 112A and the photodiode 112B is independently read in 3% of the pixels 100. At this time, 3% of the pixels 100 are used as the phase difference detection pixels, and in the remaining 97% of the pixels 100, both the photodiodes 112A and 112B are read and used as the image acquisition pixels.

Furthermore, for example, as illustrated in FIG. 3, in a case where the gain is larger than the first threshold value Th1 and smaller than a second threshold value Th2, a drive control B is selected, and among all the pixels arranged in the pixel array unit 11, one of the photodiode 112A and the photodiode 112B is independently read in 6% of the pixels 100. At this time, 6% of the pixels 100 are used as the phase difference detection pixels, and the remaining 94% of the pixels 100 are used as the image acquisition pixels.

Moreover, for example, as illustrated in FIG. 3, in a case where the gain is larger than the second threshold value Th2, a drive control C is selected, and in all the pixels arranged in the pixel array unit 11, the photodiodes 112A and 112B are read and signals for phase difference detection and signals for image acquisition are obtained. At this time, all the pixels (100% of the pixels) are used as the phase difference detection pixels and the image acquisition pixels.

Here, the gain set in the solid-state imaging element 10 is determined by detecting the average luminance on the basis of the output signal output from the solid-state imaging element 10. That is, the gain has a smaller value as the illuminance in the imaging region of the pixel array unit 11 increases. For example, when the illuminance is 1.25, 10, 20, 80 lux (lx), the gains are set to 60, 42, 36, and 24 dB, respectively, and when the illuminance exceeds 1280 lux (lx), the gain is set to 0 dB.

As described above, in the present technology, threshold value determination with respect to the gain set in the solid-state imaging element 10 is performed, and on the basis of results of the determination, among the pixels 100 arranged in the pixel array unit 11, in a predetermined density (for example, 3%, 6%, or the like) of the pixels 100, one of the photodiode 112A and the photodiode 112B is set to an independently read target.

Note that, for example, in a case where the gain is larger than the second threshold value Th2, the photodiodes 112A and 112B are read in all the pixels (100% of the pixels), but at normal illuminance, the gain will not be larger than the second threshold value Th2 (the second threshold value Th2 is set accordingly), the photodiodes 112A and 112B will not be read in all the pixels. That is, under normal illuminance conditions (for example, illuminance of 10 lux or more or 20 lux or more), the photodiode 112 only needs to be read once to obtain a signal for phase difference detection, and thus lower power consumption can be achieved.

Furthermore, as illustrated in FIG. 3, for example, comparing the drive control C with the drive control A and B, the power consumption is increased by 50%, but under normal illuminance conditions (e.g., illuminance of 10 lux or more or 20 or more), lower power consumption can be achieved.

Moreover, as illustrated in FIG. 3, maximum frame rates in a case where driving by the drive control A, the drive control B, and the drive control C is performed are 1000 fps, 1000 fps, and 500 fps, respectively. However, for example, in a case where driving by the drive control A and the drive control B is performed, as compared with the case where driving by the drive control C is performed, the frame rate can be increased and thus slow motion of 1000 fps or the like can be achieved.

Note that, in FIG. 3, an example is illustrated in which two threshold values (first threshold value Th1 and second threshold value Th2) are set and the pixels 100 arranged in the pixel array unit 11 are driven by the drive control methods in three stages (drive control A, B, C), but the number of threshold values is not limited thereto, and, for example, one threshold value may be provided and drive control may be performed in two stages or three or more threshold values may be provided and drive control may be performed in four or more stages. Moreover, the density of the phase difference detection pixels such as 3% and 6% is an example, and an arbitrary density (for example, a density that increases according to the gain) can be set for each drive control method at each stage.

Furthermore, in the above description, an example is illustrated in which in a case where the pixel 100 is used as a phase difference detection pixel, one of the photodiode 112A and the photodiode 112B is independently read, but the photodiode 112A and the photodiode 112B may be independently read. For example, in the drive control B illustrated in FIG. 3, in a case where the density of the phase difference detection pixels is low such as when the density of the pixels 100 used as the phase difference detection pixels is 6%, the photodiode 112A and the photodiode 112B may be independently read and the pixel signals (A signal and B signal) may be obtained. However, these reading methods can be changed for each drive control method at each stage.

Furthermore, in a case where imaging is performed a plurality of times, a hysteresis may be provided for the threshold value, and for example, in comparing the set gain and the threshold value, even when the threshold value is changed a bit at a stage where the gain first exceeds the threshold value and the gain obtained thereafter varies to some extent, the gain may be kept above the threshold value. By providing such hysteresis, it is possible to prevent excessive switching of the distance measurement methods.

(Performance Difference Between Types of Pixel)

Figure 4:
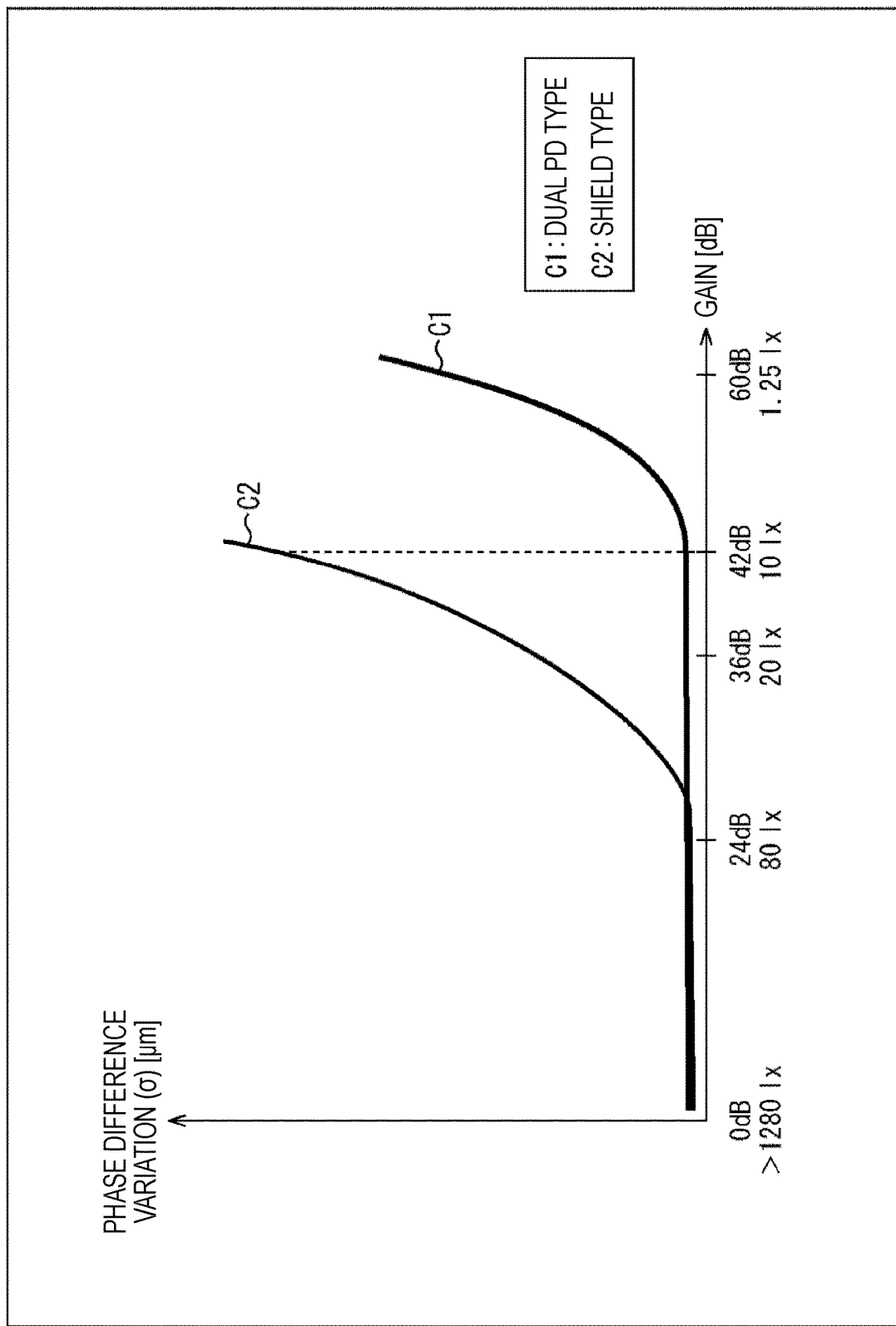
FIG. 4 is a graph indicating evaluation results of performance for each type of pixel.

FIG. 4 illustrates a graph illustrating evaluation results of the performance for each type of pixel.

In FIG. 4, the horizontal axis represents gain (unit: dB), and the value increases from the left side to the right side in the drawing. Furthermore, the vertical axis represents variation ($\sigma$) (unit: μm) in phase difference detection, meaning that the variation increases toward the upper side in the drawing.

In FIG. 4, a curve C1 illustrates the characteristics of a dual PD-type pixel, and a curve C2 illustrates the characteristics of a shield-type pixel.

Here, for example, focusing on a high illuminance region where the illuminance is greater than 80 lux (lx), under such high illuminance conditions, in the dual PD-type pixel and the shield-type pixel, the values of the variation ($\sigma$) for phase difference detection are almost the same, and almost the same performance can be obtained.

On the other hand, for example, focusing on a low illuminance region near 10 lux (lx), under such low illuminance conditions, the value of the variation ($\sigma$) for phase difference detection is larger in the shield-type pixel than in the dual PD-type pixel, and therefore the performance is low.

As described above, under high illuminance conditions, AF performance (performance of phase difference detection) does not deteriorate even with a pixel structure having a low density such as a shield-type pixel. Then, in the present technology, by utilizing the characteristics of such a pixel, under a high illuminance condition, some of the pixels 100 arranged in the pixel array unit 11 are configured to independently read at least one electric charge of the electric charge accumulated in the photodiode 112A or the electric charge accumulated in the photodiode 112B.

Therefore, with the configuration of the present technology, even in a case where the dual PD-type pixel is used, the photodiodes 112A and 112B need only be read once to obtain the signal for phase difference detection. Therefore, it is possible to reduce power consumption under high illuminance without reducing the distance measurement performance. Furthermore, since it is not necessary to separately read the pixel signals (A signal and B signal) from the photodiodes 112A and 112B (read twice), as compared with the case where the reading configuration disclosed in Patent Document 1 described above is adopted, it is possible to achieve higher speed.

In other words, with the configuration of the present technology, in the case of low illuminance, signals for phase difference detection are detected in all the pixels 100, and in the case of high illuminance, signals for phase difference detection are detected in the discrete pixels 100. Therefore, even if the illuminance is low, the distance measurement performance can be maintained, and in the case of the high illuminance, the power consumption can be suppressed without deteriorating the distance measurement performance as compared with the case where the signals for phase difference detection are obtained in all the pixels.

2. Second Embodiment

By the way, since the accuracy of the phase difference detection depends on shot noise, the drive control of the pixel 100 may be linked with not only the gain, but also the luminance level. Therefore, in the second embodiment, the driving of the pixels 100 arranged in the pixel array unit 11 is controlled on the basis of the gain set in the solid-state imaging element 10 and the luminance level.

(Configuration Example of the Imaging Apparatus)

Figure 5:
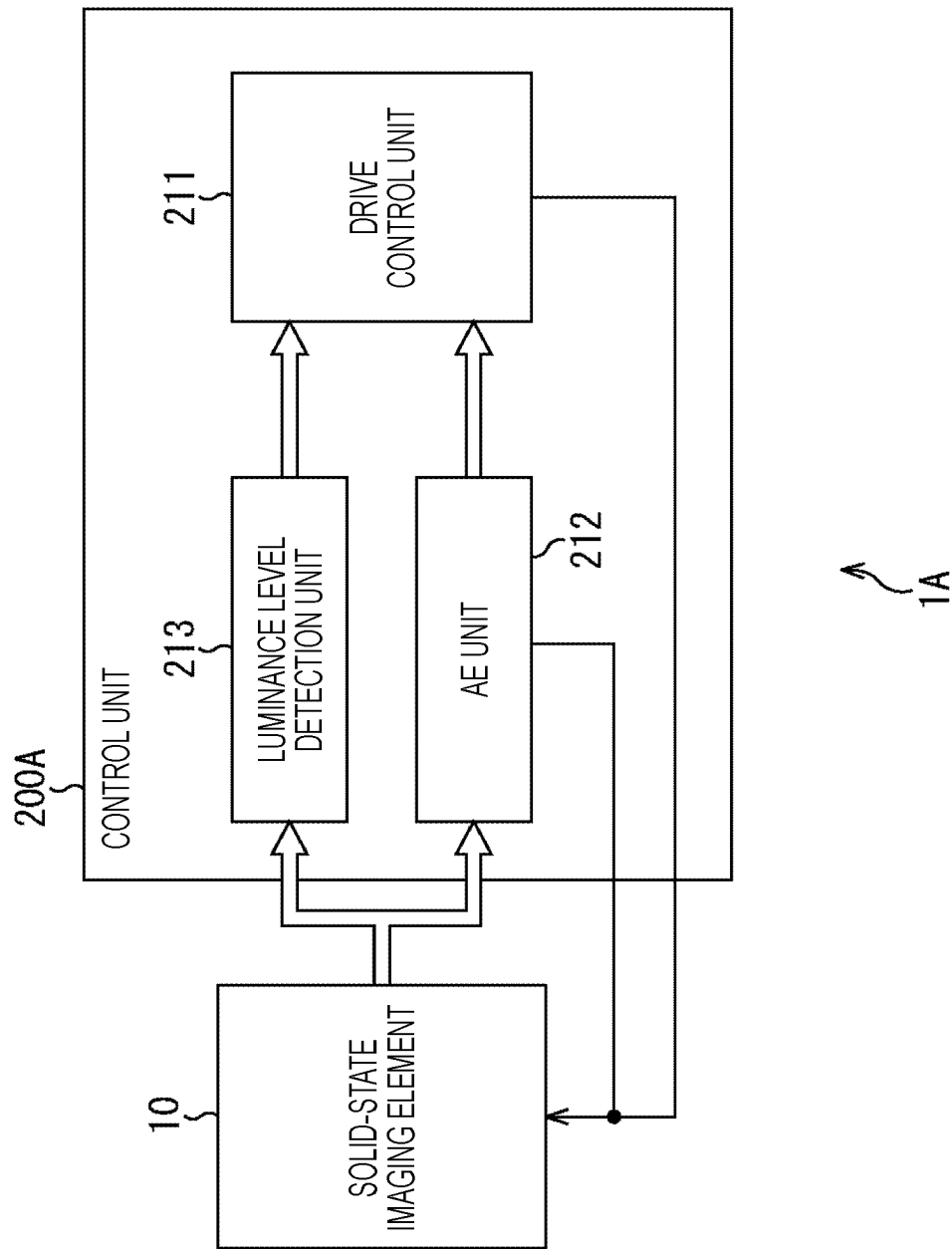
FIG. 5 is a block diagram illustrating an example of a configuration of an imaging apparatus according to a second embodiment.

FIG. 5 is a block diagram illustrating an example of a configuration of the imaging apparatus according to the second embodiment.

In FIG. 5, an imaging apparatus 1A includes the solid-state imaging element 10 (FIG. 1) and a control unit 200A.

The control unit 200A includes, for example, a control circuit such as a microcontroller. The control unit 200A includes a drive control unit 211, an AE unit 212, and a luminance level detection unit 213.

The AE unit 212 performs processing related to the auto exposure (AE) function on the basis of the output signal output from the solid-state imaging element 10. For example, the AE unit 212 detects the average luminance on the basis of the output signal from the solid-state imaging element 10, and determines the gain according to the detection result.

The AE unit 212 supplies the determined gain to the solid-state imaging element 10 and the drive control unit 211. Note that this gain is, for example, for controlling the shutter speed of the solid-state imaging element 10 and can be said to be exposure information.

The luminance level detection unit 213 detects the luminance level in a screen on the basis of the output signal output from the solid-state imaging element 10, and supplies the detection result to the drive control unit 211. Note that the luminance level in the screen is, for example, the luminance level of a captured image displayed in the screen in a case where the imaging apparatus 1A has a display screen, that is, the luminance level of a target region (local region) in a target image frame.

The drive control unit 211 is supplied with the gain from the AE unit 212 and the luminance level from the luminance level detection unit 213. The drive control unit 211 generates a drive control signal for controlling the drive of the pixels 100 arranged in the pixel array unit 11 of the solid-state imaging element 10 on the basis of the gain and the luminance level supplied thereto, and supplies the drive control signal to the solid-state imaging element 10.

Here, in the AE unit 212, gain control is performed on the basis of the detected average luminance (entire luminance), that is, the exposure amount obtained from an image frame preceding the target image frame. For example, in this gain control, the control for increasing the gain is performed in the case of being dark (low illuminance), and the control for reducing the gain is performed in the case of being bright (high illuminance). Therefore, it can be said that the AE unit 212 corresponds to an illuminance detection unit that detects the illuminance in the imaging region of the pixel array unit 11 on the basis of the exposure amount obtained from the previous image frame. Furthermore, the luminance level detection unit 213 obtains the luminance level in a target region (local region).

Then, when the screen (in the target image frame) is captured in a local region, because there are bright regions and dark regions, the drive control unit 211 can control the drive of the pixels 100 in association with not only the illuminance used for gain control, but also the luminance level in the screen. For example, in the screen, a white subject has a high luminance level, while a black subject has a low luminance level, but shot noise increases when the luminance level is low (variation in phase difference detection is large). Therefore, the drive control unit 211 causes more phase difference detection pixels to be used.

The solid-state imaging element 10 controls the shutter speed on the basis of the gain supplied from the AE unit 212 of the control unit 200A. Furthermore, the solid-state imaging element 10 drives the pixels 100 arranged in the pixel array unit 11 on the basis of the drive control signal supplied from the drive control unit 211 of the control unit 200A.

(Example of Driving Pixels)

Figure 6:
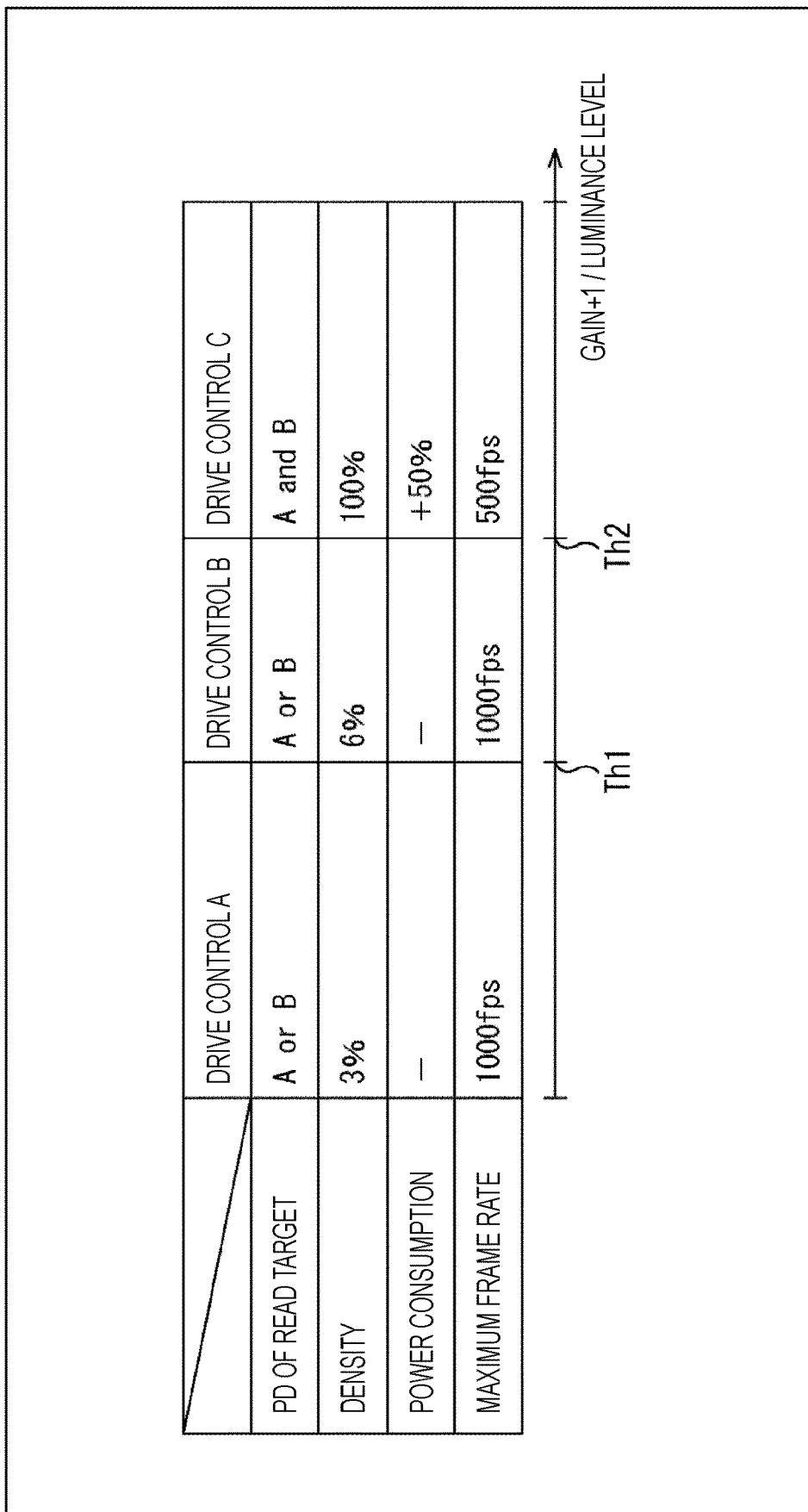
FIG. 6 is a table illustrating an example of driving pixels according to the second embodiment.

FIG. 6 illustrates an example of pixel drive control according to the second embodiment.

For example, the drive control unit 211 calculates the following formula (1) on the basis of the gain and the luminance level supplied thereto, and performs a threshold value determination on the calculation result. Then, the drive control unit 211 controls the drive of the pixels 100 arranged in the pixel array unit 11 of the solid-state imaging element 10 on the basis of the determination result.

$$\text{Gain}+1/\text{Luminance level} \quad (1)$$

Here, in Formula (1), the "Gain" of the first term becomes a smaller value as the illuminance in the imaging region of the pixel array unit 11 becomes larger, and the value of the calculation result also becomes smaller, and the gain becomes a larger value as the illuminance in the imaging region becomes smaller, and the value of the calculation result also becomes larger. Furthermore, in Formula (1), the second term is expressed by "+1/Luminance level". Therefore, the value of the calculation result becomes larger as the luminance level in the target region (local region) in the screen (in the target image frame) is lower.

For example, in a case where the calculation result of Formula (1) is smaller than the first threshold value Th1, the drive control unit 211 follows the drive control A to control the drive of the pixels 100 such that, among all the pixels arranged in the pixel array unit 11, 3% of the pixels 100 operate as phase difference detection pixels and the remaining 97% of the pixels 100 operate as image acquisition pixels.

At this time, in the solid-state imaging element 10, in the pixels 100 (3% of the pixels) that operate as phase difference detection pixels, the electric charges accumulated in one of the photodiode 112A of the left pixel 100A and the photodiode 112B of the right pixel 100B are read independently.

Furthermore, for example, when the calculation result of Formula (1) is larger than the first threshold value Th1 and smaller than the second threshold value Th2, the drive control unit 211 follows the drive control B to control the drive of the pixels 100 such that, among all the pixels arranged in the pixel array unit 11, 6% of the pixels 100 operate as phase difference detection pixels and the remaining 94% of the pixels 100 operate as image acquisition pixels.

At this time, in the solid-state imaging element 10, in the pixels 100 (6% of the pixels) that operate as phase difference detection pixels, the electric charges accumulated in one of the photodiode 112A of the left pixel 100A and the photodiode 112B of the right pixel 100B are read independently.

Moreover, for example, in a case where the calculation result of Formula (1) is larger than the second threshold value Th2, the drive control unit 211 follows the drive control C to control the drive of the pixels 100 such that all the pixels (100% of the pixels) arranged in the pixel array unit 11 operate as both pixels: phase difference detection pixels and image acquisition pixels.

At this time, in the solid-state imaging element 10, in all the pixels (100% of the pixels), the electric charges accumulated in the photodiode 112A of the left pixel 100A and the photodiode 112B of the right pixel 100B are read.

As described above, in the second embodiment, threshold value determination with respect to the calculation result of Formula (1) using the gain and the luminance level is performed, and on the basis of results of the determination, among the pixels 100 arranged in the pixel array unit 11, in a predetermined density (for example, 3%, 6%, or the like) of the pixels 100, one of the photodiode 112A and the photodiode 112B is set to an independently read target.

That is, in a case where the dual PD-type pixels 100 are arranged in the pixel array unit 11, in a case where the calculation result of Formula (1) is larger than a predetermined threshold value (for example, the second threshold value Th2), all the pixels 100 operate as phase difference detection pixels, but in a case where the calculation result of Formula (1) is smaller than a predetermined threshold value (for example, the first threshold value Th1 or the second threshold value Th2), only the specific pixels 100 arranged in a scattered manner (in a repeating pattern) operate as phase difference detection pixels.

When such driving is performed, in a case where the accuracy of phase difference detection is low, for example, at the time of low illuminance or due to low luminance level of the target region, signals for phase difference detection are detected in more number of pixels 100, and, in a case where the accuracy of phase difference detection is high, for example, at the time of high illuminance or due to high luminance level of the target region, signals for phase difference detection are detected in the discrete pixels 100. Therefore, it is possible to achieve lower power consumption at high illuminance and high speed without reducing the distance measurement performance.

Note that, also in FIG. 6, the number of threshold values used in the threshold value determination is arbitrary, and furthermore a hysteresis may be provided for the threshold value. Furthermore, the above Formula (1) is an example of an arithmetic expression using the gain and the luminance level, and another arithmetic expression to which a function such as logarithm is applied may be used, for example. Furthermore, in the imaging apparatus 1A of the second embodiment illustrated in FIG. 5, the configuration excluding the luminance level detection unit 213 corresponds to the configuration described in the first embodiment described above, that is, the configuration for controlling the drive of the pixels 100 arranged in the pixel array unit 11 on the basis of results of the threshold value determination using the gain.

Furthermore, in FIG. 6, similarly to FIG. 3 described above, for example, in the drive control B, in a case where the density of the pixels 100 used as the phase difference detection pixels is 6%, the photodiode 112A and the photodiode 112B are independently read so that pixel signals (A signal and B signal) can be obtained and used as signals for phase difference detection.

3. Third Embodiment

Furthermore, as described above, since the accuracy of the phase difference detection depends on shot noise, the drive control of the pixel 100 may be linked with the number of pixels 100 that have operated as phase difference detection pixels in addition to the gain and the luminance level. Therefore, in the third embodiment, the driving of the pixels 100 arranged in the pixel array unit 11 is controlled on the basis of the gain set in the solid-state imaging element 10, the luminance level, and the number of phase difference detection pixels.

(Configuration Example of the Imaging Apparatus)

Figure 7:
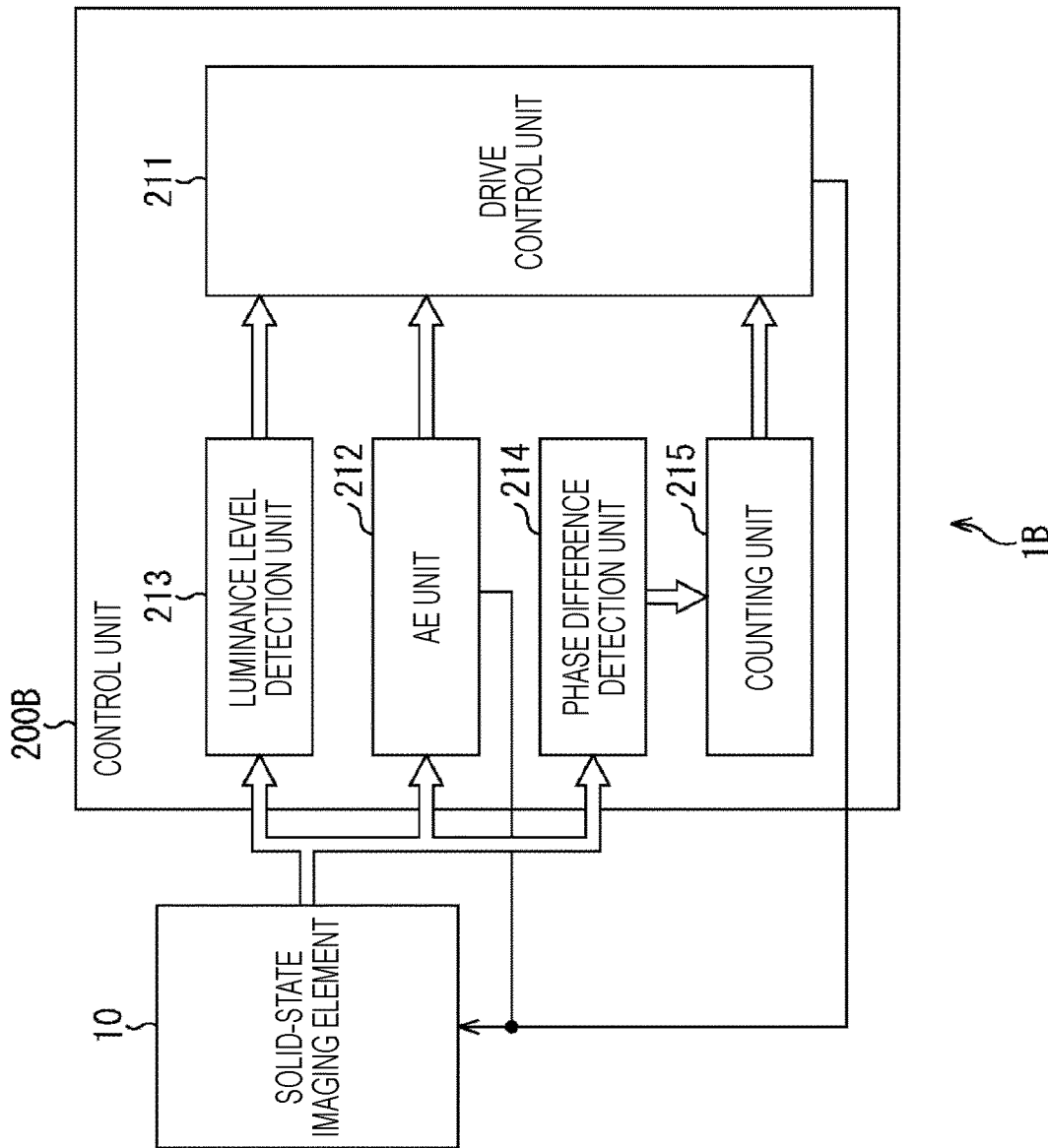
FIG. 7 is a block diagram illustrating an example of a configuration of an imaging apparatus according to a third embodiment.

FIG. 7 is a block diagram illustrating an example of a configuration of the imaging apparatus according to the third embodiment.

In FIG. 7, an imaging apparatus 1B includes the solid-state imaging element 10 (FIG. 1) and a control unit 200B.

In comparison to the control unit 200A (FIG. 5), the control unit 200B further includes a phase difference detection unit 214 and a counting unit 215 in addition to the drive control unit 211, the AE unit 212, and the luminance level detection unit 213.

The phase difference detection unit 214 detects the phase difference on the basis of the output signal (signal for phase difference detection) output from the solid-state imaging element 10, and outputs the detection result to a circuit (not illustrated) in a subsequent stage. Furthermore, the phase difference detection unit 214 supplies the information associated with the effective phase difference detection pixel obtained at the time of the phase difference detection (hereinafter, referred to as effective phase difference pixel information) to the counting unit 215.

The counting unit 215, on the basis of the effective phase difference pixel information supplied from the phase difference detection unit 214, among the pixels 100 that have operated as the phase difference detection pixels, counts the number of effective phase difference detection pixels, and supplies the count result (the number of effective phase difference detection pixels) to the drive control unit 211.

The drive control unit 211 is supplied with the count result from the counting unit 215 in addition to the gain from the AE unit 212 and the luminance level from the luminance level detection unit 213. The drive control unit 211 generates a drive control signal for controlling the drive of the pixels 100 on the basis of the gain, the luminance level, and the number of effective phase difference detection pixels supplied thereto, and supplies the drive control signal to the solid-state imaging element 10.

Here, since the phase difference detection unit 214 cannot effectively detect the phase difference unless, for example, the edge of a subject image can be discriminated, the counting unit 215 counts the number of phase difference detection pixels used for effective phase difference detection on the basis of the effective phase difference pixel information.

Then, the drive control unit 211 can control the drive of the pixels 100 in association with not only the illuminance used for gain control and the luminance level in the screen, but also the number of effective phase difference detection pixels. For example, when the number of effective phase difference detection pixels is small, the variation in phase difference detection increases, and therefore the drive control unit 211 uses more phase difference detection pixels.

(Example of Driving Pixels)

Figure 8:
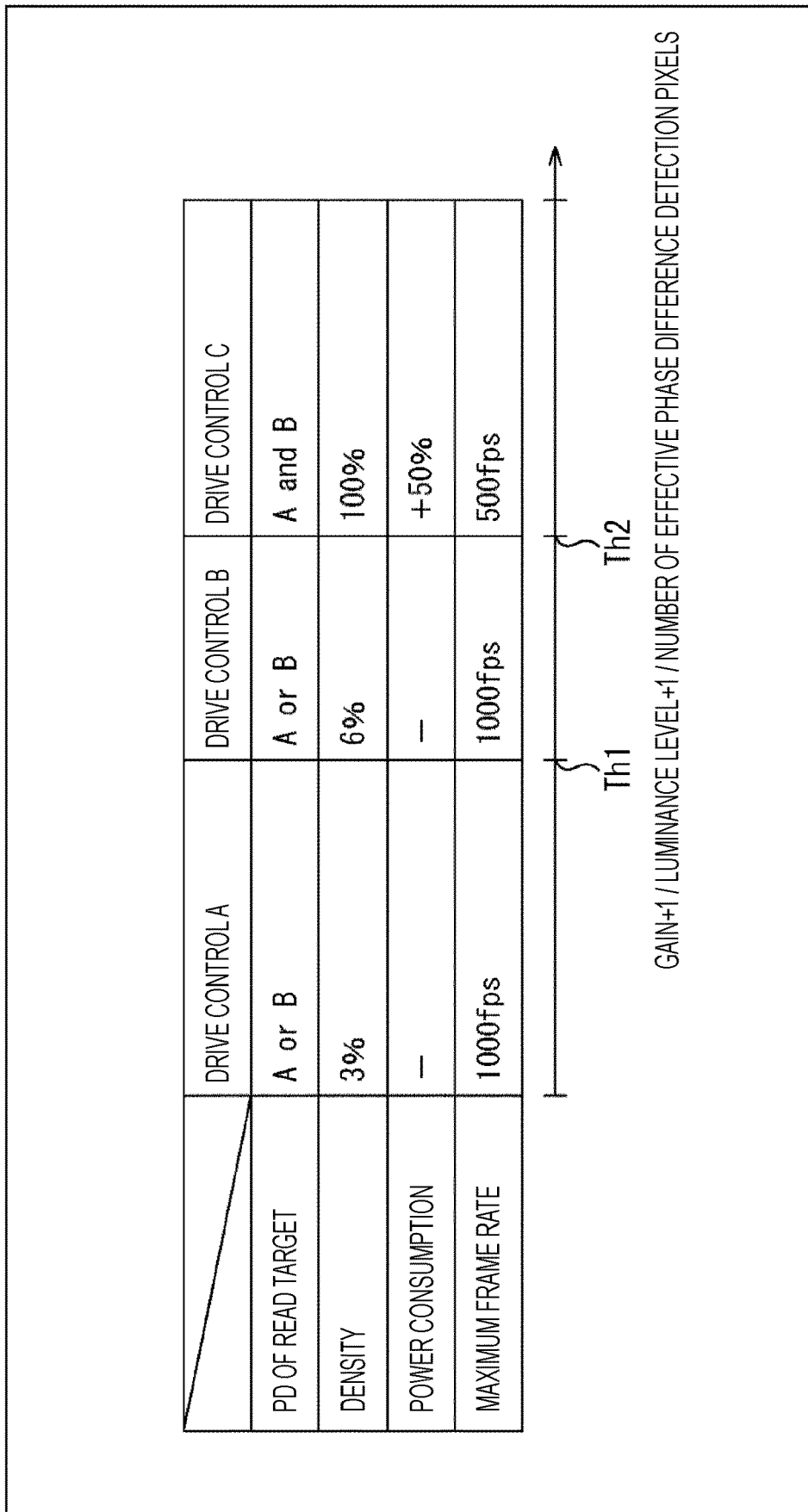
FIG. 8 is a table illustrating an example of driving pixels according to the third embodiment.

FIG. 8 illustrates an example of pixel drive control according to the third embodiment.

For example, the drive control unit 211 calculates the following formula (2) on the basis of the gain, the luminance level, and the number of effective phase difference detection pixels supplied thereto, and performs a threshold value determination on the calculation result. Then, the drive control unit 211 controls the drive of the pixels 100 arranged in the pixel array unit 11 of the solid-state imaging element 10 on the basis of the determination result.

$$\text{Gain}+1/\text{Luminance level}+1/\text{Number of effective phase difference detection pixels} \quad (2)$$

Here, in Formula (2), the first term and the second term are similar to Formula (1) described above, and the third term is represented by "1/Number of effective phase difference detection pixels", and therefore the smaller the number of effective phase difference detection pixels, the larger the value of the calculation result.

For example, in a case where the calculation result of Formula (2) is smaller than the first threshold value Th1, the drive control unit 211 follows the drive control A to control the drive of the pixels 100 such that, among all the pixels arranged in the pixel array unit 11, 3% of the pixels 100 operate as phase difference detection pixels.

Furthermore, for example, in a case where the calculation result of Formula (2) is larger than the first threshold value Th1 and smaller than the second threshold value Th2, the drive control unit 211 follows the drive control B to control the drive of the pixels 100 such that, among all the pixels arranged in the pixel array unit 11, 6% of the pixels 100 operate as phase difference detection pixels.

Moreover, for example, in a case where the calculation result of Formula (2) is larger than the second threshold value Th2, the drive control unit 211 follows the drive control C to control the drive of the pixels 100 such that all the pixels (100% of the pixels) arranged in the pixel array unit 11 operate as both pixels: phase difference detection pixels and image acquisition pixels.

As described above, in the third embodiment, threshold value determination with respect to the calculation result of Formula (2) using the gain, the luminance level, and the number of effective phase difference detection pixels is performed, and on the basis of results of the determination, among the pixels 100 arranged in the pixel array unit 11, in a predetermined density (for example, 3%, 6%, or the like) of the pixels 100, one of the photodiode 112A and the photodiode 112B is set to an independently read target.

That is, in a case where the dual PD-type pixels 100 are arranged in the pixel array unit 11, in a case where the calculation result of Formula (2) is larger than a predetermined threshold value (for example, the second threshold value Th2), all the pixels 100 operate as phase difference detection pixels, but in a case where the calculation result of Formula (2) is smaller than a predetermined threshold value (for example, the first threshold value Th1 or the second threshold value Th2), only the specific pixels 100 arranged in a scattered manner (in a repeating pattern) operate as phase difference detection pixels.

When such driving is performed, in a case where the accuracy of phase difference detection is low, for example, due to a small number of effective phase difference detection pixels, signals for phase difference detection are detected in more number of pixels 100, and, in a case where the accuracy of phase difference detection is high, for example, due to a large number of effective phase difference detection pixels, signals for phase difference detection are detected in the discrete pixels 100. Therefore, it is possible to achieve lower power consumption at high illuminance and high speed without reducing the distance measurement performance.

Note that, also in FIG. 8, the number of threshold values used in the threshold value determination is arbitrary, and furthermore a hysteresis can be provided for the threshold value. Furthermore, the above Formula (2) is an example of an arithmetic expression using the gain, the luminance level, and the number of phase difference detection pixels, and another arithmetic expression to which a function such as logarithm is applied may be used, for example. Moreover, in the above Formula (2), it is described that the calculation using the gain, the luminance level, and the number of phase difference detection pixels is performed, but calculation using at least one calculation target among these calculation targets may be performed.

Furthermore, in FIG. 8, similarly to FIG. 3 described above, for example, in the drive control B, in a case where the density of the pixels 100 used as the phase difference detection pixels is 6%, the photodiode 112A and the photodiode 112B are independently read so that pixel signals (A signal and B signal) can be obtained and used as signals for phase difference detection.

4. Fourth Embodiment

Furthermore, as described above, since the accuracy of the phase difference detection depends on shot noise, the drive control of the pixel 100 may be linked with (the number of pixels included in) a ROI area corresponding to the AF area corresponding to the phase difference detection pixels in addition to the gain and the luminance level. Therefore, in the fourth embodiment, the driving of the pixels 100 arranged in the pixel array unit 11 is controlled on the basis of the gain set in the solid-state imaging element 10, the luminance level, and the ROI area.

(Configuration Example of the Imaging Apparatus)

Figure 9:
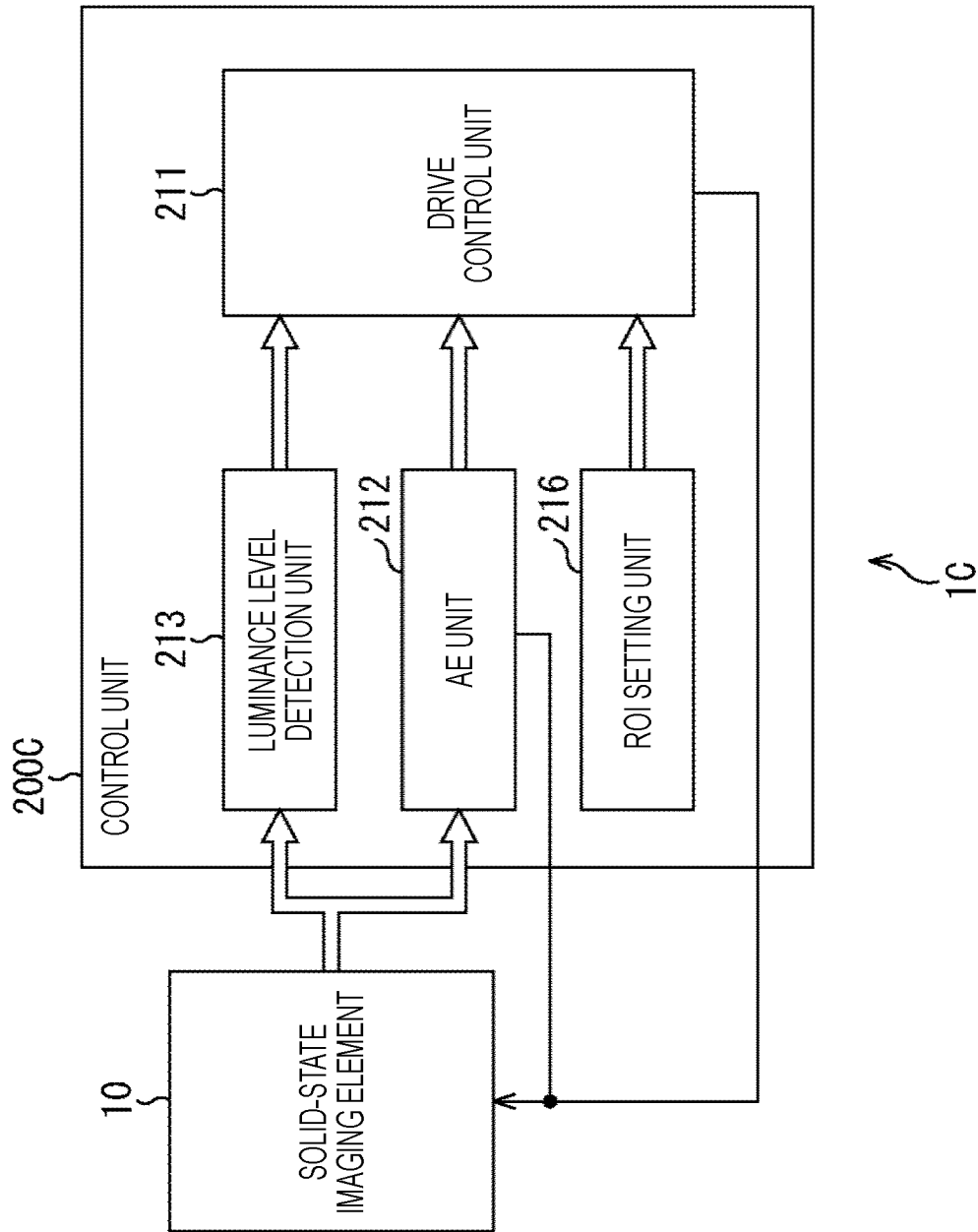
FIG. 9 is a block diagram illustrating an example of a configuration of an imaging apparatus according to a fourth embodiment.

FIG. 9 is a block diagram illustrating an example of a configuration of the imaging apparatus according to the fourth embodiment.

In FIG. 9, an imaging apparatus 1C includes the solid-state imaging element 10 (FIG. 1) and a control unit 200C.

In comparison to the control unit 200A (FIG. 5), the control unit 200C further includes a ROI setting unit 216 in addition to the drive control unit 211, the AE unit 212, and the luminance level detection unit 213.

The ROI setting unit 216 sets a region of interest (ROI). The ROI setting unit 216 acquires information associated with the ROI area (hereinafter referred to as ROI area information) on the basis of the setting information of the ROI, and supplies it to the drive control unit 211. Note that the ROI area is the size of a region of interest (ROI) in the target image frame.

The drive control unit 211 is supplied with the ROI area information from the ROI setting unit 216 in addition to the gain from the AE unit 212 and the luminance level from the luminance level detection unit 213. The drive control unit 211 generates a drive control signal for controlling the drive of the pixels 100 on the basis of the gain, the luminance level, and the ROI area information supplied thereto, and supplies the drive control signal to the solid-state imaging element 10.

Here, for example, in a case where the imaging apparatus 1C has a function (touch AF function) for a user to touch a screen with a finger to select a subject to be focused, the ROI setting unit 216 acquires the ROI area corresponding to the area of the AF area for the subject selected by the user.

Then, the drive control unit 211 can control the drive of the pixels 100 in association with not only the illuminance used for gain control and the luminance level in the screen, but also the ROI area. For example, when the ROI area is small, the variation in phase difference detection increases, and therefore the drive control unit 211 uses more phase difference detection pixels.

(Example of Driving Pixels)

Figure 10:
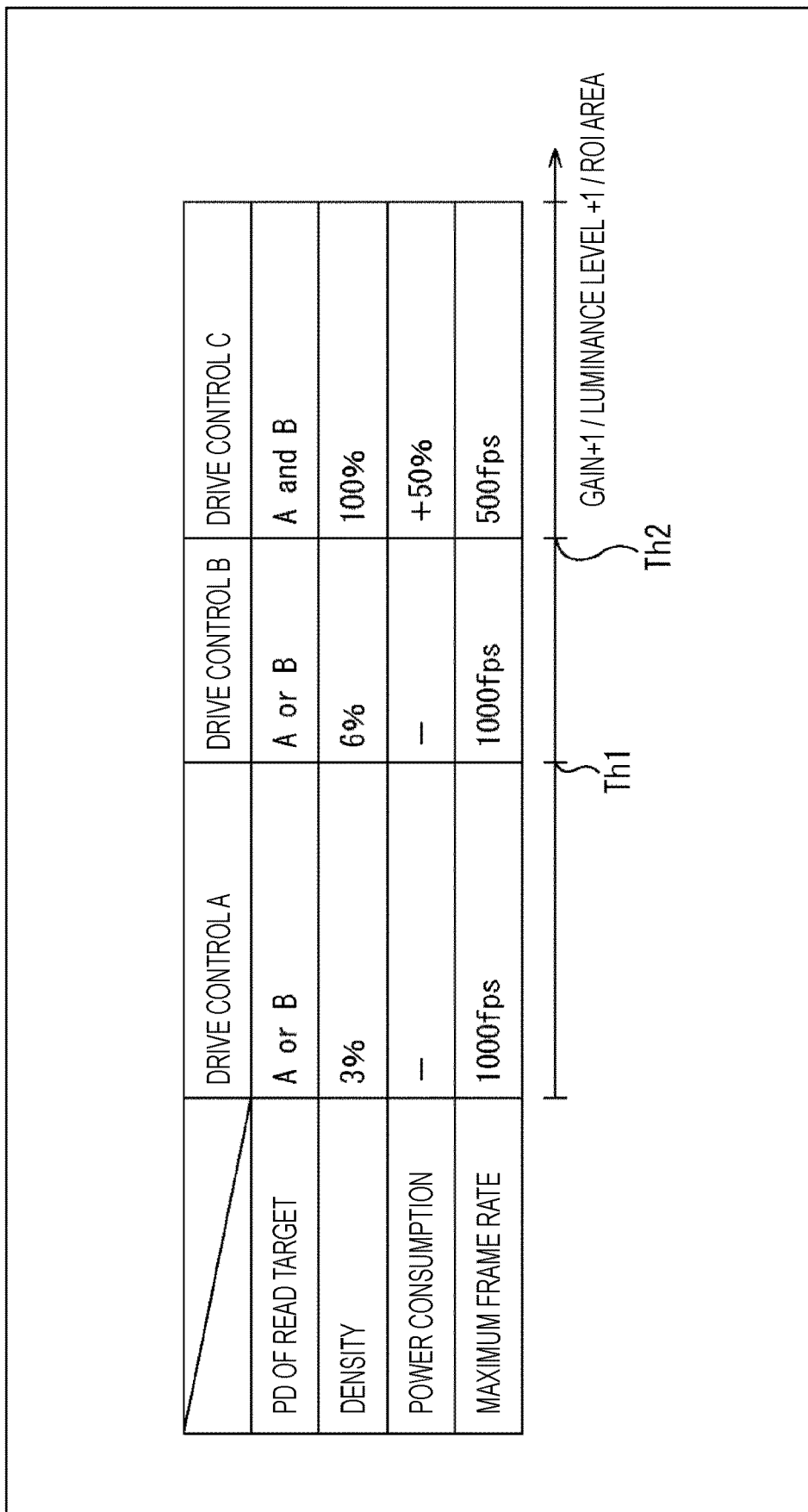
FIG. 10 is a table illustrating an example of driving pixels according to the fourth embodiment.

FIG. 10 illustrates an example of pixel drive control according to the fourth embodiment.

For example, the drive control unit 211 calculates the following formula (3) on the basis of the gain, the luminance level, and the ROI area information supplied thereto, and performs a threshold value determination on the calculation result. Then, the drive control unit 211 controls the drive of the pixels 100 arranged in the pixel array unit 11 of the solid-state imaging element 10 on the basis of the determination result.

$$\text{Gain}+1/\text{Luminance level}+1/\text{ROI area} \quad (3)$$

Here, in Formula (3), the first term and the second term are similar to Formula (1) described above, and the third term is represented by "1/ROI area", and therefore the smaller the (size of) the ROI area, the larger the value of the calculation result.

For example, in a case where the calculation result of Formula (3) is smaller than the first threshold value Th1, the drive control unit 211 follows the drive control A to control the drive of the pixels 100 such that, among all the pixels arranged in the pixel array unit 11, 3% of the pixels 100 operate as phase difference detection pixels.

Furthermore, for example, in a case where the calculation result of Formula (3) is larger than the first threshold value Th1 and smaller than the second threshold value Th2, the drive control unit 211 follows the drive control B to control the drive of the pixels 100 such that, among all the pixels arranged in the pixel array unit 11, 6% of the pixels 100 operate as phase difference detection pixels.

Moreover, for example, in a case where the calculation result of Formula (3) is larger than the second threshold value Th2, the drive control unit 211 follows the drive control C to control the drive of the pixels 100 such that all the pixels (100% of the pixels) arranged in the pixel array unit 11 operate as both pixels: phase difference detection pixels and image acquisition pixels.

As described above, in the fourth embodiment, threshold value determination with respect to the calculation result of Formula (3) using the gain, the luminance level, and the ROI area is performed, and on the basis of results of the determination, among the pixels 100 arranged in the pixel array unit 11, in a predetermined density (for example, 3%, 6%, or the like) of the pixels 100, one of the photodiode 112A and the photodiode 112B is set to an independently read target.

That is, in a case where the dual PD-type pixels 100 are arranged in the pixel array unit 11, in a case where the calculation result of Formula (3) is larger than a predetermined threshold value (for example, the second threshold value Th2), all the pixels 100 operate as phase difference detection pixels, but in a case where the calculation result of Formula (3) is smaller than a predetermined threshold value (for example, the first threshold value Th1 or the second threshold value Th2), only the specific pixels 100 arranged in a scattered manner (in a repeating pattern) operate as phase difference detection pixels.

When such driving is performed, in a case where the accuracy of phase difference detection is low, for example, due to a small ROI area, signals for phase difference detection are detected in more number of pixels 100, and, in a case where the accuracy of phase difference detection is high, for example, due to a large ROI area, signals for phase difference detection are detected in the discrete pixels 100. Therefore, it is possible to achieve lower power consumption at high illuminance and high speed without reducing the distance measurement performance.

Furthermore, by using the ROI area for the threshold value determination, for example, it becomes possible to control the drive according to the illuminance of the region to be focused on within the entire screen, and therefore distance measurement performance can be further increased.

Note that, also in FIG. 10, the number of threshold values used in the threshold value determination is arbitrary, and furthermore a hysteresis can be provided for the threshold value. Furthermore, the above Formula (3) is an example of an arithmetic expression using the gain, the luminance level, and the ROI area, and another arithmetic expression to which a function such as logarithm is applied may be used, for example.

Moreover, in the above Formula (3), it is described that the calculation using the luminance level, the gain, and the ROI area is performed, but calculation using at least one calculation target among these calculation targets may be performed. Furthermore, the number of effective phase difference detection pixels may be used together with the ROI area in addition to the gain and the luminance level by combining Formulae (2) and (3).

Furthermore, in FIG. 10, similarly to FIG. 3 described above, for example, in the drive control B, in a case where the density of the pixels 100 used as the phase difference detection pixels is 6%, the photodiode 112A and the photodiode 112B are independently read so that pixel signals (A signal and B signal) can be obtained and used as signals for phase difference detection.

5. Fifth Embodiment

By the way, in a case where the drive control of the pixels 100 is performed on the basis of the drive control A and the drive control B described above, and partially, the photodiode 112A of the left pixel 100A or the photodiode 112B of the right pixel 100B is independently read, the pixel signals independently read from one of the photodiode 112A and the photodiode 112B cannot be used as they are for a captured image, and thus correction is needed. Therefore, in the fifth embodiment, a configuration of the case where correction processing is performed on an output signal output from the solid-state imaging element 10 will be described.

(Configuration Example of the Imaging Apparatus)

Figure 11:
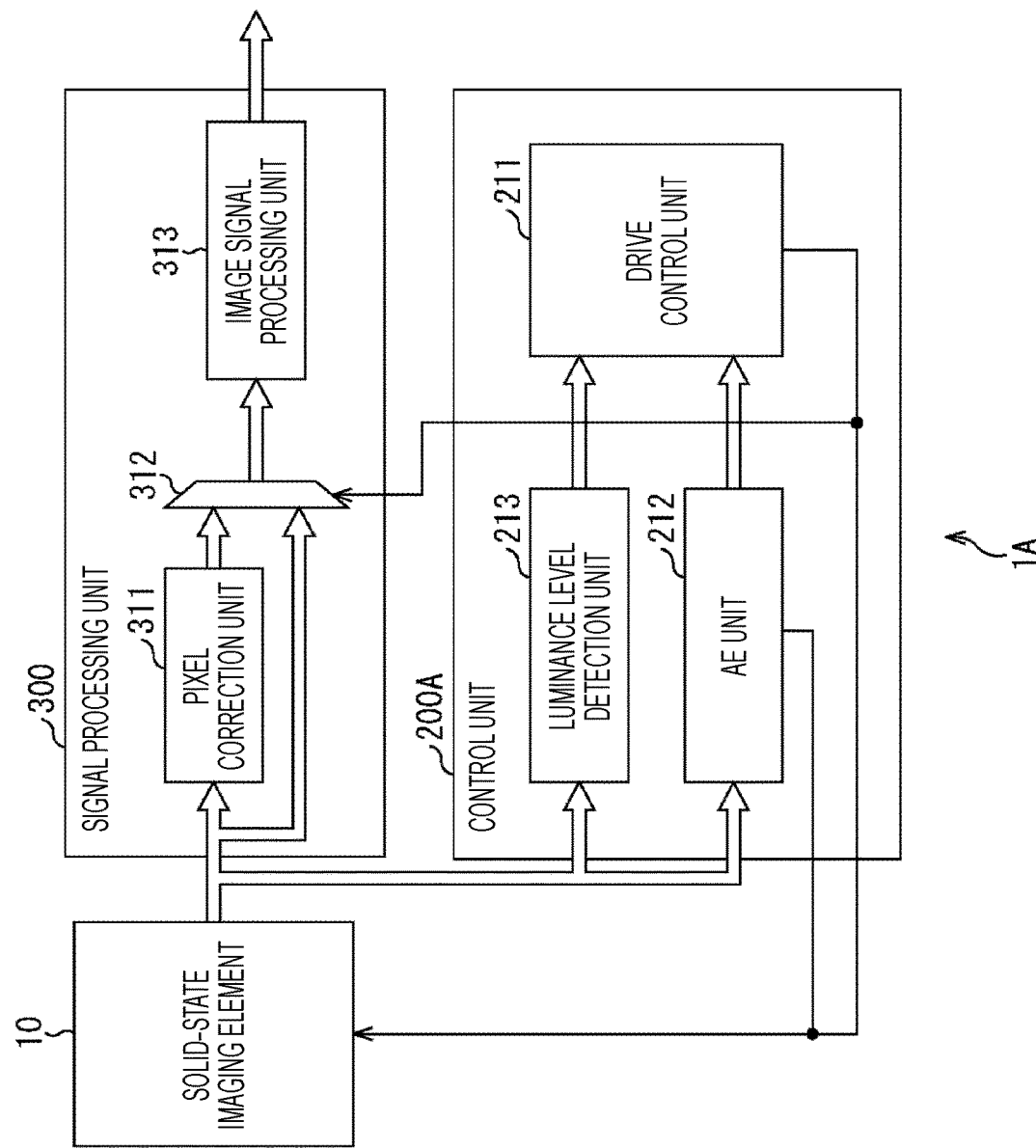
FIG. 11 is a block diagram illustrating an example of a configuration of an imaging apparatus according to a fifth embodiment.

FIG. 11 is a block diagram illustrating an example of a configuration of the imaging apparatus according to the fifth embodiment.

In FIG. 11, an imaging apparatus 1A includes the solid-state imaging element 10 (FIG. 1), the control unit 200A (FIG. 5), and a signal processing unit 300. In comparison to the configuration illustrated in FIG. 5, the imaging apparatus 1A of FIG. 11 further includes the signal processing unit 300 in addition to the solid-state imaging element 10 and the control unit 200A.

The signal processing unit 300 includes a pixel correction unit 311, a selector 312, and an image signal processing unit 313. The output signal (pixel signal) output from the solid-state imaging element 10 is supplied to each of the pixel correction unit 311 and the selector 312.

The pixel correction unit 311 performs pixel correction processing on the pixel signal from the solid-state imaging element 10, and supplies the resultant corrected pixel signal (corrected pixel signal) to the selector 312.

For example, in this pixel correction processing, in a case where the pixel signal (A signal) from the photodiode 112A of the left pixel 100A constituting the pixel 100 as the phase difference detection pixel is supplied, the correction processing for obtaining a signal corresponding to the pixel signal (B signal) from the photodiode 112B of the corresponding right pixel 100B is performed, and a pixel signal that can be used for a captured image is obtained.

To the selector 312, the pixel signal output from the solid-state imaging element 10 and the corrected pixel signal supplied from the pixel correction unit 311 are input as input signals, and the drive control signal output from the drive control unit 211 of the control unit 200A is input as a selection control signal.

The selector 312 selects one of the pixel signals from the pixel signal from the solid-state imaging element 10 and the corrected pixel signal from the pixel correction unit 311 on the basis of the drive control signal from the drive control unit 211, and supplies the pixel signal to the image signal processing unit 313.

Here, the drive control signal is based on the drive control method (drive control A, B, C) determined by the threshold value determination on the calculation result of Formula (1), and the position and density of the phase difference detection pixels are linked with the gain (illuminance) and the luminance level. Therefore, by inputting the drive control signal as the selection control signal of the selector 312, the position and density of the phase difference detection pixel can be linked with the pixel signal that needs to be corrected by the pixel correction unit 311.

For example, in a case where the pixels 100 arranged in the pixel array unit 11 are driven according to the drive control A (FIG. 6) determined by the threshold value determination with respect to the calculation result of the Formula (1), a pixel signal (A signal or B signal) independently read from one of the photodiode 112A and the photodiode 112B of the pixels 100 (3% of the pixels) that operate as the phase difference detection pixel is input to and corrected by the pixel correction unit 311. On the other hand, the pixel signal (A+B signal) read from both the photodiode 112A and the photodiode 112B of the pixels 100 (97% of the pixels) that operate as the image acquisition pixels does not need to be corrected and is input to the selector 312 as it is.

Furthermore, for example, in a case where the pixels 100 arranged in the pixel array unit 11 are driven according to the drive control C (FIG. 6), the pixel signal (A+B signal) read from the photodiode 112A and the photodiode 112B of the pixels 100 (100% of the pixels) that operate as both pixels: the phase difference detection pixel and the image acquisition pixel does not need to be corrected and is input to the selector 312 as it is.

The image signal processing unit 313 performs predetermined image signal processing on the basis of the pixel signal supplied from the selector 312, and outputs the resultant pixel signal to the circuit at a subsequent stage. As the image signal processing here, for example, signal processing such as demosaic, noise removal, gradation correction, color correction, image compression/expansion, and the like is performed. Furthermore, although illustration is omitted, the signal for phase difference detection is output to the phase difference detection unit and used in the processing for detecting the phase difference there.

Note that, in FIG. 11, the case where the imaging apparatus 1A includes the solid-state imaging element 10 (FIG. 1), the control unit 200A (FIG. 5), and the image signal processing unit 300 has been described, but in the imaging apparatus 1A, instead of the control unit 200A, the control unit 200B (FIG. 7) or the control unit 200C (FIG. 9) may be included.

6. Sixth Embodiment

Next, the read function of the pixels 100 arranged in the pixel array unit 11 will be described.

Figure 12:
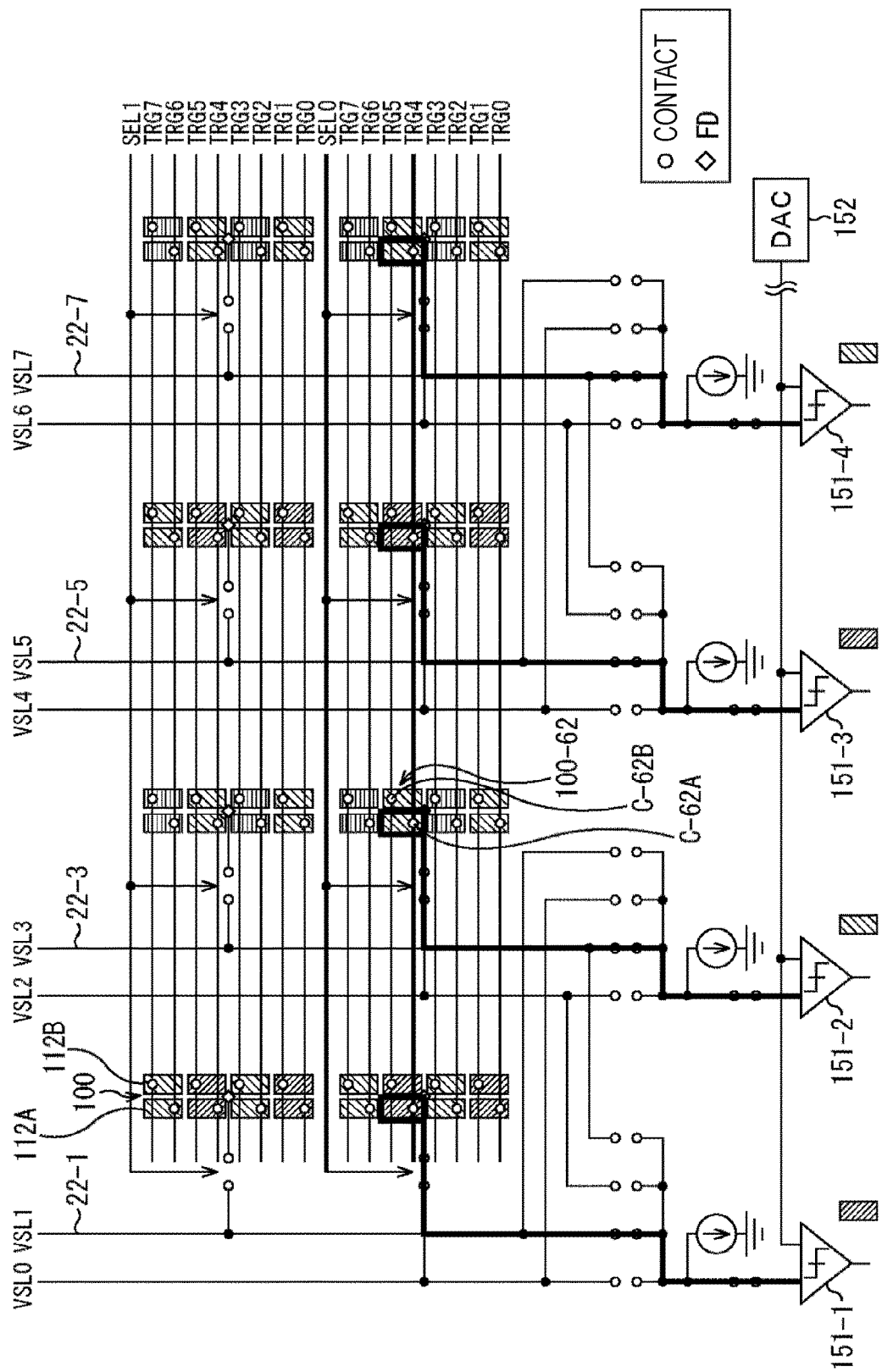
FIG. 12 is a diagram illustrating a configuration of a current read function.
Figure 13:
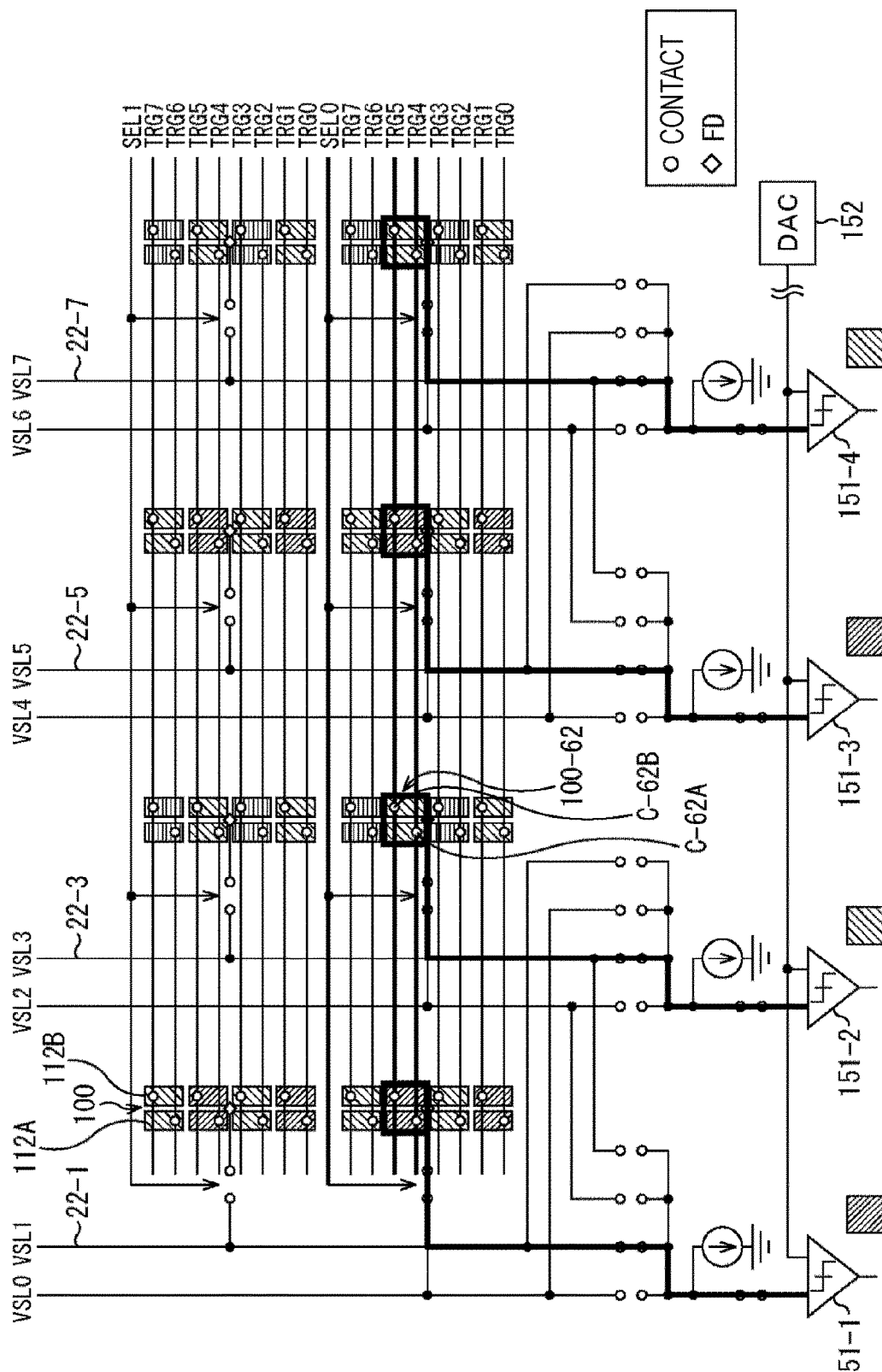
FIG. 13 is a diagram illustrating a configuration of a current read function.
Figure 14:
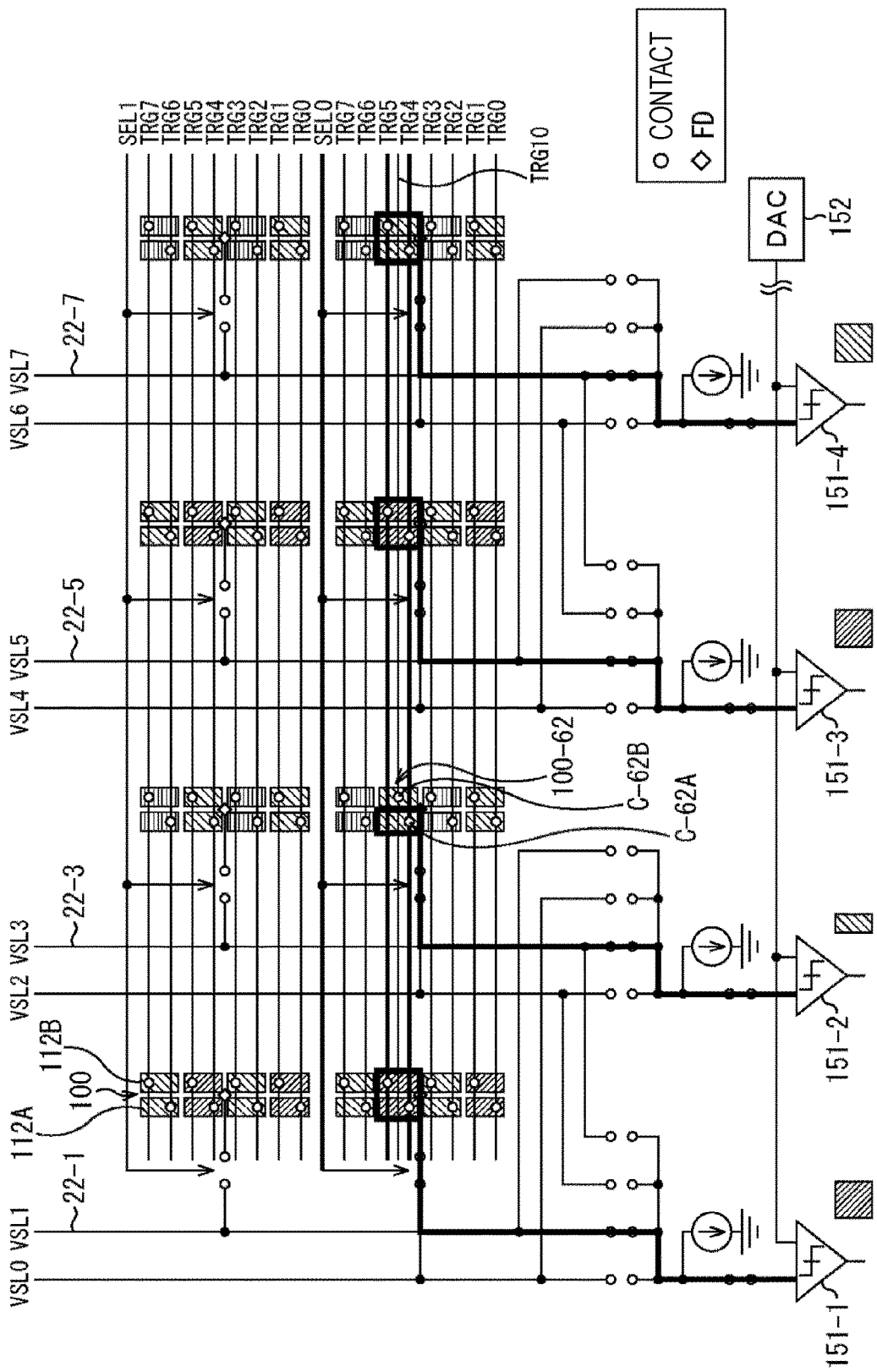
FIG. 14 is a diagram illustrating a configuration of a read function of the present technology.
Figure 15:
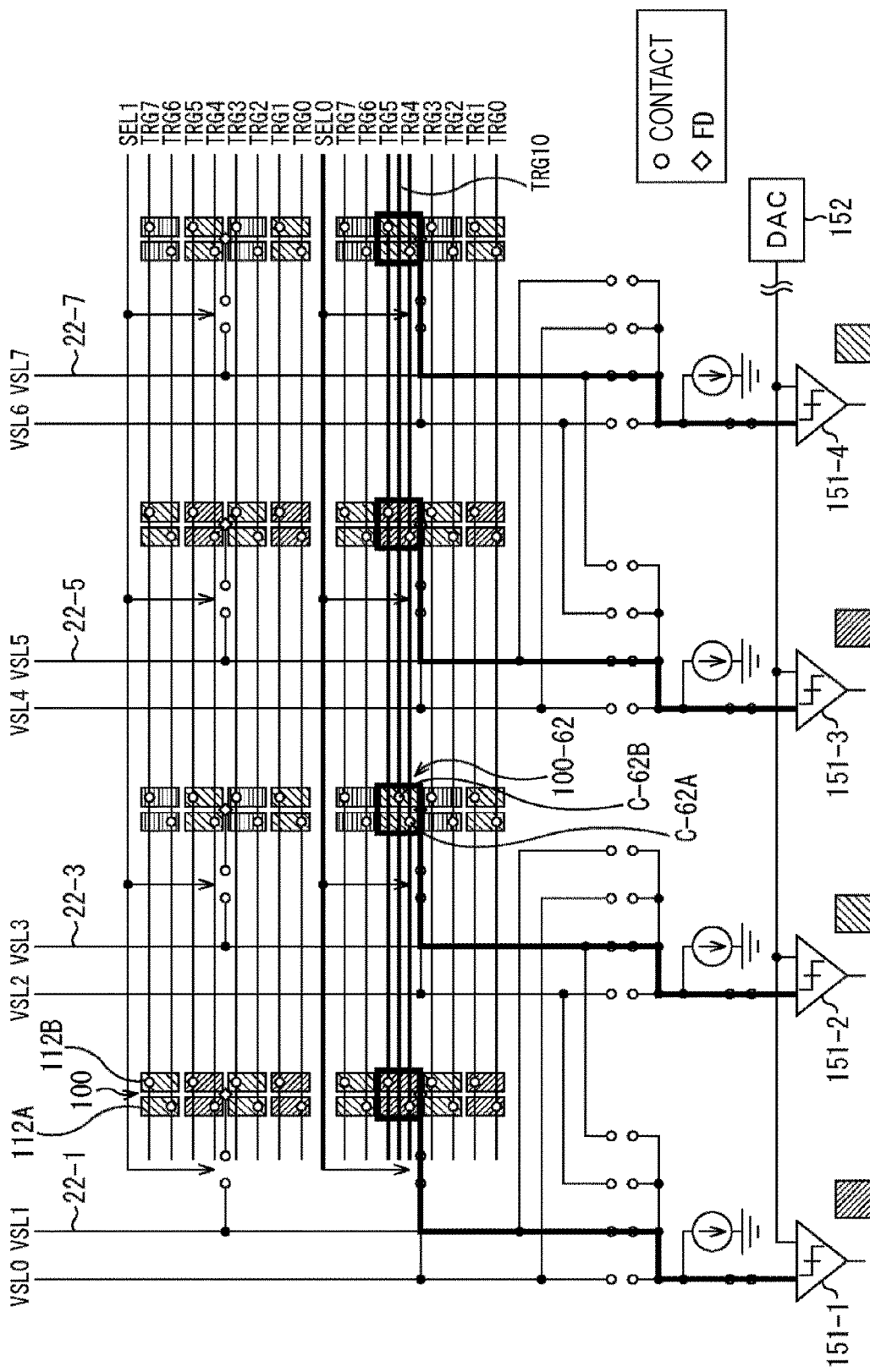
FIG. 15 is a diagram illustrating a configuration of a read function of the present technology.

Note that, here, the configuration of the read function of the present technology is illustrated in FIGS. 14 and 15, and the configuration of the current read function is illustrated in FIGS. 12 and 13, and description will be made by comparing the read function of the present technology with the current read function.

(Configuration of the Read Function)

FIGS. 12 to 15 illustrate a partial region of the imaging region in the pixel array unit 11, comparators 151 and a DAC 152 in the column signal processing circuit 13.

In FIGS. 12 to 15, it is assumed that the circles described on the photodiodes 112A and 112B constituting the pixels 100 represent contacts C, and the rhombuses described every four pixels in the column direction represent floating diffusion regions FD.

In the pixel array unit 11, the plurality of pixels 100 arranged two-dimensionally is arranged in a Bayer arrangement. In the pixel array unit 11, the pixels 100 arranged in the column direction share the floating diffusion region FD. Furthermore, the drive signals (TRG, SEL) with respect to a transfer transistor TR-Tr or a selection transistor SEL-Tr are supplied from the vertical drive circuit 12 (FIG. 1).

Each pixel 100 includes the left pixel 100A and the right pixel 100B. The left pixel 100A has a transfer transistor TR-Tr-A in addition to the photodiode 112A. Furthermore, the right pixel 100B has a transfer transistor TR-Tr-B in addition to the photodiode 112B.

In each pixel 100, the transfer transistors TR-Tr-A and TR-Tr-B connected to the photodiodes 112A and 112B perform an on/off operation according to the drive signal TRG input to their gates such that electric charges (signal charges) photoelectrically converted by the photodiodes 112A and 112B are transferred to the floating diffusion region FD.

The floating diffusion region FD is formed at a connection point between the transfer transistors TR-Tr-A and TR-Tr-B of the pixels 100, which are the share pixels, and a reset transistor RST-Tr and an amplification transistor AMP-Tr shared by the share pixels. The reset transistor RST-Tr performs an on/off operation according to the drive signal RST input to its gate such that the electric charge accumulated in the floating diffusion region FD is discharged.

The floating diffusion region FD has a function of accumulating the electric charge transferred by the transfer transistors TR-Tr-A and TR-Tr-B of the pixels 100, which are the share pixels. The potential of the floating diffusion region FD is modulated according to the accumulated electric charge amount. The amplification transistor AMP-Tr operates as an amplifier that turns the potential variation of the floating diffusion region FD connected to its gate as an input signal, and the output signal voltage is output to the vertical signal line (VSL) 22 via the selection transistor SEL-Tr.

The selection transistor SEL-Tr performs an on/off operation according to the drive signal SEL input to its gate and outputs a voltage signal from the amplification transistor AMP-Tr to the vertical signal line (VSL) 22.

In this way, the pixels 100 arranged in the pixel array unit 11 are share pixels in the column direction, and the left pixel 100A of each pixel 100 of the share pixels has the photodiode 112A and the transfer transistor TR-Tr-A, and the right pixel 100B has the photodiode 112B and the transfer transistor TR-Tr-B. Furthermore, in the share pixels, the floating diffusion region FD is shared, and as the pixel circuit of the share pixel, the reset transistor RST-Tr, the amplification transistor AMP-Tr, and the selection transistor SEL-Tr are shared as the shared transistors.

The signal voltage output to the vertical signal line (VSL) 22 is input to the comparators 151 in the column signal processing circuit 13.

A comparator 151-1 compares a signal voltage (Vx) from a vertical signal line (VSL1) 22-1 with a reference voltage (Vref) of the ramp wave (ramp) from the DAC 152, and outputs an output signal of a level according to the comparison result.

Similarly, comparators 151-2 to 151-4 are similar to the comparator 151-1 except that the signal voltage to be compared with the reference voltage is changed to be a signal voltage from a vertical signal line (VSL3) 22-3, a vertical signal line (VSL5) 22-5, or a vertical signal line (VSL7) 22-7, and an output signal of a level according to the comparison result is output.

Then, in the column signal processing circuit 13, the reset level or the signal level is counted on the basis of the output signal from the comparator 151, thereby achieving AD conversion of the column AD method using correlated double sampling (CDS).

(Contact Arrangement: Current Configuration)

Here, regarding the arrangement of the contacts C of the pixel 100, the arrangement is partially different between the configuration of the current read function illustrated in FIGS. 12 and 13 and the configuration of the read function of the present technology illustrated in FIGS. 14 and 15. Note that, in the following description, the arrangement position of the pixels 100 of each row and the pixels 100 of each column will be described with reference to the upper left pixel 100. Furthermore, in the following description, "SEL" and "TRG" in the drawings are used to distinguish drive lines and drive signals applied to the corresponding drive lines.

That is, in the current configuration (FIGS. 12 and 13), in the pixels 100 of the first row, the contacts C for the transfer transistors TR-Tr-A and TR-Tr-B connected to the photodiodes 112A and 112B are connected to drive lines TRG6 and TRG7, respectively. Furthermore, in the pixels 100 of the second row, the contacts C for the transfer transistors TR-Tr-A and TR-Tr-B connected to the photodiodes 112A and 112B are connected to drive lines TRG4 and TRG5, respectively.

Furthermore, in the current configuration (FIGS. 12 and 13), in the pixels 100 of the third row, the contacts C for the transfer transistors TR-Tr-A and TR-Tr-B are connected to drive lines TRG2 and TRG3, respectively, and in the pixels 100 of the fourth row, the contacts C for the transfer transistors TR-Tr-A and TR-Tr-B are connected to drive lines TRG0 and TRG1, respectively.

Similarly, in the current configuration (FIGS. 12 and 13), in the pixels 100 of the fifth to eighth rows, the contacts C for the transfer transistor TR-Tr-A are connected to the drive line TRG0, TRG2, TRG4, or TRG6, and the contacts C for the transfer transistor TR-Tr-B are connected to the drive line TRG1, TRG3, TRG5, or TRG7.

(Contact Arrangement: Configuration of the Present Technology)

On the other hand, in the configuration of the present technology (FIGS. 14 and 15), the pixels 100 of the first to fifth rows and the seventh to eighth rows are similar to the configuration indicated by the current configuration (FIGS. 12 and 13) such that the contacts C for the transfer transistor TR-Tr-A are connected to the drive line TRG0, TRG2, TRG4, or TRG6, and the contacts C for the transfer transistor TR-Tr-B are connected to the drive line TRG1, TRG3, TRG5, or TRG7.

Here, in the configuration of the present technology (FIGS. 14 and 15), focusing on the pixels 100 of the sixth row, a drive line TRG10 is added between the drive line TRG4 and the drive line TRG5.

Then, among the pixels 100 of the sixth row, the pixels 100 of the first column, the third column, and the fourth column are similar to the configuration indicated by the current configuration (FIGS. 12 and 13) such that the contacts C for transfer transistor TR-Tr-A are connected to the drive line TRG4, and the contacts C for the transfer transistor TR-Tr-B are connected to the drive line TRG5.

Furthermore, in the pixels 100 of the sixth row, a pixel 100-62 of the second column is such that a contact C-62A for the left transfer transistor TR-Tr-A is connected to the drive line TRG4, but a contact C-62B for the right transfer transistor TR-Tr-B is connected to the added drive line TRG10.

That is, in a case where attention is paid to the pixel 100-62, in the configuration indicated by the configuration (FIGS. 14 and 15) of the present technology, as compared with the configuration indicated by the current configuration (FIGS. 12 and 13), the configurations are identical in that the contact C-62A is connected to the drive line TRG4, but are different in that the contact C-62B is connected to the drive line TRG10, not the drive line TRG5.

In other words, it can be said that the pixel array unit 11 includes a first drive line (e.g., drive line TRG4) connected to a first photoelectric conversion unit (e.g., photodiode 112A) of a first pixel portion (e.g., the pixel 100 of the sixth row (excluding the pixel 100-62 of the second column)) and the second pixel portion (e.g., the pixel 100-62 of the second column), a second drive line (e.g., drive line TRG5) connected to a second photoelectric conversion unit (e.g., photodiode 112B) of the first pixel portion (e.g., the pixel 100 of the sixth row (excluding the pixel 100-62 of the second column)), and a third drive line (e.g., drive line TRG10) connected to the second photoelectric conversion unit (e.g., photodiode 112B) of the second pixel portion (e.g., the pixel 100-62 of the second column).

At this time, the second drive line (e.g., drive line TRG5) is nonconnected to the second photoelectric conversion unit (e.g., photodiode 112B) of the second pixel portion (e.g., the pixel 100-62 of the second column). Furthermore, the third drive line (e.g., drive line TRG10) is nonconnected to the second photoelectric conversion unit (e.g., the photodiode 112B) of the first pixel portion (e.g., the pixel 100 of the sixth row (excluding the pixel 100-62 of the second column)).

(Read Operation: Current Configuration)

Next, a read operation in the case of having the above-described configuration will be described. Here, first of all, the current read operation will be described with reference to FIGS. 12 and 13.

In FIG. 12, the drive signal SEL1 becomes an L level, and the selection transistor SEL-Tr shared by the share pixels including the pixels 100 of the first to fourth rows on the upper side is in an OFF state, while the drive signal SEL0 becomes an H level, and the selection transistor SEL-Tr shared by the share pixels including the pixels 100 of the fifth to eighth rows on the lower side is in an ON state. Therefore, the share pixel including the pixels 100 of the fifth to eighth rows on the lower side is selected.

At this time, as illustrated in FIG. 12, among the drive signals TRG0 to TRG7, only the drive signal TRG4 becomes an H level, and in each pixel 100 of the sixth row, the transfer transistor TR-Tr-A connected to the photodiode 112A is in an ON state.

Therefore, the electric charge accumulated in the photodiode 112A of each pixel 100 of the sixth row, which is surrounded by the thick frame in FIG. 12, is transferred to the floating diffusion region FD corresponding to each share pixel. Then, in the share pixel including each pixel 100 of the sixth row, in the amplification transistor AMP-Tr, the potential variation of the floating diffusion region FD is used as an input signal voltage to the gate, and the output signal voltage is output to the vertical signal line 22 via the selection transistor SEL-Tr.

In this way, the electric charge accumulated in the photodiode 112A of each pixel 100 of the sixth row is independently read, and the pixel signal (A signal) is obtained.

Thereafter, as illustrated in FIG. 13, while the drive signal SEL0 remains at an H level, the drive signals TRG4 and TRG5 become an H level, and in each pixel 100 of the sixth row, the transfer transistor TR-Tr-A connected to the photodiode 112A and the transfer transistor TR-Tr-B connected to the photodiode 112B simultaneously become an ON state.

Therefore, the electric charges accumulated in both the photodiodes 112A and 112B of each pixel 100 of the sixth row, which are surrounded by the thick frame in FIG. 13, are transferred to the floating diffusion region FD. Then, in the share pixel including each pixel 100 of the sixth row, by the amplification transistor AMP-Tr, the signal voltage depending on the potential variation of the floating diffusion region FD is output to the vertical signal line 22 via the selection transistor SEL-Tr.

In this way, the electric charges accumulated in the photodiodes 112A and 112B of each pixel 100 of the sixth row are added up and read, and the pixel signal (A+B signal) is obtained.

Then, in the current read operation, as illustrated in FIGS. 12 and 13, the A signal is obtained as a signal for phase difference detection, and the A+B signal is obtained as a signal for image acquisition. Therefore, by performing the difference processing between the A+B signal and the A signal, a signal corresponding to the B signal can be acquired. Therefore, the A signal and the B signal are obtained as signals for phase difference detection. That is, the current read operation requires two read operations in order to acquire the signal for phase difference detection.

(Read Operation: Configuration of the Present Technology)

Next, the read operation of the present technology will be described with reference to FIGS. 14 and 15.

In FIG. 14, the drive signal SEL0 becomes an H level, and the selection transistor SEL-Tr shared by the share pixels including the pixels 100 of the fifth to eighth rows on the lower side is in the ON state. Therefore, the share pixel including the pixels 100 of the fifth to eighth rows on the lower side is selected.

At this time, as illustrated in FIG. 14, among the drive signals TRG0 to TRG7 and TRG10, the drive signals TRG4 and TRG5 become an H level, and the transfer transistor TR-Tr-A connected to the photodiode 112A and the transfer transistor TR-Tr-B connected to the photodiode 112B of each pixel 100 of the sixth row (excluding the pixels 100 of the second column) simultaneously become an ON state.

Therefore, in each pixel 100 of the sixth row (excluding the pixels 100 of the second column), as indicated by the thick frames in FIG. 14, the electric charges accumulated in the photodiodes 112A and 112B are added up and read, and the pixel signal (A+B signal) is obtained.

Here, among the pixels 100 of the sixth row, focusing on the pixel 100-62 of the second column, as described above, a contact C-62B connected to the photodiode 112B is connected to the drive line TRG10, and since the drive signal TRG10 applied thereto is at an L level, only the left transfer transistor TR-Tr-A becomes an ON state.

Therefore, in the pixel 100-62, as indicated by the thick frame in FIG. 14, the electric charge accumulated in the left photodiode 112A is independently read, and the pixel signal (A signal) is obtained.

Furthermore, although illustration is omitted, the pixels 100 arranged in the pixel array unit 11 include pixels 100 in which the electric charge accumulated in the right photodiode 112B is independently read and the pixel signal (B signal) can be acquired in contrast to the pixel 100-62. For example, if the pixel 100-62 described above is the pixel 100 capable of acquiring the B signal, it is only required to connect the contact C-62A to the drive line TRG10 instead of the drive line TRG4, and connect the contact C-62B to the drive line TRG5.

That is, the pixels 100 arranged in the pixel array unit 11 include pixels 100 capable of acquiring the A+B signal as the image acquisition pixel, and pixels 100 capable of acquiring the A signal and pixels 100 capable of acquiring the B signal as the phase difference detection pixel. Here, as indicated in the above-described first to fourth embodiments, the density of the pixels 100 operating as the phase difference detection pixels is determined on the basis of the gain, the luminance level, and the like (for example, 3% or the like in the case of the drive control A), and the pixel 100 according to the density operates as the phase difference detection pixel for obtaining the A signal or the B signal.

Then, in the read operation of the present technology, as illustrated in FIG. 14, the A signal and the B signal are obtained as signals for phase difference detection, and the A+B signal is obtained as a signal for image acquisition. Therefore, in order to acquire a signal for phase difference detection, it is only necessary to perform the read operation once. That is, in the above-described current read operation, it was necessary to perform reading twice in order to acquire the signal for phase difference detection, but in the read operation of the present technology, it is possible to reduce the number of times of read operation to one.

Note that in a case where the pixel 100-62 is caused to operate as the image acquisition pixel, as illustrated in FIG. 15, the drive signal SEL0 is set to an H level state, and moreover the drive signals TRG4 and TRG5 and the drive signal TRG10 are set to an H level. Therefore, in the pixel 100-62, similarly to each of the other pixels 100 of the sixth row, the transfer transistors TR-Tr-A and TR-Tr-B are simultaneously set to an ON state, and as indicated by the thick frame in FIG. 15, the electric charges accumulated in the photodiodes 112A and 112B are added up and read, and the pixel signal (A+B signal) is obtained.

In other words, in the read operation of the present technology, it can be said that, in a case where the illuminance in the imaging region of the pixel array unit 11 (or, for example, the calculation result of Formula (1), (2), or (3)) is smaller than a predetermined threshold value (e.g., the first threshold value Th1 or the second threshold value Th2), in the first pixel portion (e.g., the pixel 100 of the sixth row (excluding the pixel 100-62 of the second column)), a pixel signal corresponding to the first photoelectric conversion unit (e.g., the photodiode 112A) and a pixel signal corresponding to the second photoelectric conversion unit (e.g., the photodiode 112B) are generated using the first drive line (e.g., the drive line TRG4) and the second drive line (e.g., the drive line TRG5), in a case where the illuminance is larger than the predetermined threshold value, in the second pixel portion (e.g., the pixel 100-62 of the second column), a pixel signal corresponding to the first photoelectric conversion unit (e.g., the photodiode 112A) and a pixel signal corresponding to the second photoelectric conversion unit (e.g., the photodiode 112B) are generated using the first drive line (e.g., the drive line TRG4) and the third drive line (e.g., the drive line TRG10), and meanwhile in the first pixel portion (e.g., the pixel 100 of the sixth row (excluding the pixel 100-62 of the second column)), a pixel signal corresponding to the first photoelectric conversion unit (e.g., the photodiode 112A) and a pixel signal corresponding to the second photoelectric conversion unit (e.g., the photodiode 112B) are added up and generated.

Furthermore, in the read operation of the present technology, it can also be said that, in a case where the illuminance in the imaging region of the pixel array unit (or, for example, the calculation result of Formula (1), (2), or (3)) is smaller than a predetermined threshold value (e.g., the first threshold value Th1 or the second threshold value Th2), in the first pixel portion (e.g., the pixel 100 of the sixth row (excluding the pixel 100-62 of the second column)) and the second pixel portion (e.g., the pixel 100-62 of the second column), a pixel signal from the first photoelectric conversion unit (e.g., the photodiode 112A) and a pixel signal from the second photoelectric conversion unit (e.g., the photodiode 112B) are read, in a case where the illuminance is larger than the predetermined threshold value, in the second pixel portion (e.g., the pixel 100-62 of the second column), a pixel signal from the first photoelectric conversion unit (e.g., the photodiode 112A) and a pixel signal from the second photoelectric conversion unit (e.g., the photodiode 112B) are read, and meanwhile in the first pixel portion (e.g., the pixel 100 of the sixth row (excluding the pixel 100-62 of the second column)), a pixel signal from the first photoelectric conversion unit (e.g., the photodiode 112A) and a pixel signal from the second photoelectric conversion unit (e.g., the photodiode 112B) are added up and read.

7. Seventh Embodiment

By the way, in the above-described embodiment, the dual PD-type structure in which the two photodiodes 112A and 112B are provided for one on-chip lens 111 has been described, but another structure may be adopted. Here, for example, a structure in which four photodiodes 112A, 112B, 112C, and 112D are provided for one on-chip lens 111 (hereinafter, also referred to as 2×2 OCL structure) can be adopted.

Therefore, a case where the 2×2 OCL structure is adopted will be described below as the seventh embodiment.

(Example of the 2×2 OCL Structure)

Figure 16:
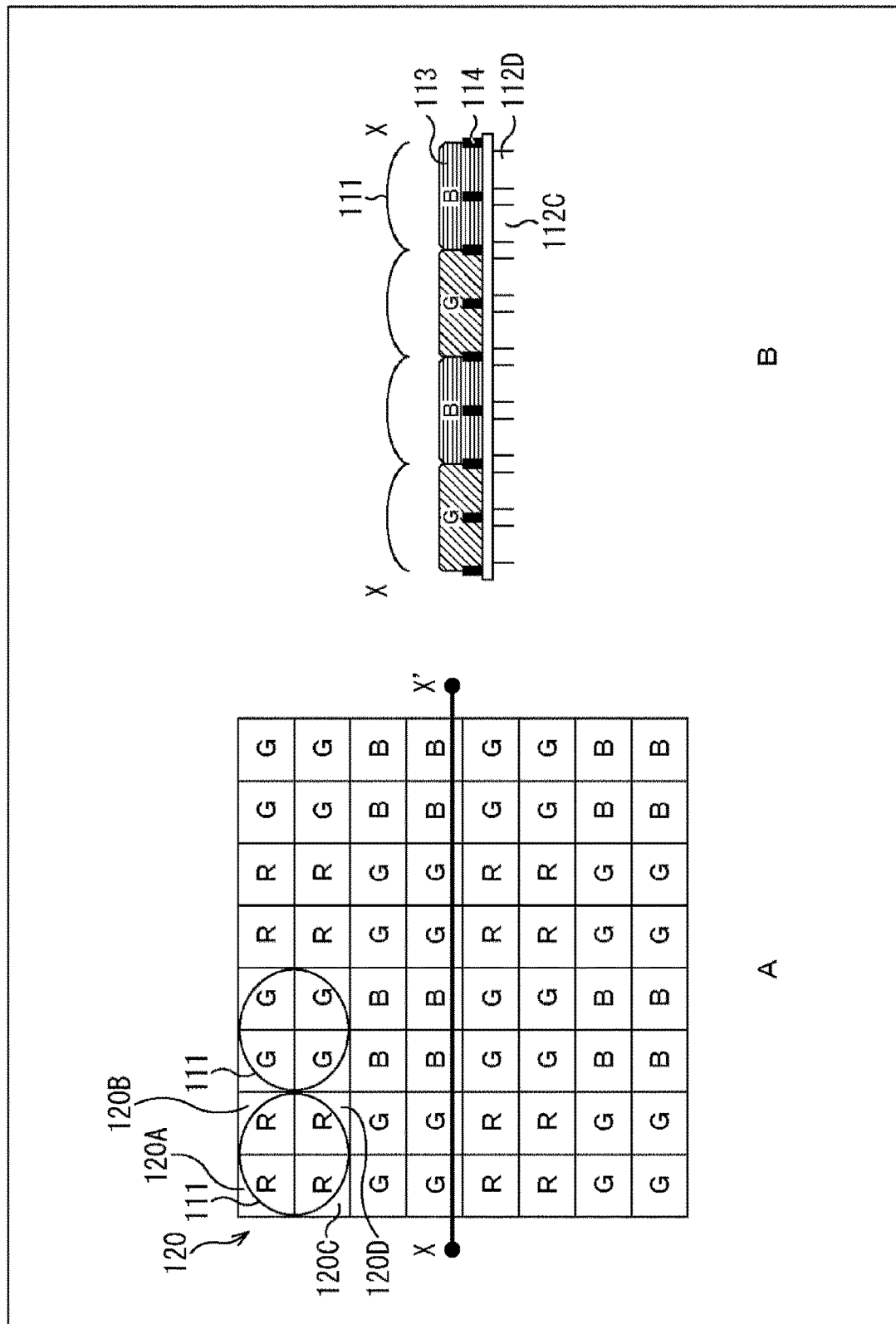
FIG. 16 is a diagram illustrating an example of a structure of pixels having a 2×2 OCL structure.

FIG. 16 is a diagram illustrating an example of a structure of pixels having the 2×2 OCL structure.

A of FIG. 16 illustrates a plan view of pixels 120 of 8 rows and 8 columns (8×8) arranged in a predetermined imaging region when viewed from the light incident side among a plurality of pixels 120 arranged in the pixel array unit 11. Furthermore, B of FIG. 16 illustrates an X-X' cross-section of the pixel 120 illustrated in A of FIG. 16.

As illustrated in FIG. 16, the pixel 120 includes a 2×2 OCL structure in which four photodiodes 112A to 112D are provided for one on-chip lens 111. It can also be said that the pixel 120 having the 2×2 OCL structure is a pixel portion (first pixel portion or second pixel portion) including an upper left pixel 120A having an upper left photodiode 112A, an upper right pixel 120B having an upper right photodiode 112B, a lower left pixel 120C having a lower left photodiode 112C, and a lower right pixel 120D having a lower right photodiode 112D.

In the pixel 120 having the 2×2 OCL structure, a signal obtained from the electric charges accumulated in the photodiodes 112A to 112D is used as a signal for image acquisition, and a signal obtained from the electric charges accumulated in each of the photodiodes 112A to 112D can be used as a signal for phase difference detection.

As described above, the pixel 120 has a structure of the 2×2 OCL structure and can be used as both an image acquisition pixel and a phase difference detection pixel.

Furthermore, as illustrated in the cross-sectional view of B of FIG. 16, the pixel 120 includes a color filter 113 below the on-chip lens 111, and is configured as an R pixel 120, a G pixel 120, or a B pixel 120 depending on a wavelength component transmitted by the color filter 113. In the pixel array unit 11, the R pixels 120, the G pixels 120, and the B pixels 120 can be arranged in an arrangement pattern such as a Bayer arrangement.

Next, the read function in the case where the 2×2 OCL structure is adopted as the structure of the pixels 120 arranged in the pixel array unit 11 will be described.

Figure 17:
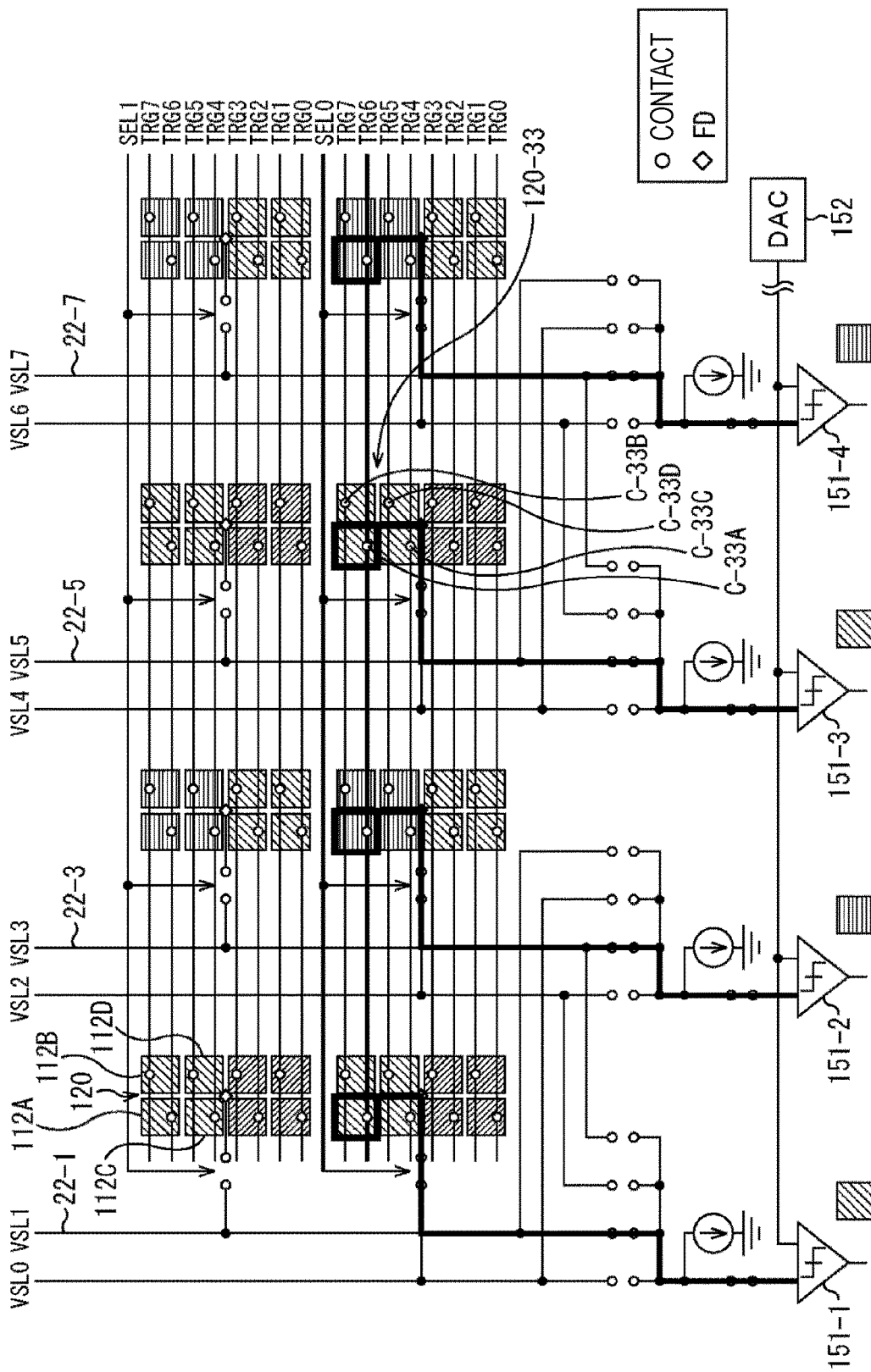
FIG. 17 is a diagram illustrating a configuration of a current read function.
Figure 18:
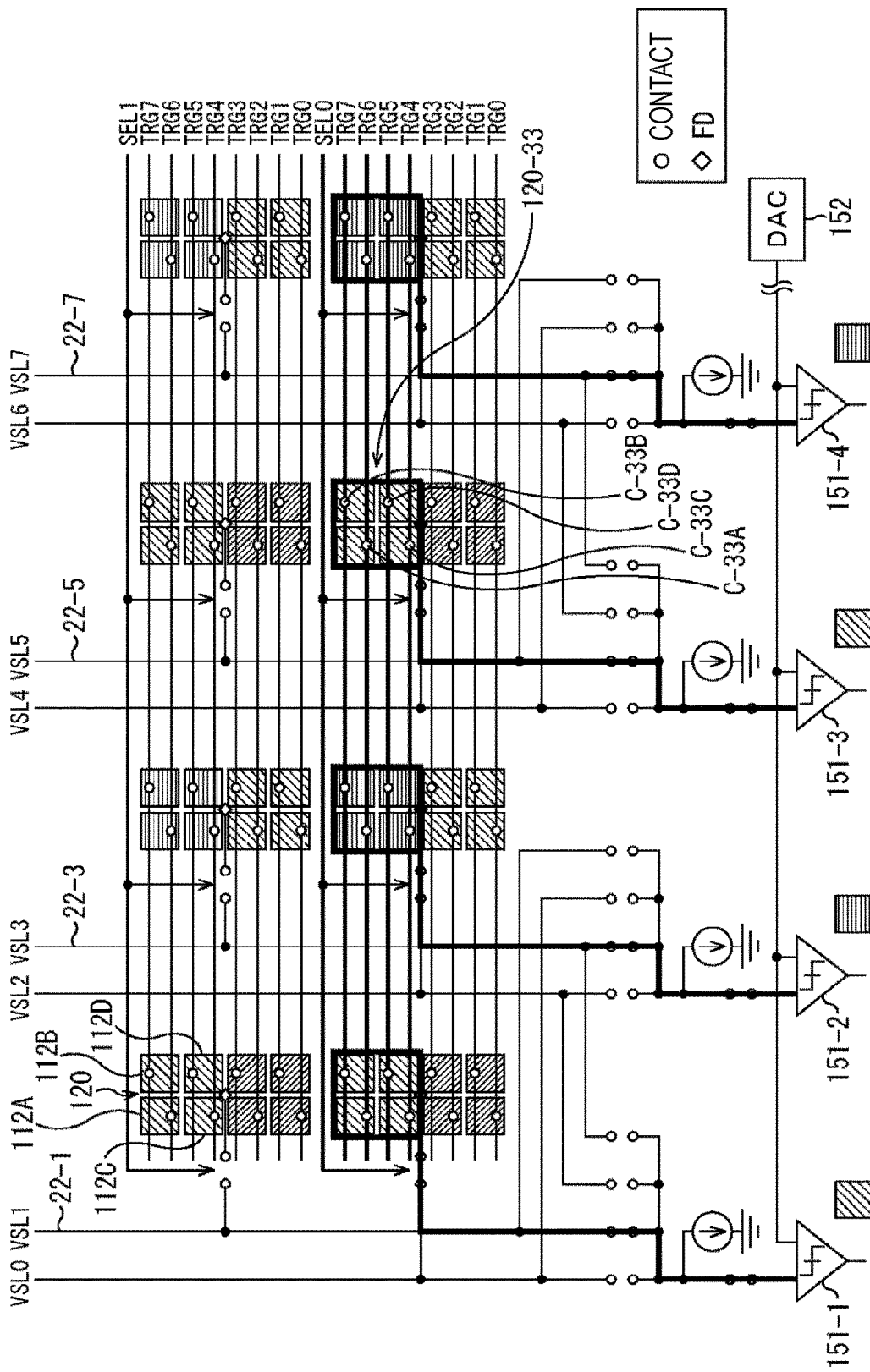
FIG. 18 is a diagram illustrating a configuration of a current read function.

Note that, here, the configuration of the read function of the present technology is illustrated in FIGS. 19 to 22, and the configuration of the current read function is illustrated in FIGS. 17 and 18, and a difference between the read function of the present technology and the current read function will be described. However, as the read function of the present technology, a first configuration (FIGS. 19 and 20) in a case where the left or right photodiode 112 is independently read and a second configuration (FIGS. 21 and 22) in a case where the upper or lower photodiode 112 is independently read will be described.

(Configuration of the Read Function)

Similarly to FIGS. 12 to 15 described above, FIGS. 17 to 22 illustrate a partial region of the imaging region in the pixel array unit 11, comparators 151 and a DAC 152 in the column signal processing circuit 13.

FIGS. 17 to 22 are different from FIGS. 12 to 15 in that, in the pixel array unit 11, instead of the pixel 100 having the dual PD-type structure (FIG. 2), the pixel 120 having the 2×2 OCL structure (FIG. 16) is arranged.

That is, in FIGS. 17 to 22, the pixels 120 arranged in the pixel array unit 11 are share pixels in the column direction, and in each pixel 120 of the share pixels, the upper left pixel 120A has a photodiode 112A and a transfer transistor TR-Tr-A, and the upper right pixel 120B has a photodiode 112B and a transfer transistor TR-Tr-B. Furthermore, in each pixel 120 of the share pixels, the lower left pixel 120C has a photodiode 112C and a transfer transistor TR-Tr-C, and the lower right pixel 120D has a photodiode 112D and a transfer transistor TR-Tr-D.

Moreover, in the share pixels, the floating diffusion region FD is shared, and as the pixel circuit of the share pixel, the reset transistor RST-Tr, the amplification transistor AMP-Tr, and the selection transistor SEL-Tr are shared as the shared transistors.

(Contact Arrangement: Current Configuration)

Here, regarding the arrangement of contacts C of the pixels 120, the arrangement is partially different between the configuration of the current read function illustrated in FIGS. 17 and 18 and the read configuration of the present technology illustrated in FIGS. 19 to 22.

That is, in the current configuration (FIGS. 17 and 18), in the pixels 120 of the first and second rows on the upper side, the contacts C for the transfer transistor TR-Tr-A connected to the photodiode 112A of the upper left pixel 120A are connected to drive lines TRG2 and TRG6, and the contacts C for the transfer transistor TR-Tr-B connected to the photodiode 112B of the upper right pixel 120B are connected to drive lines TRG3 and TRG7.

Furthermore, in the pixels 120 of the first and second rows on the upper side, the contacts C for the transfer transistor TR-Tr-C connected to the photodiode 112C of the lower left pixel 120C are connected to drive lines TRG0 and TRG4, and the contacts C for the transfer transistor TR-Tr-D connected to the photodiode 112D of the lower right pixel 120D are connected to drive lines TRG1 and TRG5.

Similarly, in the current configuration (FIGS. 17 and 18), also in the third and fourth rows on the lower side, the contacts C for the transfer transistor TR-Tr-A are connected to the drive lines TRG2 and TRG6, the contacts C for the transfer transistor TR-Tr-B are connected to the drive lines TRG3 and TRG7, the contacts C for the transfer transistor TR-Tr-C are connected to the drive lines TRG0 and TRG4, and the contacts C for the transfer transistor TR-Tr-D are connected to the drive lines TRG1 and TRG5.

(Contact Arrangement: First Configuration of the Present Technology)

On the other hand, in the first configuration of the present technology (FIGS. 19 and 20), the pixels 120 of the first, second, and fourth rows are similar to the configuration illustrated in FIGS. 17 and 18 such that the contacts C for the transfer transistor TR-Tr-A are connected to the drive lines TRG2 and TRG6, the contacts C for the transfer transistor TR-Tr-B are connected to the drive lines TRG3 and TRG7, the contacts C for the transfer transistor TR-Tr-C are connected to the drive lines TRG0 and TRG4, and the contacts C for the transfer transistor TR-Tr-D are connected to the drive lines TRG1 and TRG5.

Here, in the first configuration of the present technology (FIGS. 19 and 20), focusing on the pixels 120 of the third row, a drive line TRG20 is added between the drive line TRG4 and the drive line TRG5, and moreover a drive line TRG21 is added between the drive line TRG6 and the drive line TRG7.

Then, among the pixels 120 of the third row, the pixels 120 of the first, second, and fourth columns are similar to the current configuration (FIGS. 17 and 18) such that the contacts C for the transfer transistors TR-Tr are connected to the corresponding drive lines TRG.

Furthermore, in the pixels 120 of the third row, a pixel 120-33 of the third column is such that contacts C-33A and C-33C for the left transfer transistors TR-Tr-A and TR-Tr-C are connected to the drive lines TRG6 and TRG4, respectively, but contacts C-33B and C-33D for the right transfer transistors TR-Tr-B and TR-Tr-D are connected to the added drive lines TRG21 and TRG20.

That is, in a case where attention is paid to the pixel 120-33, in the first configuration (FIGS. 19 and 20) of the present technology, as compared with the current configuration (FIGS. 17 and 18), the configurations are identical in that the contacts C-33A and C-33C are connected to the drive lines TRG6 and TRG4, but are different in that the contacts C-33B and C-33D are connected to the drive lines TRG21 and TRG20, not the drive lines TRG7 and TRG5.

In other words, it can be said that the pixel array unit 11 includes a first drive line (e.g., drive lines TRG6 and TRG4) connected to a first photoelectric conversion unit (e.g., photodiodes 112A and 112C) of a first pixel portion (e.g., the pixel 120 of the third row (excluding the pixel 120-33 of the third column)) and a second pixel portion (e.g., the pixel 120-33 of the third column), a second drive line (e.g., drive lines TRG7 and TRG5) connected to a second photoelectric conversion unit (e.g., photodiodes 112B and 112D) of the first pixel portion (e.g., the pixel 120 of the third row (excluding the pixel 120-33 of the third column)), and a third drive line (e.g., drive lines TRG21 and TRG20) connected to the second photoelectric conversion unit (e.g., photodiodes 112B and 112D) of the second pixel portion (e.g., the pixel 120-33 of the third column).

At this time, the second drive line (e.g., drive lines TRG7 and TRG5) is nonconnected to the second photoelectric conversion unit (e.g., photodiodes 112B and 112D) of the second pixel portion (e.g., the pixel 120-33 of the third column). Furthermore, the third drive line (e.g., drive lines TRG21 and TRG20) is nonconnected to the second photoelectric conversion unit (e.g., the photodiodes 112B and 112D) of the first pixel portion (e.g., the pixel 120 of the third row (excluding the pixel 120-33 of the third column)). In this way, by providing the two third drive lines (e.g., the drive lines TRG21 and TRG20), the pixel 120 having the 2×2 OCL structure can be operated independently as the phase difference detection pixel.

(Contact Arrangement: Second Configuration of the Present Technology)

Furthermore, in the second configuration of the present technology (FIGS. 21 and 22), among the pixels 120 of the third row, focusing on the pixels 120 of the third row, a drive line TRG30 is added between the drive line TRG4 and the drive line TRG5, and moreover a drive line TRG31 is added between the drive line TRG6 and the drive line TRG7.

Then, in the pixels 120 of the third row, a pixel 120-33 of the third column is such that contacts C-33A and C-33B for the upper transfer transistors TR-Tr-A and TR-Tr-B are connected to the drive lines TRG6 and TRG7, respectively, but contacts C-33C and C-33D for the lower transfer transistors TR-Tr-C and TR-Tr-D are connected to the added drive line TRG30.

That is, in a case where attention is paid to the pixel 120-33, in the second configuration (FIGS. 21 and 22) of the present technology, as compared with the current configuration (FIGS. 17 and 18), the configurations are identical in that the contacts C-33A and C-33B are connected to the drive lines TRG6 and TRG7, respectively, but are different in that the contacts C-33C and C-33D are connected to the drive line TRG30, not the drive lines TRG4 and TRG5.

In other words, it can be said that the pixel array unit 11 includes a first drive line (e.g., drive lines TRG6 and TRG7) connected to a first photoelectric conversion unit (e.g., photodiodes 112A and 112B) of a first pixel portion (e.g., the pixel 120 of the third row (excluding the pixel 120-33 of the third column)) and a second pixel portion (e.g., the pixel 120-33 of the third column), a second drive line (e.g., drive lines TRG4 and TRG5) connected to a second photoelectric conversion unit (e.g., photodiodes 112C and 112D) of the first pixel portion (e.g., the pixel 120 of the third row (excluding the pixel 120-33 of the third column)), and a third drive line (e.g., drive line TRG30) connected to the second photoelectric conversion unit (e.g., photodiodes 112C and 112D) of the second pixel portion (e.g., the pixel 120-33 of the third column).

At this time, the second drive line (e.g., drive lines TRG4 and TRG5) is nonconnected to the second photoelectric conversion unit (e.g., photodiodes 112C and 112D) of the second pixel portion (e.g., the pixel 120-33 of the third column). Furthermore, the third drive line (e.g., drive line TRG30) is nonconnected to the second photoelectric conversion unit (e.g., the photodiodes 112C and 112D) of the first pixel portion (e.g., the pixel 120 of the third row (excluding the pixel 120-33 of the third column)).

(Read Operation: Current Configuration)

Next, a read operation in the case of having the above-described configuration will be described. Here, first of all, the current read operation will be described with reference to FIGS. 17 and 18.

In FIG. 17, the drive signal SEL0 becomes an H level, and the selection transistor SEL-Tr shared by the share pixels including the pixels 120 of the third and fourth rows on the lower side is in an ON state, and the share pixels are selected.

At this time, as illustrated in FIG. 17, among the drive signals TRG0 to TRG7, the drive signal TRG6 becomes an H level, and in the pixels 120 of the third row, the transfer transistor TR-Tr-A is in an ON state. Therefore, in the upper left pixel 120A of each pixel 120 of the third row, as indicated by the thick frame in FIG. 17, the electric charge accumulated in the photodiode 112A is independently read, and the pixel signal (A signal) is obtained.

Thereafter, as illustrated in FIG. 18, the drive signal SEL0 remains at an H level, and the drive signals TRG4 to TRG7 become an H level, and in the pixels 120 of the third row, the transfer transistors TR-Tr-A to TR-Tr-D become an ON state. Therefore, in each pixel 120 of the third row, as indicated by the thick frames in FIG. 18, the electric charges accumulated in the photodiodes 112A to 112D are added up and read, and the pixel signal (A+B+C+D signal) is obtained.

Then, in the current read operation, as illustrated in FIGS. 17 and 18, the A signal is obtained as a signal for phase difference detection, and the A+B+C+D signal is obtained as a signal for image acquisition. Therefore, in order to acquire a signal corresponding to the B signal, for example, as the signal for phase difference detection, further read operation or difference processing is required.

(Read Operation: First Configuration of the Present Technology)

Next, the read operation of the first configuration of the present technology will be described with reference to FIGS. 19 and 20.

Figure 19:
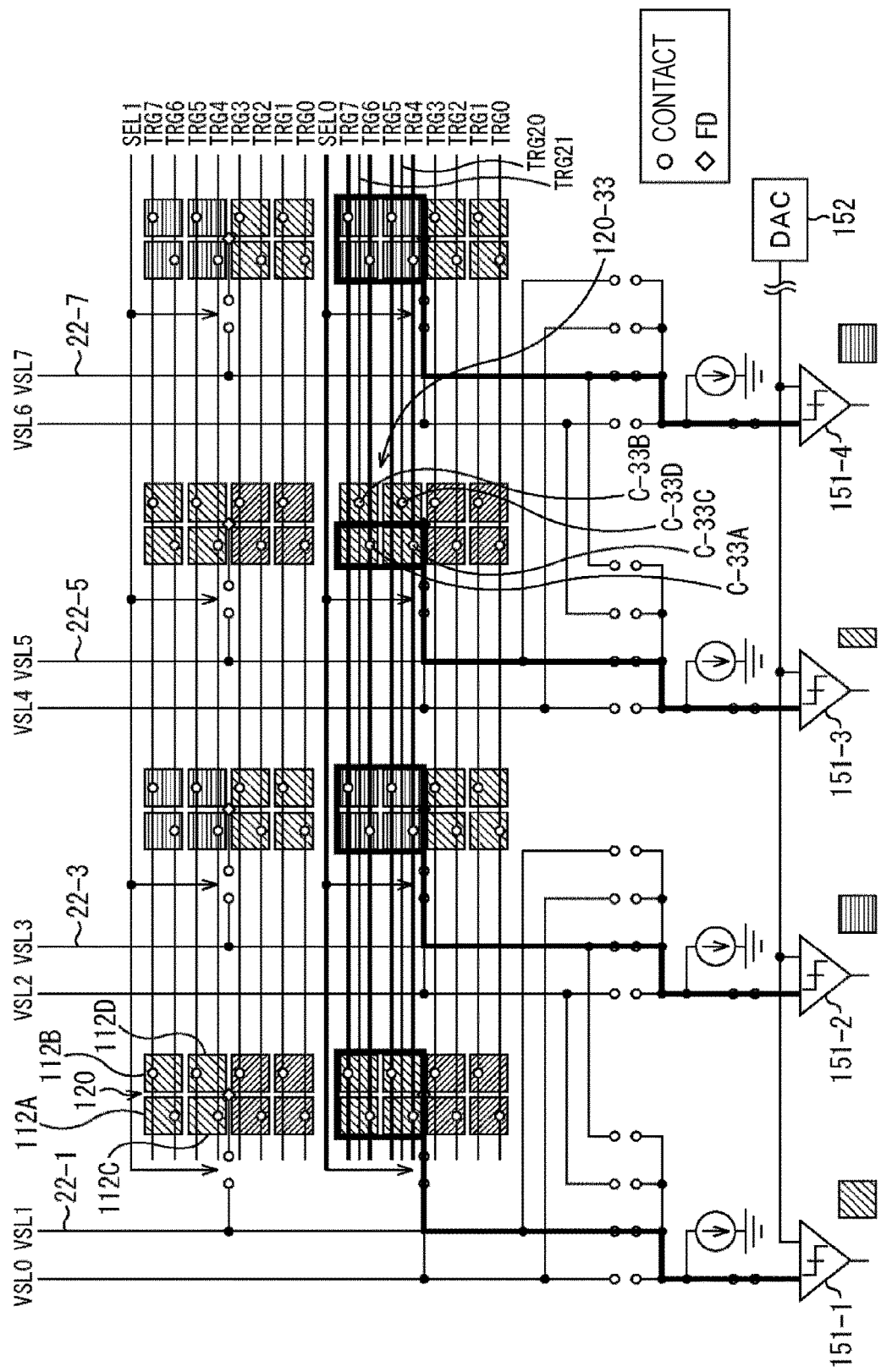
FIG. 19 is a diagram illustrating a first configuration of a read function of the present technology.

In FIG. 19, the drive signal SEL0 becomes an H level, and the selection transistor SEL-Tr shared by the share pixels including the pixels 120 of the third and fourth rows on the lower side is in an ON state, and the share pixels are selected.

At this time, as illustrated in FIG. 19, among the drive signals TRG0 to TRG7, TRG20, and TRG21, the drive signals TRG4 to TRG7 are at an H level, and in each pixel 120 of the third row (excluding the pixel 120 of the third column), the transfer transistors TR-Tr-A to TR-Tr-D become an ON state simultaneously.

Therefore, in each pixel 120 of the third row (excluding the pixels 120 of the third column), as indicated by the thick frames in FIG. 19, the electric charges accumulated in the photodiodes 112A to 112D are added up and read, and the pixel signal (A+B+C+D signal) is obtained.

Here, among the pixels 120 of the third row, focusing on the pixel 120-33 of the third column, as described above, in the upper right pixel 120B and the lower right pixel 120D, the contacts C-33B and C-33D are connected to the drive lines TRG21 and TRG20, and the drive signals TRG21 and TRG20 applied to the drive lines are at an L level. Therefore, in the pixel 120-33, only the left transfer transistors TR-Tr-A and TR-Tr-C become an ON state.

Therefore, in the pixel 120-33, as indicated by the thick frame in FIG. 19, the electric charges accumulated in the left photodiodes 112A and 112C are independently read, and the pixel signal (A+C signal) is obtained.

Furthermore, although illustration is omitted, the pixels 120 arranged in the pixel array unit 11 include pixels 120 in which only the electric charges accumulated in the right photodiodes 112B and 112D are read and the pixel signal (B+D signal) can be acquired in contrast to the pixel 120-33. For example, if the pixel 120-33 described above is the pixel 120 capable of acquiring the B+D signal, it is only required to connect the contacts C-33A and C-33C to the drive lines TRG21 and TRG20 instead of the drive lines TRG6 and TRG4, and connect the contacts C-33B and C-33D to the drive lines TRG7 and TRG5.

That is, the pixels 120 arranged in the pixel array unit 11 include pixels 120 capable of acquiring the A+B+C+D signal as the image acquisition pixel, and pixels 120 capable of acquiring the left A+C signal and pixels 120 capable of acquiring the right B+D signal as the phase difference detection pixel. Here, as indicated in the above-described first to fourth embodiments, the density of the pixels 120 operating as the phase difference detection pixels is determined on the basis of the gain, the luminance level, and the like (for example, 3% or the like in the case of the drive control A), and the pixel 120 according to the density operates as the phase difference detection pixel for obtaining the A+C signal or the B+D signal.

Then, in the read operation of the present technology, as illustrated in FIG. 19, the A+C signal and the B+D signal are obtained as signals for phase difference detection, and the A+B+C+D signal is obtained as a signal for image acquisition. Therefore, in order to acquire a signal for phase difference detection, it is only necessary to perform the read operation once. That is, in the above-described current read operation, it was necessary to perform reading a plurality of times in order to acquire the signal for phase difference detection, but in the read operation of the present technology, it is possible to reduce the number of times of read operation to one.

Figure 20:
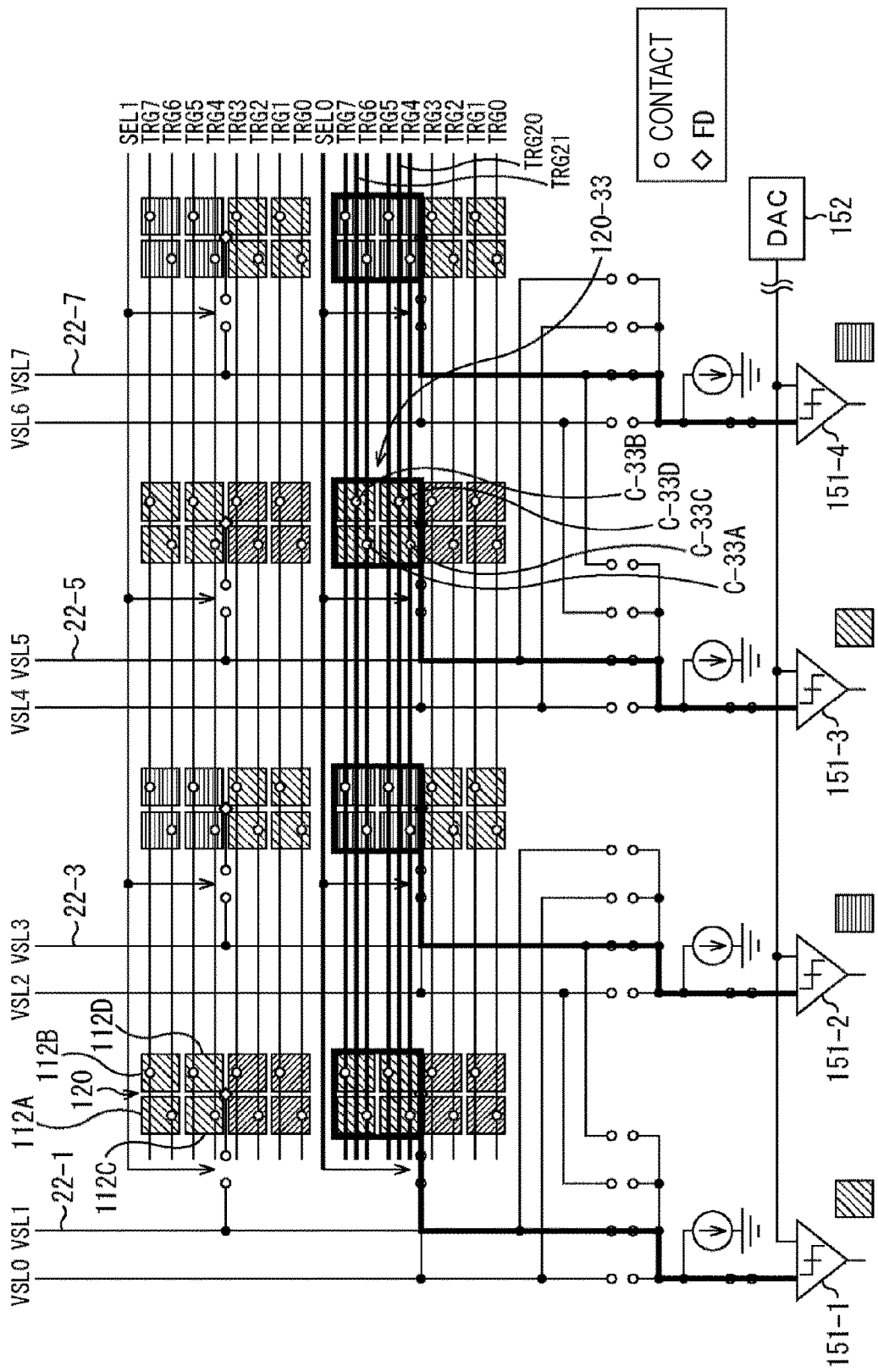
FIG. 20 is a diagram illustrating the first configuration of a read function of the present technology.

Note that in a case where the pixel 120-33 is caused to operate as the image acquisition pixel, as illustrated in FIG. 20, the drive signal SEL0 is set to an H level state, and moreover the drive signals TRG4 to TRG7 and the drive signals TRG20 and TRG21 are set to an H level. Therefore, in the pixel 120-33, similarly to the other pixels 120 of the third row, the transfer transistors TR-Tr-A to TR-Tr-D are simultaneously set to an ON state, and as indicated by the thick frame in FIG. 20, the electric charges accumulated in the photodiodes 112A to 112D are added up and read, and the pixel signal (A+B+C+D signal) is obtained.

(Read Operation: Second Configuration of the Present Technology)

Next, the read operation of the second configuration of the present technology will be described with reference to FIGS. 21 and 22.

Figure 21:
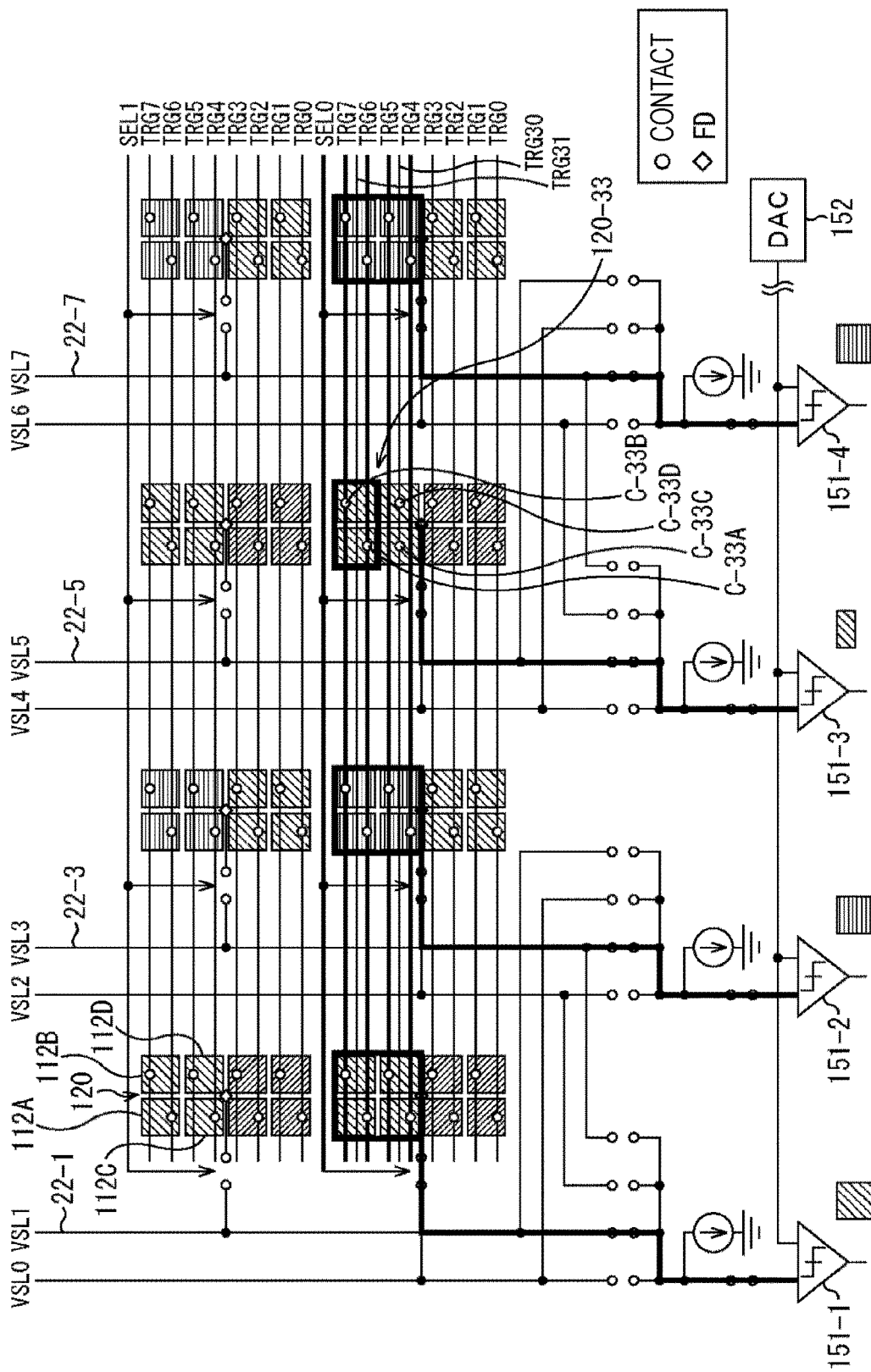
FIG. 21 is a diagram illustrating a second configuration of a read function of the present technology.

In FIG. 21, the drive signal SEL0 becomes an H level, and the selection transistor SEL-Tr shared by the share pixels including the pixels 120 of the third and fourth rows on the lower side is in an ON state, and the share pixels are selected.

At this time, as illustrated in FIG. 21, among the drive signals TRG0 to TRG7, TRG30, and TRG31, the drive signals TRG4 to TRG7 are at an H level, and in each pixel 120 of the third row (excluding the pixel 120 of the third column), the transfer transistors TR-Tr-A to TR-Tr-D become an ON state simultaneously.

Therefore, in each pixel 120 of the third row (excluding the pixels 120 of the third column), as indicated by the thick frames in FIG. 21, the electric charges accumulated in the photodiodes 112A to 112D are added up and read, and the pixel signal (A+B+C+D signal) is obtained.

Here, among the pixels 120 of the third row, focusing on the pixel 120-33 of the third column, as described above, in the lower left pixel 120C and the lower right pixel 120D, the contacts C-33B and C-33D are connected to the drive line TRG30, and the drive signal TRG30 applied to the drive line is at an L level. Therefore, in the pixel 120-33, only the upper transfer transistors TR-Tr-A and TR-Tr-B become an ON state.

Therefore, in the pixel 120-33, as indicated by the thick frame in FIG. 21, the electric charges accumulated in the upper photodiodes 112A and 112B are independently read, and the pixel signal (A+B signal) is obtained.

Furthermore, although illustration is omitted, the pixels 120 arranged in the pixel array unit 11 include pixels 120 in which only the electric charges accumulated in the lower photodiodes 112C and 112D are read and the pixel signal (C+D signal) can be acquired in contrast to the pixel 120-33. If the pixel 120-33 described above is the pixel 120 capable of acquiring the C+D signal, it is only required to connect the contacts C-33A and C-33B to the drive line TRG31 together instead of the drive lines TRG6 and TRG7, and connect the contacts C-33C and C-33D to the drive lines TRG4 and TRG5.

That is, the pixels 120 arranged in the pixel array unit 11 include pixels 120 capable of acquiring the A+B+C+D signal as the image acquisition pixel, and pixels 120 capable of acquiring the upper A+B signal and pixels 120 capable of acquiring the lower C+D signal as the phase difference detection pixel. Here, as indicated in the above-described first to fourth embodiments, the density of the pixels 120 operating as the phase difference detection pixels is determined on the basis of the gain, the luminance level, and the like (for example, 3% or the like in the case of the drive control A), and the pixel 120 according to the density operates as the phase difference detection pixel for obtaining the A+B signal or the C+D signal.

Then, in the read operation of the present technology, as illustrated in FIG. 21, the A+B signal and the C+D signal are obtained as signals for phase difference detection, and the A+B+C+D signal is obtained as a signal for image acquisition. Therefore, in order to acquire a signal for phase difference detection, it is only necessary to perform the read operation once. That is, in the above-described current read operation, it was necessary to perform reading a plurality of times in order to acquire the signal for phase difference detection, but in the read operation of the present technology, it is possible to reduce the number of times of read operation to one.

Figure 22:
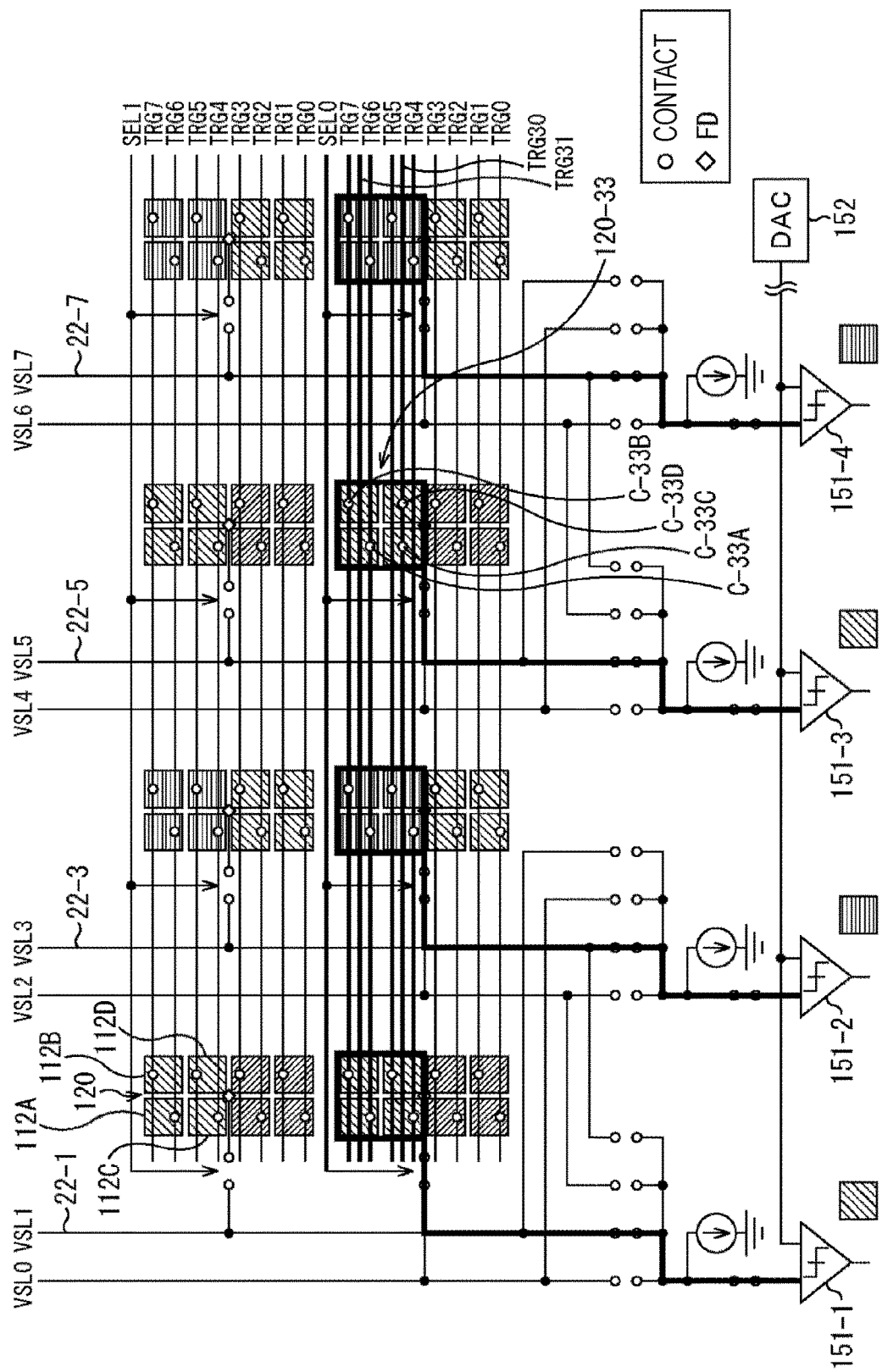
FIG. 22 is a diagram illustrating the second configuration of the read function of the present technology.

Note that in a case where the pixel 120-33 is caused to operate as the image acquisition pixel, as illustrated in FIG. 22, the drive signal SEL0 is set to an H level state, and moreover the drive signals TRG4 to TRG7 and the drive signals TRG30 and TRG31 are set to an H level. Therefore, in the pixel 120-33, similarly to the other pixels 120 of the third row, the transfer transistors TR-Tr-A to TR-Tr-D are simultaneously set to an ON state, and as indicated by the thick frame in FIG. 22, the electric charges accumulated in the photodiodes 112A to 112D are added up and read, and the pixel signal (A+B+C+D signal) is obtained.

8. Variation

In the above description, the pixels 100 or pixels 120 arranged in the pixel array unit 11 are described as being configured as the first pixel portion or the second pixel portion depending on the form of connection with the drive lines TRG. However, these pixel portions can be pixel units having one or more photoelectric conversion units (for example, photodiodes). For example, the pixel unit can have an even number of photoelectric conversion units (for example, photodiodes).

More specifically, the pixel 100 configured as the first pixel portion or the second pixel portion has two photoelectric conversion units: the photodiode 112A of the left pixel 100A and the photodiode 112B of the right pixel 100B. Furthermore, the pixel 120 configured as the first pixel portion or the second pixel portion has four photoelectric conversion units: the photodiode 112A of the upper left pixel 120A, the photodiode 112B of the upper right pixel 120B, the photodiode 112C of the lower left pixel 120C, and the photodiode 112D of the lower right pixel 120D.

Note that, in the above description, the case where the first pixel portion or the second pixel portion is a pixel unit having two or four photoelectric conversion units is described, but more photoelectric conversion units such as a pixel unit having, for example, eight photoelectric conversion units, may be provided. Furthermore, in the above description, the case where the electric charge accumulated in the photodiode 112A or the photodiode 112B is independently read in the pixel portion has been mainly described, but, as described above, the electric charges accumulated in the photodiode 112A and the photodiode 112B may be independently read.

Furthermore, in the above-described embodiments, the case is described where the AE unit 212 functions as the illuminance detection unit that detects the illuminance in the imaging region of the pixel array unit 11 on the basis of the exposure information set in the solid-state imaging element 10, but the method for detecting the illuminance is not limited thereto.

That is, in the above-described embodiments, the AE unit 212 detects the illuminance in the imaging region of the pixel array unit 11 on the basis of the exposure amount obtained from the image frame preceding a target image frame, but, for example, an image frame for detecting the illuminance may be separately generated. Furthermore, an illuminance sensor for detecting illuminance may be provided. The illuminance sensor can be provided inside or outside the solid-state imaging element 10 (at a position different from the solid-state imaging element 10).

Moreover, in the above-described embodiments, as the information related to the accuracy of the phase difference detection used for the threshold value determination together with the gain depending on the illuminance (hereinafter, also referred to as the accuracy-related information), the luminance level in the target region in the target image frame (luminance level of the above Formula (1)), the number of effective pixels among the pixels used for phase difference detection (the number of effective phase difference detection pixels of the above Formula (2)), and the size of the region of interest in the target image frame (ROI area of the above Formula (3)) are described, but the accuracy-related information is not limited thereto.

That is, the luminance level, the number of effective phase difference detection pixels, and the ROI area described in the above embodiments are examples of accuracy-related information. Furthermore, it can also be said that the luminance level detection unit 213 of the control unit 200A (FIG. 5), the phase difference detection unit 214 and the counting unit 215 of the control unit 200B (FIG. 7), and the ROI setting unit 216 of the control unit 200C (FIG. 9) are an acquisition unit that acquires the accuracy-related information related to the accuracy of phase difference detection.

Note that, in the above-described embodiments, as the imaging apparatus, the imaging apparatus 1A (FIGS. 5 and 11), the imaging apparatus 1B (FIG. 7), and the imaging apparatus 1C (FIG. 9) are described, but the solid-state imaging element 10 (FIG. 1 and the like) may be understood to be an imaging apparatus. That is, it can also be said that the solid-state imaging element 10 is, for example, a CMOS image sensor and is an imaging apparatus.

In the above-described embodiments, as the structure of the pixels 100 or pixels 120 arranged in the pixel array unit 11, the dual PD-type structure and the 2×2 OCL structure are described, but other structures may be adopted. In short, as the pixels arranged in the pixel array unit 11, it is sufficient if pixels can be used as image acquisition pixels or phase difference detection pixels, and their structure is arbitrary. Note that the phase difference detection pixel is a pixel for image plane phase difference AF, and is also called a phase detection auto focus (PDAF) pixel or the like.

Furthermore, in the above-described embodiments, as the solid-state imaging element 10, a CMOS image sensor is described as an example, but the application is not limited to the CMOS image sensor, but it is applicable to general solid-state imaging elements in which pixels are two-dimensionally arranged, e.g., a charge coupled device (CCD) image sensor. Moreover, the present technology is applicable not only to a solid-state imaging element that detects the distribution of the incident light amount of visible light and captures it as an image, but also to general solid-state imaging elements that capture the distribution of the incident light amount of particles or the like as an image.

9. Configuration of Electronic Equipment

Figure 23:
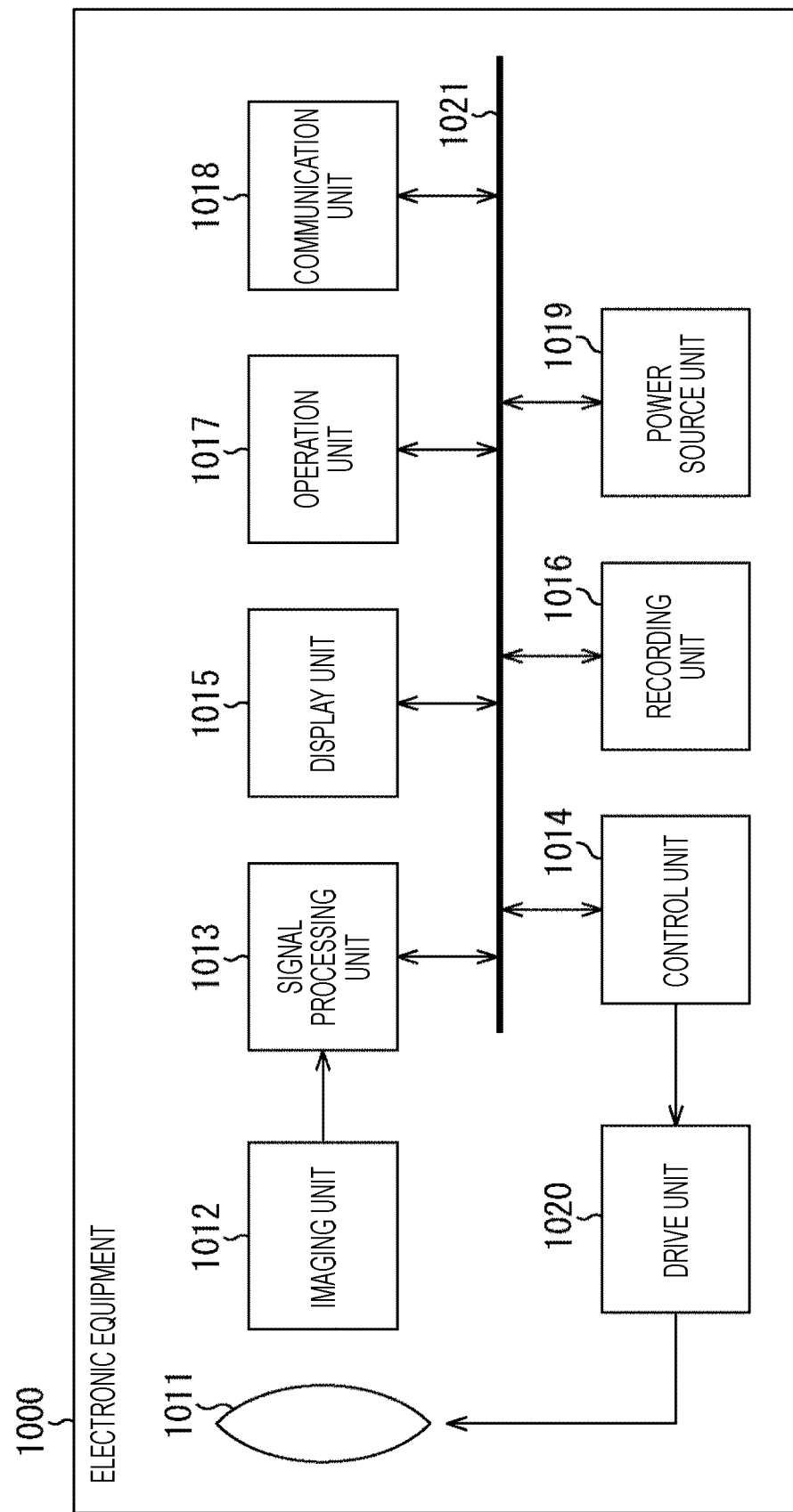
FIG. 23 is a block diagram illustrating a configuration example of electronic equipment including a solid-state imaging element to which the present technology is applied.

FIG. 23 is a block diagram illustrating a configuration example of electronic equipment including a solid-state imaging element to which the present technology is applied.

Electronic equipment 1000 is electronic equipment with an imaging function, such as an imaging apparatus including a digital still camera, a video camera, or the like, a mobile terminal apparatus including a smartphone, a tablet terminal, or a mobile phone, and the like, for example.

The electronic equipment 1000 includes a lens unit 1011, an imaging unit 1012, a signal processing unit 1013, a control unit 1014, a display unit 1015, a recording unit 1016, an operation unit 1017, a communication unit 1018, a power source unit 1019, and a drive unit 1020. Furthermore, the signal processing unit 1013, the control unit 1014, the display unit 1015, the recording unit 1016, the operation unit 1017, the communication unit 1018, and the power source unit 1019 are connected to each other through a bus 1021 in the electronic equipment 1000.

The lens unit 1011 includes a zoom lens, a focus lens, and the like and condenses light from a subject. The light (subject light) condensed by the lens unit 1011 enters the imaging unit 1012.

The imaging unit 1012 includes a solid-state imaging element to which the present technology has been applied (for example, the solid-state imaging element 10 of FIG. 1). The imaging unit 1012 photoelectrically converts the light (subject light) received through the lens unit 1011 into an electrical signal and supplies the resultant signal to the signal processing unit 1013.

Note that, in the imaging unit 1012, the pixel array unit 11 of the solid-state imaging element 10 includes pixels 100 (or pixels 120) as pixels that are regularly arranged in a predetermined arrangement pattern. The pixel 100 (or the pixel 120) can be used as an image acquisition pixel or a phase difference detection pixel. Here, the imaging unit 1012 may be considered as a solid-state imaging element to which the present technology is applied.

The signal processing unit 1013 is a signal processing circuit that processes a signal supplied from the imaging unit 1012. For example, the signal processing unit 1013 includes a digital signal processor (DSP) circuit and the like.

The signal processing unit 1013 processes the signal from the imaging unit 1012 to generate image data of a still image or a moving image, and supplies the image data to the display unit 1015 or the recording unit 1016. Furthermore, the signal processing unit 1013 generates data for detecting the phase difference (phase difference detection data) on the basis of the signal from the imaging unit 1012 (phase difference detection pixel) and supplies the data to the control unit 1014.

The control unit 1014 includes, for example, a central processing unit (CPU), a microprocessor, and the like. The control unit 1014 controls the operation of each unit of the electronic equipment 1000.

The display unit 1015 includes, for example, a display apparatus, such as a liquid crystal display (LCD) and an organic electro luminescence (EL) display. The display unit 1015 processes the image data supplied from the signal processing unit 1013 and displays the still images or the moving images captured by the imaging unit 1012.

The recording unit 1016 includes, for example, a recording medium, such as a semiconductor memory, a hard disk, and an optical disk. The recording unit 1016 records the image data supplied from the signal processing unit 1013. Furthermore, the recording unit 1016 outputs recorded image data according to control from the control unit 1014.

The operation unit 1017 includes, for example, physical buttons as well as a touch panel in combination with the display unit 1015. The operation unit 1017 outputs operation commands regarding various functions of the electronic equipment 1000 according to operation by the user. The control unit 1014 controls operation of each unit on the basis of the operation commands supplied from the operation unit 1017.

The communication unit 1018 includes, for example, a communication interface circuit or the like. The communication unit 1018 exchanges data with external equipment through wireless communication or wired communication according to a predetermined communication standard.

The power source unit 1019 appropriately supplies various power sources as operation power sources of the imaging unit 1012, the signal processing unit 1013, the control unit 1014, the display unit 1015, the recording unit 1016, the operation unit 1017, the communication unit 1018, and the drive unit 1020 to these supply targets.

Furthermore, the control unit 1014 detects the phase difference between two images on the basis of the phase difference detection data supplied from the signal processing unit 1013. Then, the control unit 1014 determines whether or not the object as a target of focusing (object to be focused) is focused on the basis of the detection result of the phase difference. The control unit 1014 calculates an amount of deviation of focus (amount of defocus) in a case where the object to be focused is not focused and supplies the amount of defocus to the drive unit 1020.

The drive unit 1020 includes, for example, a motor or the like and drives the lens unit 1011 including the zoom lens, the focus lens, and the like.

The drive unit 1020 calculates an amount of drive of the focus lens of the lens unit 1011 on the basis of the amount of defocus supplied from the control unit 1014 and moves the focus lens according to the amount of drive. Note that the drive unit 1020 maintains the current position of the focus lens in a case where the object to be focused is focused. In this way, the image plane phase difference AF is performed.

The electronic equipment 1000 is configured as described above.

10. Example of Use of the Solid-State Imaging Element

Figure 24:
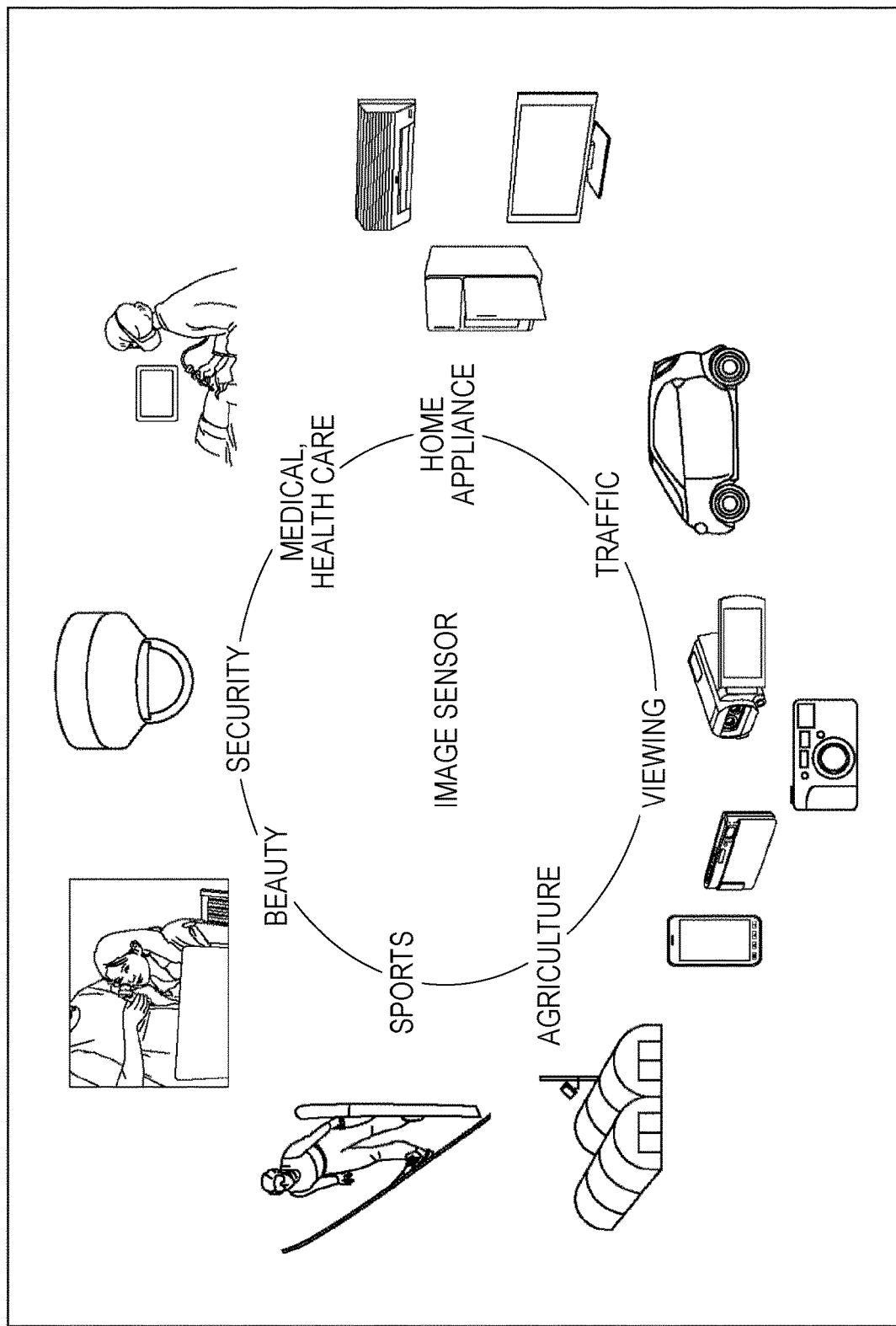
FIG. 24 is a diagram illustrating a usage example of a solid-state imaging element to which the present technology is applied.

FIG. 24 is a diagram illustrating a usage example of the solid-state imaging element to which the present technology is applied.

The solid-state imaging element 10 (FIG. 1) can be used in, for example, various cases of sensing light, such as visible light, infrared light, ultraviolet light, and X rays, and the like. That is, as illustrated in FIG. 24, the solid-state imaging element 10 can be used in apparatuses used not only in a field of viewing in which images to be viewed are captured, but also in a field of traffic, a field of home appliance, a field of medical and healthcare, a field of security, a field of beauty, a field of sports, a field of agriculture, or the like, for example.

Specifically, in the field of viewing, the solid-state imaging element 10 can be used in, for example, an apparatus (for example, electronic equipment 1000 of FIG. 23) for capturing an image to be viewed, such as a digital camera, a smartphone, and a mobile phone with a camera function.

In the field of traffic, the solid-state imaging element 10 can be used in, for example, an apparatus used for traffic, such as an on-board sensor that captures images of the front, back, surroundings, inside of a car, or the like, a monitoring camera that monitors traveling vehicles or roads, and a distance measurement sensor that measures the distance between vehicles and the like, for safe drive like automatic stop or for recognizing the state of the driver.

In the field of home appliance, the solid-state imaging element 10 can be used in, for example, an apparatus used as a home appliance, such as a television receiver, a refrigerator, and an air conditioner, that captures an image of a gesture of the user to perform equipment operation according to the gesture. Furthermore, in the field of medical and healthcare, the solid-state imaging element 10 can be used in, for example, an apparatus used for medical or healthcare, such as an endoscope and an apparatus that captures images of blood vessels by receiving infrared light.

In the field of security, the solid-state imaging element 10 can be used in, for example, an apparatus used for security, such as a monitoring camera for crime prevention and a camera for personal authentication. Furthermore, in the field of beauty, the solid-state imaging element 10 can be used in, for example, an apparatus used for beauty, such as a skin measurement device that captures images of the skin and a microscope that captures images of the scalp.

In the field of sports, the solid-state imaging element 10 can be used in, for example, an apparatus used for sports, such as an action camera and a wearable camera for sports and the like. Furthermore, in the field of agriculture, the solid-state imaging element 10 can be used in, for example, an apparatus used for agriculture, such as a camera that monitors the state of a farm or produce.

11. Application Examples to Mobile Objects

The technology according to the present disclosure (present technology) is applicable to a variety of products. For example, the technology according to the present disclosure may be implemented as apparatuses mounted on any type of movable bodies such as automobiles, electric vehicles, hybrid electric vehicles, motorcycles, bicycles, personal mobilities, airplanes, drones, ships, or robots.

Figure 25:
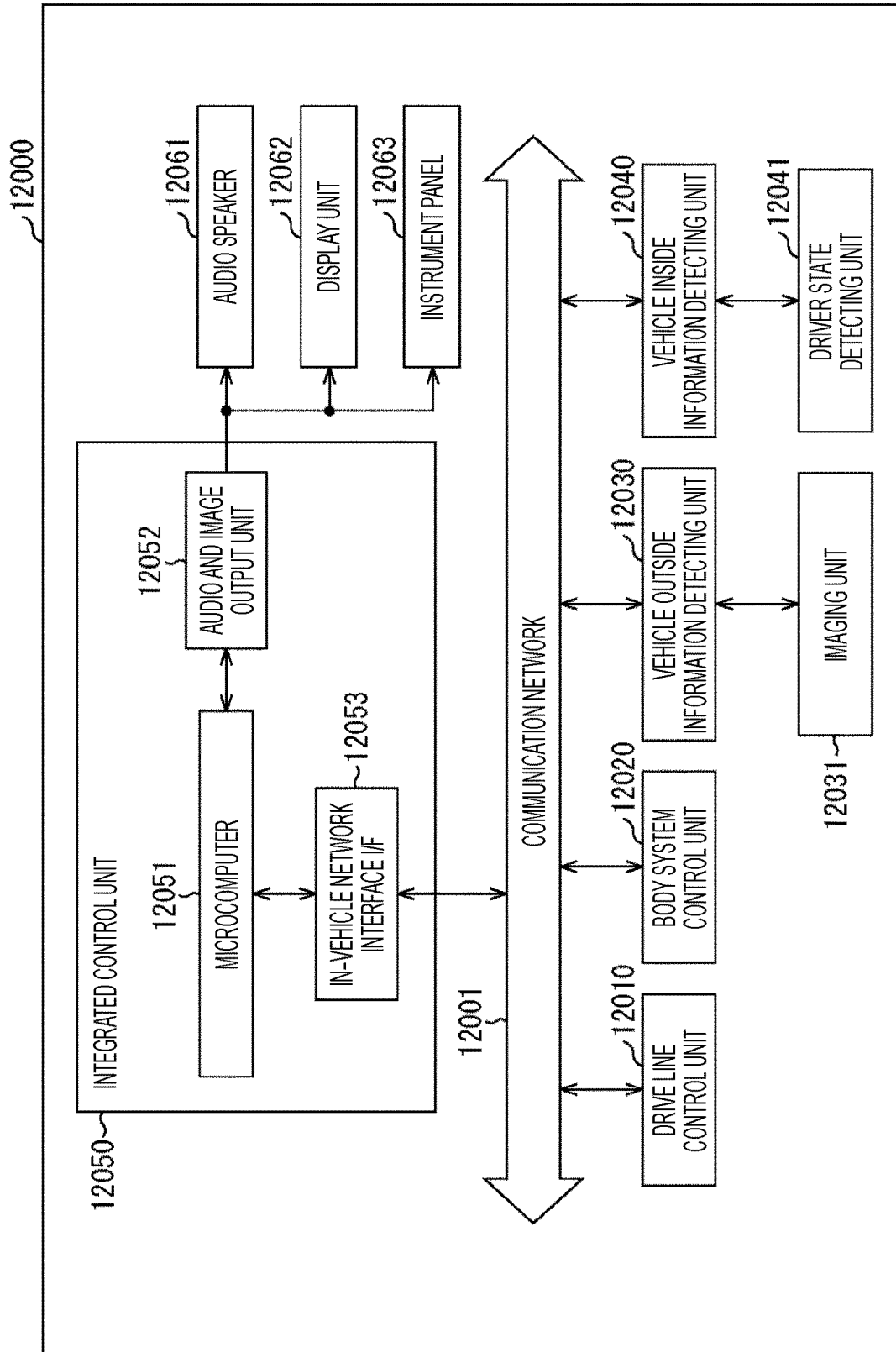
FIG. 25 is a block diagram illustrating an example of a schematic configuration of a vehicle control system.

FIG. 25 is a block diagram illustrating a schematic configuration example of a vehicle control system, which is an example of a movable body control system to which the technology according to the present disclosure can be applied.

The vehicle control system 12000 includes a plurality of electronic control units connected via a communication network 12001. In the example illustrated in FIG. 25, the vehicle control system 12000 includes a drive line control unit 12010, a body system control unit 12020, a vehicle outside information detecting unit 12030, a vehicle inside information detecting unit 12040, and an integrated control unit 12050. Furthermore, a microcomputer 12051, an audio and image output unit 12052, and an in-vehicle network interface (I/F) 12053 are illustrated as functional configurations of the integrated control unit 12050.

The drive line control unit 12010 controls the operation of apparatuses related to the drive line of the vehicle in accordance with a variety of programs. For example, the drive line control unit 12010 functions as a control apparatus for a driving force generating apparatus such as an internal combustion engine or a driving motor that generates the driving force of the vehicle, a driving force transferring mechanism that transfers the driving force to wheels, a steering mechanism that adjusts the steering angle of the vehicle, a braking apparatus that generates the braking force of the vehicle, and the like.

The body system control unit 12020 controls the operations of a variety of apparatuses attached to the vehicle body in accordance with a variety of programs. For example, the body system control unit 12020 functions as a control apparatus for a keyless entry system, a smart key system, a power window apparatus, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 accepts input of these radio waves or signals, and controls the door lock apparatus, the power window apparatus, the lights, or the like of the vehicle.

The vehicle outside information detecting unit 12030 detects information regarding the outside of the vehicle including the vehicle control system 12000. For example, the imaging unit 12031 is connected to the vehicle outside information detecting unit 12030. The vehicle outside information detecting unit 12030 causes the imaging unit 12031 to capture images of the outside of the vehicle, and receives the captured image. The vehicle outside information detecting unit 12030 may perform processing of detecting an object such as a person, a car, an obstacle, a traffic sign, or a letter on a road, or processing of detecting the distance on the basis of the received image.

The imaging unit 12031 is an optical sensor that receives light and outputs an electric signal corresponding to the amount of received light. The imaging unit 12031 can output the electric signal as the image or output the electric signal as ranging information. Furthermore, the light received by the imaging unit 12031 may be visible light or invisible light such as infrared light.

The vehicle inside information detecting unit 12040 detects information of the inside of the vehicle. The vehicle inside information detecting unit 12040 is connected, for example, to a driver state detecting unit 12041 that detects the state of the driver. The driver state detecting unit 12041 includes, for example, a camera that images a driver, and the vehicle inside information detecting unit 12040 may compute the degree of the driver's tiredness or the degree of the driver's concentration or determine whether or not the driver has a doze, on the basis of detection information input from the driver state detecting unit 12041.

The microcomputer 12051 can calculate a control target value of the driving force generating apparatus, the steering mechanism, or the braking apparatus on the basis of information regarding the inside and outside of the vehicle acquired by the vehicle outside information detecting unit 12030 or the vehicle inside information detecting unit 12040, and output a control instruction to the drive line control unit 12010. For example, the microcomputer 12051 can perform cooperative control for the purpose of executing the functions of the advanced driver assistance system (ADAS) including vehicle collision avoidance or impact reduction, follow-up driving based on the inter-vehicle distance, constant vehicle speed driving, vehicle collision warning, vehicle lane deviation warning, or the like.

Furthermore, the microcomputer 12051 can perform cooperative control for the purpose of automatic driving or the like for autonomous running without depending on the driver's operation through control of the driving force generating apparatus, the steering mechanism, the braking apparatus, or the like on the basis of information around the vehicle acquired by the vehicle outside information detecting unit 12030 or the vehicle inside information detecting unit 12040.

Furthermore, the microcomputer 12051 can output a control instruction to the body system control unit 12020 on the basis of the information outside the vehicle obtained by the vehicle outside information detecting unit 12030. For example, the microcomputer 12051 can perform the cooperative control for realizing glare protection such as controlling the head light according to a position of a preceding vehicle or an oncoming vehicle detected by the vehicle outside information detecting unit 12030 to switch a high beam to a low beam.

The audio and image output unit 12052 transmits an output signal of at least one of a sound or an image to an output apparatus capable of visually or aurally notifying a passenger of the vehicle or the outside of the vehicle of information. In the example of FIG. 25, an audio speaker 12061, a display unit 12062, and an instrument panel 12063 are exemplified as the output apparatus. For example, the display unit 12062 may include at least one of an onboard display or a head-up display.

Figure 26:
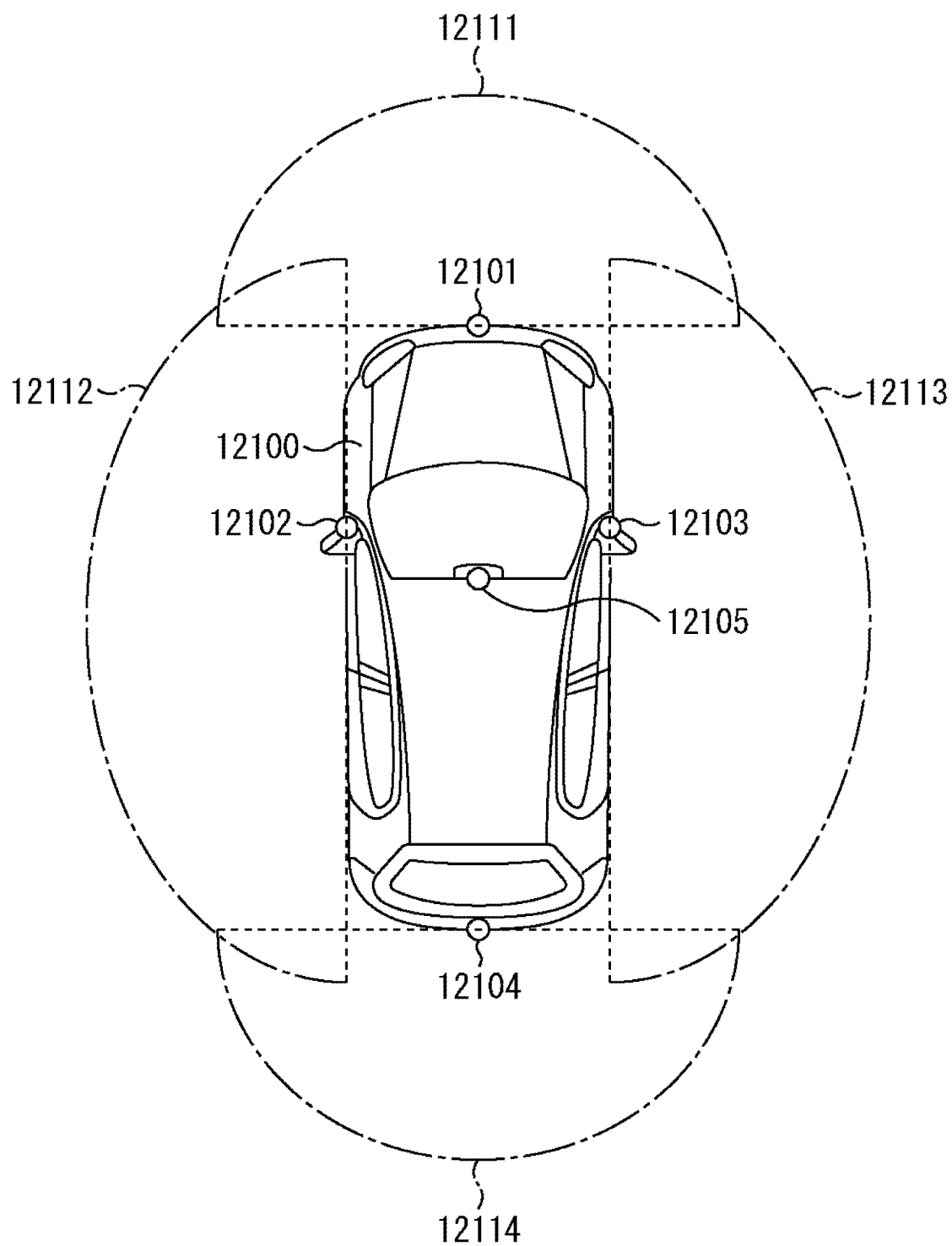
FIG. 26 is an explanatory diagram illustrating an example of installation positions of a vehicle outside information detecting unit and an imaging unit.

FIG. 26 is a view illustrating an example of an installation position of the imaging unit 12031.

In FIG. 26, a vehicle 12100 includes imaging units 12101, 12102, 12103, 12104, and 12105 as the imaging unit 12031.

Imaging units 12101, 12102, 12103, 12104 and 12105 are positioned, for example, at the front nose, a side mirror, the rear bumper, the back door, the upper part of the windshield in the vehicle compartment, or the like of the vehicle 12100. The imaging unit 12101 attached to the front nose and the imaging unit 12105 attached to the upper part of the windshield in the vehicle compartment mainly acquire images of the area ahead of the vehicle 12100. The imaging units 12102 and 12103 attached to the side mirrors mainly acquire images of the areas on the sides of the vehicle 12100. The imaging unit 12104 attached to the rear bumper or the back door mainly acquires images of the area behind the vehicle 12100. The forward images acquired by the imaging units 12101 and 12105 are mainly used for detecting a preceding vehicle, a pedestrian, an obstacle, a traffic light, a traffic sign, a lane, and the like.

Note that FIG. 26 illustrates an example of the respective imaging ranges of the imaging units 12101 to 12104. An imaging range 12111 represents the imaging range of the imaging unit 12101 attached to the front nose. Imaging ranges 12112 and 12113 respectively represent the imaging ranges of the imaging units 12102 and 12103 attached to the side mirrors. An imaging range 12114 represents the imaging range of the imaging unit 12104 attached to the rear bumper or the back door. For example, overlaying image data captured by the imaging units 12101 to 12104 offers an overhead image that looks down on the vehicle 12100.

At least one of the imaging units 12101 to 12104 may have a function of obtaining distance information. For example, at least one of the imaging units 12101 to 12104 may be a stereo camera including a plurality of image sensors, or may be an image sensor having pixels for phase difference detection.

For example, the microcomputer 12051 may extract especially a closest three-dimensional object on a traveling path of the vehicle 12100, the three-dimensional object traveling at a predetermined speed (for example, 0 km/h or higher) in a direction substantially the same as that of the vehicle 12100 as the preceding vehicle by determining a distance to each three-dimensional object in the imaging ranges 12111 to 12114 and change in time of the distance (relative speed relative to the vehicle 12100) on the basis of the distance information obtained from the imaging units 12101 to 12104. Moreover, the microcomputer 12051 can set an inter-vehicle distance to be secured in advance from the preceding vehicle, and can perform automatic brake control (including follow-up stop control), automatic acceleration control (including follow-up start control), and the like. In this manner, it is possible to perform the cooperative control for realizing automatic driving or the like to autonomously travel independent from the operation of the driver.

For example, the microcomputer 12051 can extract three-dimensional object data regarding the three-dimensional object while sorting the data into a two-wheeled vehicle, a regular vehicle, a large vehicle, a pedestrian, and other three-dimensional object such as a utility pole on the basis of the distance information obtained from the imaging units 12101 to 12104 and use the data for automatically avoiding obstacles. For example, the microcomputer 12051 discriminates obstacles around the vehicle 12100 into an obstacle visibly recognizable to a driver of the vehicle 12100 and an obstacle difficult to visually recognize. Then, the microcomputer 12051 determines a collision risk indicating a degree of risk of collision with each obstacle, and when the collision risk is equal to or higher than a set value and there is a possibility of collision, the microcomputer 12051 can perform driving assistance for avoiding the collision by outputting an alarm to the driver via the audio speaker 12061 and the display unit 12062 or performing forced deceleration or avoidance steering via the drive line control unit 12010.

At least one of the imaging units 12101 to 12104 may be an infrared camera for detecting infrared rays. For example, the microcomputer 12051 can recognize a pedestrian by determining whether or not there is a pedestrian in the captured images of the imaging units 12101 to 12104. Such pedestrian recognition is carried out, for example, by a procedure of extracting feature points in the captured images of the imaging units 12101 to 12104 as infrared cameras and a procedure of performing pattern matching processing on a series of feature points indicating an outline of an object to discriminate whether or not the object is a pedestrian. When the microcomputer 12051 determines that there is a pedestrian in the captured images of the imaging units 12101 to 12104 and recognizes the pedestrian, the audio and image output unit 12052 causes the display unit 12062 to superimpose a rectangular contour for emphasis on the recognized pedestrian. Furthermore, the audio and image output unit 12052 may causes the display unit 12062 to display icons or the like indicating pedestrians at desired positions.

An example of the vehicle control system to which the technology according to the present disclosure is applicable is heretofore described. The technology according to the present disclosure can be applied to the imaging unit 12031 among the configurations described above. Specifically, the solid-state imaging element 10 of FIG. 1 can be applied to the imaging unit 12031. By applying the technology according to the present disclosure to the imaging unit 12031, the frame rate can be increased and a captured image that is easier to see can be obtained, so that fatigue of the driver can be reduced.

12. Application Example to Endoscopic Surgery System

The technology according to the present disclosure (present technology) is applicable to a variety of products. For example, the technology according to the present disclosure may be applied to an endoscopic surgery system.

Figure 27:
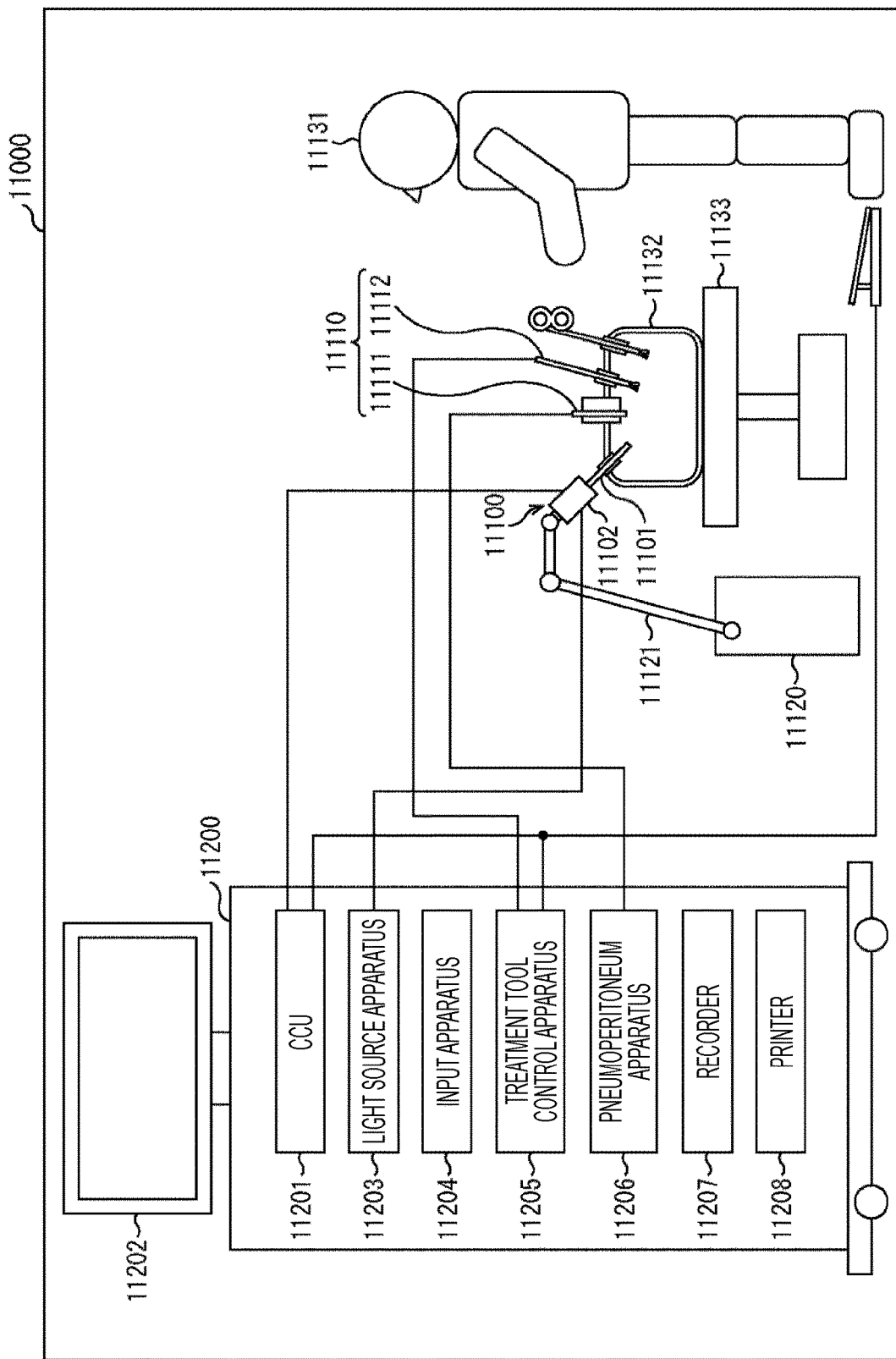
FIG. 27 is a diagram illustrating an example of a schematic configuration of an endoscopic surgery system.

FIG. 27 is a diagram illustrating an example of a schematic configuration of an endoscopic surgery system to which the technology (present technology) according to the present disclosure can be applied.

FIG. 27 illustrates a situation where an operator (doctor) 11131 is performing surgery on a patient 11132 on a patient bed 11133 using the endoscopic surgery system 11000. As illustrated, the endoscopic surgery system 11000 includes an endoscope 11100, other surgical tools 11110, e.g., a pneumoperitoneum tube 11111, an energy treatment tool 11112, or the like, a support arm apparatus 11120 supporting the endoscope 11100, and a cart 11200 on which various apparatuses for an endoscopic surgery are mounted.

The endoscope 11100 includes a lens tube 11101 in which a region of a predetermined length from a tip end, is inserted into the body cavity of the patient 11132, and a camera head 11102 connected to a base end of the lens tube 11101. In the illustrated example, the endoscope 11100 configured as a so-called rigid scope including a rigid lens tube 11101, is illustrated, but the endoscope 11100 may be configured as a so-called flexible scope including a flexible lens tube.

An opening portion into which an objective lens is fitted, is provided on the tip end of the lens tube 11101. A light source apparatus 11203 is connected to the endoscope 11100, and light generated by the light source apparatus 11203 is guided to the tip end of the lens tube by a light guide provided to extend in the lens tube 11101, and is emitted towards an observation target in the body cavity of the patient 11132 through the objective lens. Note that the endoscope 11100 may be a forward-viewing endoscope, or may be an oblique-viewing endoscope or a side-viewing endoscope.

In the camera head 11102, an optical system and an imaging element are provided, and reflection light (observation light) from the observation target, is condensed in the image sensor by the optical system. The observation light is subjected to the photoelectric conversion by the image sensor, and an electrical signal corresponding to the observation light, that is, an image signal corresponding to an observation image, is generated. The image signal is transmitted to a camera control unit (CCU) 11201, as RAW data.

The CCU 11201 includes a central processing unit (CPU), a graphics processing unit (GPU), or the like, and integrally controls the operation of the endoscope 11100 and the display apparatus 11202. Moreover, the CCU 11201 receives the image signal from the camera head 11102 and performs various image processing for displaying the image based on the image signal, for example, as development processing (demosaic processing) or the like, on the image signal.

The display apparatus 11202 displays an image based on the image signal subjected to the image processing by the CCU 11201 according to the control from the CCU 11201.

The light source apparatus 11203, for example, includes a light source such as a light emitting diode (LED) or the like, and supplies the irradiation light at the time of capturing the surgery site to the endoscope 11100.

The input apparatus 11204 is an input interface with respect to the endoscopic surgery system 11000. The user is capable of performing the input of various information items, or the input of an instruction with respect to endoscopic surgery system 11000, through the input apparatus 11204. For example, the user inputs an instruction or the like to change conditions of imaging (type of irradiation light, magnification, focal length, and the like) by the endoscope 11100.

The treatment tool control apparatus 11205 controls the driving of the energy treatment tool 11112 for the cauterization and the incision of the tissue, the sealing of the blood vessel, or the like. In order to ensure a visual field of the endoscope 11100 and to ensure a working space of the surgery operator, the pneumoperitoneum apparatus 11206 sends gas into the body cavity through the pneumoperitoneum tube 11111 such that the body cavity of the patient 11132 is inflated. The recorder 11207 is an apparatus capable of recording various information items associated with the surgery. The printer 11208 is an apparatus capable of printing various information items associated with the surgery, in various formats such as a text, an image, or a graph.

Note that the light source apparatus 11203 that supplies irradiation light when capturing the surgical site to the endoscope 11100 can be configured from, for example, a white light source configured by an LED, a laser light source, or a combination thereof. In a case where the white light source includes a combination of RGB laser light sources, it is possible to control an output intensity and an output timing of each color (each wavelength) with a high accuracy, and thus, it is possible to adjust a white balance of the captured image with the light source apparatus 11203. Furthermore, in this case, laser light from each of the RGB laser light sources is emitted to the observation target in a time division manner, and the driving of the image sensor of the camera head 11102 is controlled in synchronization with the emission timing, and thus, it is also possible to capture an image corresponding to each of RGB in a time division manner. According to such a method, it is possible to obtain a color image without providing a color filter in the image sensor.

Furthermore, the driving of the light source apparatus 11203 may be controlled such that the intensity of the light to be output is changed for each predetermined time. The driving of the image sensor of the camera head 11102 is controlled in synchronization with a timing when the intensity of the light is changed, images are acquired in a time division manner, and the images are synthesized, and thus, it is possible to generate an image of a high dynamic range, without so-called black defects and overexposure.

Furthermore, the light source apparatus 11203 may be configured to supply light of a predetermined wavelength band corresponding to special light imaging. In the special light imaging, for example, light of a narrow band is applied, compared to irradiation light at the time of performing usual observation by using wavelength dependency of absorbing light in the body tissue (i.e., white light), and thus, so-called narrow band imaging of capturing a predetermined tissue of a blood vessel or the like in a superficial portion of a mucous membrane with a high contrast, is performed. Alternatively, in the special light imaging, fluorescent light imaging of obtaining an image by fluorescent light generated by being irradiated with excited light, may be performed. In the fluorescent light imaging, for example, the body tissue is irradiated with the excited light, and the fluorescent light from the body tissue is observed (autofluorescent light imaging), or a reagent such as indocyanine green (ICG) is locally injected into the body tissue, and the body tissue is irradiated with excited light corresponding to a fluorescent light wavelength of the reagent, and thus, a fluorescent image is obtained. The light source apparatus 11203 can be configured to supply the narrow band light and/or the excited light corresponding to such special light imaging.

Figure 28:
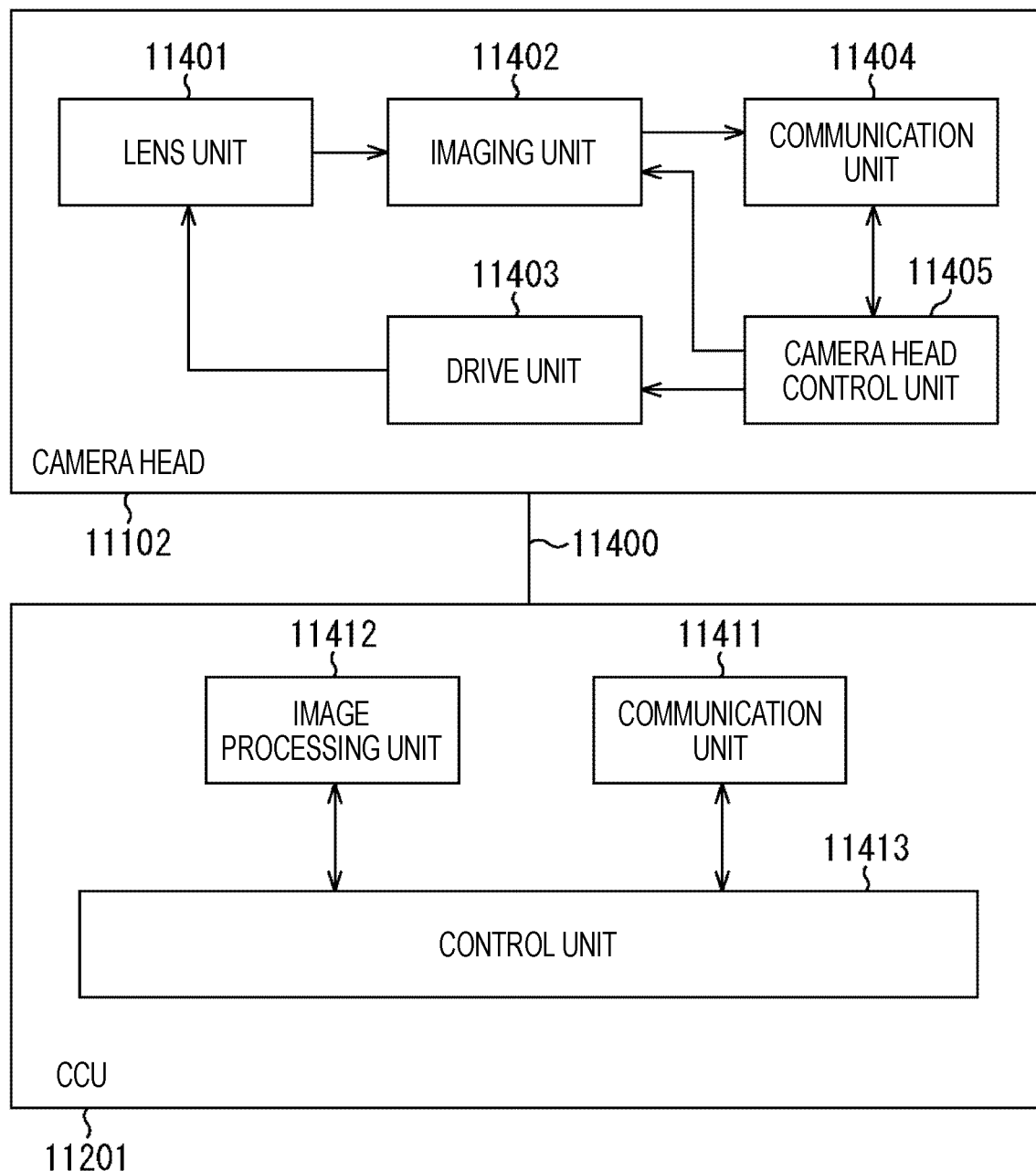
FIG. 28 is a block diagram illustrating an example of a function configuration of a camera head and a CCU.

FIG. 28 is a block diagram illustrating an example of a functional configuration of the camera head 11102 and the CCU 11201 illustrated in FIG. 27.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected to be capable of mutual communication through a transmission cable 11400.

The lens unit 11401 is an optical system provided in a connection portion with the lens tube 11101. Observation light incorporated from a tip end of the lens tube 11101 is guided to the camera head 11102 and is incident on the lens unit 11401. The lens unit 11401 includes a combination of a plurality of lenses including a zoom lens and a focus lens.

The imaging unit 11402 includes an imaging element. The image sensor constituting the imaging unit 11402 may be one (so-called single plate type) or plural (so-called multi-plate type). In a case where the imaging unit 11402 is configured as a multi-plate type, for example, image signals corresponding to RGB may be generated by each image sensor, and a color image may be obtained by combining them. Alternatively, the imaging unit 11402 may include a pair of image sensors for respectively acquiring right-eye and left-eye image signals corresponding to 3D (dimensional) display. The 3D display is performed, and thus, the surgery operator 11131 is capable of more accurately grasping the depth of the biological tissue in the surgery portion. Note that, in a case where the imaging unit 11402 is configured by a multi-plate type configuration, a plurality of lens units 11401 may be provided corresponding to each of the image sensors.

Furthermore, the imaging unit 11402 may not be necessarily provided in the camera head 11102. For example, the imaging unit 11402 may be provided immediately after the objective lens, in the lens tube 11101.

The drive unit 11403 includes an actuator, and moves the zoom lens and the focus lens of the lens unit 11401 along the optical axis by a predetermined distance, according to the control from the camera head control unit 11405. Therefore, it is possible to suitably adjust the magnification and the focal point of the image captured by the imaging unit 11402.

The communication unit 11404 includes a communication apparatus for transmitting and receiving various information items with respect to the CCU 11201. The communication unit 11404 transmits the image signal obtained from the imaging unit 11402 to the CCU 11201 through the transmission cable 11400, as the RAW data.

Furthermore, the communication unit 11404 receives a control signal for controlling the driving of the camera head 11102 from the CCU 11201 and supplies the control signal to the camera head control unit 11405. The control signal, for example, includes information associated with the imaging condition, such as information of designating a frame rate of the captured image, information of designating an exposure value at the time of the imaging, and/or information of designating the magnification and the focal point of the imaged image.

Note that the imaging conditions such as the frame rate, exposure value, magnification, and focus described above may be appropriately designated by the user, or may be automatically set by the control unit 11413 of the CCU 11201 on the basis of the acquired image signal. In the latter case, a so-called auto exposure (AE) function, an auto focus (AF) function, and an auto white balance (AWB) function are provided in the endoscope 11100.

The camera head control unit 11405 controls the driving of the camera head 11102 on the basis of the control signal from the CCU 11201 received through the communication unit 11404.

The communication unit 11411 includes a communication apparatus for transmitting and receiving various information items with respect to the camera head 11102. The communication unit 11411 receives the image signal to be transmitted from the camera head 11102, through the transmission cable 11400.

Furthermore, the communication unit 11411 transmits the control signal for controlling the driving of the camera head 11102 to the camera head 11102. The image signal and the control signal can be transmitted by electrical communication, optical communication, or the like.

The image processing unit 11412 performs various image processing on the image signal which is the RAW data transmitted from the camera head 11102.

The control unit 11413 performs various types of control related to imaging of the surgical site or the like by the endoscope 11100 and display of a captured image obtained by imaging of the surgical site or the like. For example, the control unit 11413 generates the control signal for controlling the driving of the camera head 11102.

Furthermore, the control unit 11413 causes the display apparatus 11202 to display the captured image of the surgery site or the like on the basis of the image signal subjected to the image processing by the image processing unit 11412. At this time, the control unit 11413 may recognize various objects in the captured image by using various image recognition technologies. For example, the control unit 11413 detects the shape, the color, or the like of the edge of the object included in the captured image, and thus, it is possible to recognize a surgical tool such as forceps, a specific biological portion, bleed, mist at the time of using the energy treatment tool 11112, and the like When the captured image is displayed on the display apparatus 11202, the control unit 11413 may display various surgery support information items to be superimposed on the image of the surgery site, by using a recognition result. Surgery support information is displayed in a superimposed manner and presented to the operator 11131, thereby reducing the burden on the operator 11131 and allowing the operator 11131 to proceed with surgery reliably.

The transmission cable 11400 connecting the camera head 11102 and the CCU 11201 together, is an electrical signal cable corresponding to the communication of the electrical signal, an optical fiber corresponding to the optical communication, or a composite cable thereof.

Here, in the illustrated example, the communication is performed in a wired manner, by using the transmission cable 11400, but the communication between the camera head 11102 and the CCU 11201, may be performed in a wireless manner.

An example of the endoscopic surgery system to which the technology according to the present disclosure can be applied, has been described. The technology according to the present disclosure can be applied to (the imaging unit 11402 of) the camera head 11102 among the configurations described above. Specifically, the solid-state imaging element 10 of FIG. 1 can be applied to (the imaging unit 11402 of) the camera head 11102. By applying the technology according to the present disclosure to the imaging unit 11402, it is possible to increase the frame rate and obtain a more observable surgical site image, so that the operator can reliably confirm the surgical site.

Note that, here, although an endoscopic surgery system has been described as an example, the technology according to the present disclosure may be applied to, for example, a microscope surgery system and the like.

Note that the embodiment of the present technology is not limited to the aforementioned embodiments, but various changes may be made within the scope not departing from the gist of the present technology.

Furthermore, the present technology can adopt the configuration described below.

(1)

An imaging apparatus including:

a pixel array unit including a first pixel portion and a second pixel portion different from the first pixel portion, in which each of the first pixel portion and the second pixel portion includes a first photoelectric conversion unit and a second photoelectric conversion unit adjacent to the first photoelectric conversion unit, and the pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion.

(2)

The imaging apparatus according to (1), in which the second drive line is nonconnected to the second photoelectric conversion unit of the second pixel portion.

(3)

The imaging apparatus according to (1) or (2), in which the third drive line is nonconnected to the second photoelectric conversion unit of the first pixel portion.

(4)

The imaging apparatus according to any of (1) to (3), further including an illuminance detection unit that detects illuminance in an imaging region of the pixel array unit, in which in a case where the illuminance detected by the illuminance detection unit is smaller than a predetermined threshold value, in the first pixel portion, a pixel signal corresponding to the first photoelectric conversion unit and a pixel signal corresponding to the second photoelectric conversion unit are generated using the first drive line and the second drive line, in a case where the illuminance detected by the illuminance detection unit is larger than the predetermined threshold value, in the second pixel portion, a pixel signal corresponding to the first photoelectric conversion unit and a pixel signal corresponding to the second photoelectric conversion unit are generated using the first drive line and the third drive line, and meanwhile, in the first pixel portion, a pixel signal corresponding to the first photoelectric conversion unit and a pixel signal corresponding to the second photoelectric conversion unit are added up and generated.

(5)

The imaging apparatus according to (4), further including an acquisition unit that acquires accuracy-related information related to accuracy of phase difference detection using the pixel signal, in which a value indicated by the accuracy-related information acquired by the acquisition unit is used for determination with the predetermined threshold value together with a value indicated by the illuminance.

(6)

The imaging apparatus according to (5), in which the accuracy-related information includes a luminance level in a target region in a target image frame.

(7)

The imaging apparatus according to (5) or (6), in which the accuracy-related information includes a number of effective pixels among pixels used for phase difference detection.

(8)

The imaging apparatus according to any of (5) to (7), in which the accuracy-related information includes a size of a region of interest in the target image frame.

(9)

The imaging apparatus according to any of (1) to (8), in which the first pixel portion includes a pixel unit having one or more photoelectric conversion units, and the second pixel portion includes a pixel unit having one or more photoelectric conversion units.

(10)

The imaging apparatus according to (9), in which the first pixel portion has an even number of photoelectric conversion units, and the second pixel portion has an even number of photoelectric conversion units.

(11)

The imaging apparatus according to (10), in which the first pixel portion has two photoelectric conversion units, and the second pixel portion has two photoelectric conversion units.

(12)

The imaging apparatus according to (10), in which the first pixel portion has four photoelectric conversion units, and the second pixel portion has four photoelectric conversion units.

(13)

The imaging apparatus according to any of (4) to (12), in which the illuminance detection unit detects the illuminance on the basis of exposure information.

(14)

The imaging apparatus according to (13), in which the illuminance detection unit detects the illuminance on the basis of an exposure amount obtained from an image frame preceding a target image frame.

(15)

The imaging apparatus according to any of (4) to (14), in which the illuminance detection unit is provided inside or outside the apparatus.

(16)

The imaging apparatus according to any of (4) to (15), further including a drive control unit that controls driving of the first pixel portion and the second pixel portion on the basis of the illuminance detected by the illuminance detection unit.

(17)

The imaging apparatus according to (16), further including a correction unit that corrects the pixel signal used for phase difference detection.

(18)

Electronic equipment including:

an imaging unit including:

a pixel array unit including a first pixel portion and a second pixel portion different from the first pixel portion, in which each of the first pixel portion and the second pixel portion includes a first photoelectric conversion unit and a second photoelectric conversion unit adjacent to the first photoelectric conversion unit, and the pixel array unit includes a first drive line connected to the first photoelectric conversion unit of the first pixel portion and the second pixel portion, a second drive line connected to the second photoelectric conversion unit of the first pixel portion, and a third drive line connected to the second photoelectric conversion unit of the second pixel portion.

(19)

An imaging apparatus including:

a pixel array unit including a first pixel portion and a second pixel portion different from the first pixel portion; and an illuminance detection unit that detects illuminance in an imaging region of the pixel array unit, in which each of the first pixel portion and the second pixel portion includes a first photoelectric conversion unit and a second photoelectric conversion unit adjacent to the first photoelectric conversion unit, in a case where the illuminance detected by the illuminance detection unit is smaller than a predetermined threshold value, in the first pixel portion and the second pixel portion, a pixel signal from the first photoelectric conversion unit and a pixel signal from the second photoelectric conversion unit are read, in a case where the illuminance detected by the illuminance detection unit is larger than the predetermined threshold value, in the second pixel portion, a pixel signal from the first photoelectric conversion unit and a pixel signal from the second photoelectric conversion unit are read, and meanwhile, in the first pixel portion, a pixel signal from the first photoelectric conversion unit and a pixel signal from the second photoelectric conversion unit are added up and read.

REFERENCE SIGNS LIST 1A, 1B, 1C Imaging apparatus
10 Solid-state imaging element
11 Pixel array unit
12 Vertical drive circuit
13 Column signal processing circuit
14 Horizontal drive circuit
15 Output circuit
16 Control circuit
17 Input/output terminal
21 Pixel drive line
22 Vertical signal line
100 Pixel
100A, 100B Pixel
120 Pixel
120A, 120B, 120C, 120D Pixel
111 On-chip lens
112A, 112B, 112C, 112D Photodiode
113 Color filter
151 Comparator
152 DAC
200A, 200B, 200C Control unit
211 Sensor drive control unit
212 AE unit
213 Luminance level detection unit
214 Phase difference detection unit
215 Counting unit
216 ROI setting unit
300 Signal processing unit
311 Pixel correction unit
312 Selector
313 Image signal processing unit
1000 Electronic equipment
1012 Imaging unit

The invention claimed is:

1. An imaging apparatus comprising:
   a pixel array unit including a first pixel portion and a second pixel portion different from the first pixel portion, wherein
   each of the first pixel portion and the second pixel portion includes a first photoelectric conversion unit and a second photoelectric conversion unit adjacent to the first photoelectric conversion unit, and
   the pixel array unit includes
   a first drive line connected to the first photoelectric conversion unit of the first pixel portion and the second pixel portion,
   a second drive line connected to the second photoelectric conversion unit of the first pixel portion, and
   a third drive line connected to the second photoelectric conversion unit of the second pixel portion.

2. The imaging apparatus according to claim 1, wherein the second drive line is nonconnected to the second photoelectric conversion unit of the second pixel portion.

3. The imaging apparatus according to claim 1, wherein the third drive line is nonconnected to the second photoelectric conversion unit of the first pixel portion.

4. The imaging apparatus according to claim 1, further comprising
   an illuminance detection unit that detects illuminance in an imaging region of the pixel array unit, wherein
   in a case where the illuminance detected by the illuminance detection unit is smaller than a predetermined threshold value, in the first pixel portion, a pixel signal corresponding to the first photoelectric conversion unit and a pixel signal corresponding to the second photoelectric conversion unit are generated using the first drive line and the second drive line, in a case where the illuminance detected by the illuminance detection unit is larger than the predetermined threshold value, in the second pixel portion, a pixel signal corresponding to the first photoelectric conversion unit and a pixel signal corresponding to the second photoelectric conversion unit are generated using the first drive line and the third drive line, and meanwhile, in the first pixel portion, a pixel signal corresponding to the first photoelectric conversion unit and a pixel signal corresponding to the second photoelectric conversion unit are added up and generated.

5. The imaging apparatus according to claim 4, further comprising
   an acquisition unit that acquires accuracy-related information related to accuracy of phase difference detection using the pixel signal, wherein
   a value indicated by the accuracy-related information acquired by the acquisition unit is used for determination with the predetermined threshold value together with a value indicated by the illuminance.

6. The imaging apparatus according to claim 5, wherein the accuracy-related information includes a luminance level in a target region in a target image frame.

7. The imaging apparatus according to claim 5, wherein the accuracy-related information includes a number of effective pixels among pixels used for phase difference detection.

8. The imaging apparatus according to claim 5, wherein the accuracy-related information includes a size of a region of interest in the target image frame.

9. The imaging apparatus according to claim 1, wherein the first pixel portion includes a pixel unit having one or more photoelectric conversion units, and
   the second pixel portion includes a pixel unit having one or more photoelectric conversion units.

10. The imaging apparatus according to claim 9, wherein the first pixel portion has an even number of photoelectric conversion units, and
    the second pixel portion has an even number of photoelectric conversion units.

11. The imaging apparatus according to claim 10, wherein the first pixel portion has two photoelectric conversion units, and
    the second pixel portion has two photoelectric conversion units.

12. The imaging apparatus according to claim 10, wherein the first pixel portion has four photoelectric conversion units, and
    the second pixel portion has four photoelectric conversion units.

13. The imaging apparatus according to claim 4, wherein the illuminance detection unit detects the illuminance on a basis of exposure information.

14. The imaging apparatus according to claim 13, wherein the illuminance detection unit detects the illuminance on a basis of an exposure amount obtained from an image frame preceding a target image frame.

15. The imaging apparatus according to claim 4, wherein the illuminance detection unit is provided inside or outside the apparatus.

16. The imaging apparatus according to claim 4, further comprising
    a drive control unit that controls driving of the first pixel portion and the second pixel portion on a basis of the illuminance detected by the illuminance detection unit.

17. The imaging apparatus according to claim 16, further comprising
    a correction unit that corrects the pixel signal used for phase difference detection.

18. Electronic equipment comprising:
    an imaging unit including:
    a pixel array unit including a first pixel portion and a second pixel portion different from the first pixel portion,
    wherein
    each of the first pixel portion and the second pixel portion includes a first photoelectric conversion unit and a second photoelectric conversion unit adjacent to the first photoelectric conversion unit, and
    the pixel array unit includes
    a first drive line connected to the first photoelectric conversion unit of the first pixel portion and the second pixel portion,
    a second drive line connected to the second photoelectric conversion unit of the first pixel portion, and
    a third drive line connected to the second photoelectric conversion unit of the second pixel portion.

* * * * *